(12) United States Patent
Fletcher et al.

(10) Patent No.: US 10,012,370 B2
(45) Date of Patent: Jul. 3, 2018

(54) LIGHTING SYSTEM HAVING A MOUNTING DEVICE

(71) Applicant: EcoSense Lighting Inc., Los Angeles, CA (US)

(72) Inventors: Robert Fletcher, Pasadena, CA (US); Edward R. Adams, Englewood, TN (US)

(73) Assignee: ECOSENSE LIGHTING INC., Los Angeles, CA (US)

( * ) Notice: Subject to any disclaimer, the term of this patent is extended or adjusted under 35 U.S.C. 154(b) by 49 days.

(21) Appl. No.: 15/268,781

(22) Filed: Sep. 19, 2016

(65) Prior Publication Data

US 2017/0370564 A1 Dec. 28, 2017

Related U.S. Application Data

(63) Continuation-in-part of application No. 14/816,827, filed on Aug. 3, 2015, now Pat. No. 9,651,232.

(51) Int. Cl.
*F21V 21/26* (2006.01)
*F21V 21/30* (2006.01)
(Continued)

(52) U.S. Cl.
CPC ............... *F21V 21/26* (2013.01); *F16M 1/00* (2013.01); *F21V 21/30* (2013.01); *F21V 15/015* (2013.01);
(Continued)

(58) Field of Classification Search
CPC ........ F21V 21/26; F21V 21/30; F21V 15/015; F21V 21/108; F21V 14/02; F21V 21/28;
(Continued)

(56) References Cited

U.S. PATENT DOCUMENTS

D122,711 S 9/1940 May
2,458,967 A 1/1949 Wiedenhoeft
(Continued)

FOREIGN PATENT DOCUMENTS

GB 751823 A 7/1956
WO 94/01717 A1 1/1994

OTHER PUBLICATIONS

Fletcher et al., U.S. Appl. No. 14/816,827, filed Aug. 3, 2015, entitled "Lighting System Having a Mounting Device," 126pp.
(Continued)

*Primary Examiner* — Bao Q Truong
(74) *Attorney, Agent, or Firm* — Jay M. Brown

(57) ABSTRACT

Lighting system including mounting body, lever-locking bracket, and lighting module. Mounting body has first end spaced apart along longitudinal axis from second end. Lever-locking bracket includes bracket body and lever actuator. Lever-locking bracket is pivotally connected with first end of mounting body by flange retained in alignment with aperture of mounting body communicating with cavity inside mounting body. Lighting module has semiconductor light-emitting device in housing, and has mounting arm pivotally connected with lever-locking bracket by first pivot joint for rotation of lighting module to plurality of primary positions around first pivot axis. Flange of the lever-locking bracket forms part of second pivot joint for rotation of lighting module to plurality of secondary positions around second pivot axis. Lever-locking bracket is configured for simultaneously locking lighting module at primary position and secondary position by movement of lever actuator from an unlocked position to locked position.

123 Claims, 25 Drawing Sheets

(51) Int. Cl.
*F16M 1/00* (2006.01)
*F21Y 115/10* (2016.01)
*F21V 15/015* (2006.01)
*F21V 21/108* (2006.01)
*F21Y 115/30* (2016.01)
*F21Y 115/15* (2016.01)

(52) U.S. Cl.
CPC ......... *F21V 21/108* (2013.01); *F21Y 2115/10* (2016.08); *F21Y 2115/15* (2016.08); *F21Y 2115/30* (2016.08)

(58) Field of Classification Search
CPC ........ F21V 15/01; F21V 15/012; F21V 17/00; F21V 17/04; F21V 17/06; F21V 17/10; F21V 17/104; F21V 17/20; F21V 19/00; F21V 19/02; F21V 21/00; F21V 21/14; F21V 21/29; F16M 1/00; F21Y 2115/30; F21Y 2115/10; F21Y 2115/15; F21Y 2101/02; F21S 2/005
See application file for complete search history.

(56) References Cited

U.S. PATENT DOCUMENTS

| | | | |
|---|---|---|---|
| D205,082 S | 6/1966 | Morgan | |
| D214,582 S | 7/1969 | Routh | |
| D231,559 S | 4/1974 | Darling | |
| D234,712 S | 4/1975 | Kennedy | |
| 4,090,210 A | 5/1978 | Wehling | |
| D258,314 S | 2/1981 | Leon | |
| 4,258,413 A | 3/1981 | Mausser | |
| 4,345,306 A | 8/1982 | Summey | |
| 4,423,471 A | 12/1983 | Gordin | |
| 4,467,403 A | 8/1984 | May | |
| 4,473,873 A | 9/1984 | Quiogue | |
| 4,609,979 A | 9/1986 | Kristofek | |
| D296,244 S | 6/1988 | Donato | |
| D296,717 S | 7/1988 | Kane | |
| D300,876 S | 4/1989 | Sakai | |
| 4,833,579 A | 5/1989 | Skegin | |
| 4,882,667 A | 11/1989 | Skegin | |
| D307,640 S | 5/1990 | Titmarsh | |
| D315,030 S | 2/1991 | Jacobs | |
| D316,303 S | 4/1991 | Layne | |
| D319,512 S | 8/1991 | Lettenmayer | |
| D325,645 S | 4/1992 | Grange | |
| 5,140,507 A | 8/1992 | Harwood | |
| D330,944 S | 11/1992 | Wereley | |
| D336,536 S | 6/1993 | Shaanan | |
| 5,325,281 A | 6/1994 | Harwood | |
| D348,744 S | 7/1994 | Johnson | |
| 5,335,159 A | 8/1994 | Chen | |
| 5,381,323 A | 1/1995 | Osteen | |
| 5,450,303 A | 9/1995 | Markiewicz | |
| 5,504,665 A | 4/1996 | Osteen | |
| D373,437 S | 9/1996 | Kira | |
| 5,584,574 A | 12/1996 | Haddad | |
| 5,599,091 A * | 2/1997 | Kira | F21V 21/30 362/269 |
| 5,713,662 A | 2/1998 | Kira | |
| 5,716,126 A | 2/1998 | Meyer | |
| 6,022,130 A | 2/2000 | Donato | |
| 6,079,992 A | 6/2000 | Kuchar | |
| 6,439,749 B1 | 8/2002 | Miller | |
| 6,902,200 B1 | 6/2005 | Beadle | |
| D539,459 S | 3/2007 | Benghozi | |
| 7,210,957 B2 | 5/2007 | Mrakovich | |
| D551,372 S | 9/2007 | Korpi | |
| D552,779 S | 10/2007 | Starck | |
| D552,782 S | 10/2007 | Korpi | |
| D574,987 S | 8/2008 | Waldmann | |
| D583,975 S | 12/2008 | Kushinskaya | |
| D590,085 S | 4/2009 | Irvine | |
| D610,729 S | 2/2010 | Kushinskaya | |
| D618,374 S | 6/2010 | Guercio | |
| D625,870 S | 10/2010 | Feigenbaum | |
| 7,810,951 B1 | 10/2010 | Lee | |
| 8,002,438 B2 | 8/2011 | Ko | |
| D645,183 S | 9/2011 | Cucinella | |
| D645,594 S | 9/2011 | Grawe | |
| 8,104,934 B2 | 1/2012 | Probasco | |
| D654,207 S | 2/2012 | Fletcher et al. | |
| D655,840 S | 3/2012 | Heaton | |
| D655,842 S | 3/2012 | Sabernig | |
| 8,142,047 B2 | 3/2012 | Acampora | |
| D659,871 S | 5/2012 | Lee | |
| 8,182,122 B2 | 5/2012 | Chiu | |
| 8,297,792 B1 | 10/2012 | Wang | |
| 8,297,808 B2 | 10/2012 | Yuan | |
| 8,360,621 B2 | 1/2013 | Avila | |
| D690,859 S | 10/2013 | Mollaghaffari | |
| D694,925 S | 12/2013 | Fukasawa | |
| D700,728 S | 3/2014 | Fukasawa | |
| 8,858,028 B2 | 10/2014 | Kim | |
| D724,773 S | 3/2015 | Ryu | |
| D779,697 S | 2/2017 | Fletcher | |
| D782,093 S | 3/2017 | Fletcher | |
| D782,094 S | 3/2017 | Fletcher | |
| 9,651,232 B1 * | 5/2017 | Fletcher | F21V 21/30 |
| 2004/0090781 A1 | 5/2004 | Yeoh | |
| 2009/0318770 A1 | 12/2009 | Marka et al. | |
| 2010/0254147 A1 | 10/2010 | Tsao | |

OTHER PUBLICATIONS

Fletcher et al., U.S. Appl. No. 29/532,383, filed Jul. 6, 2015, entitled "LED Luminaire Having a Mounting System," 10pp.
Fletcher et al., U.S. Appl. No. 29/533,666, filed Jul. 20, 2015, entitled "LED Luminaire Having a Mounting System," 10pp.
Fletcher et al., U.S. Appl. No. 29/533,667, filed Jul. 20, 2015, entitled "LED Luminaire Having a Mounting System," 10pp.
Fletcher et al., U.S. Appl. No. 29/533,635, filed Jul. 20, 2015, entitled "LED Luminaire Having a Mounting System" 10pp.
Fletcher et al., U.S. Appl. No. 29/578,082, filed Sep. 19, 2016, entitled "LED Luminaire Having a Mounting System," 10pp.
Fletcher et al., U.S. Appl. No. 29/578,086, filed Sep. 19, 2016, entitled "LED Luminaire Having a Mounting System," 10pp.
Fletcher et al., U.S. Appl. No. 29/578,094, filed Sep. 19, 2016, entitled "LED Luminaire Having a Mounting System," 10pp.
Fletcher et al., U.S. Appl. No. 29/578,095, filed Sep. 19, 2016, entitled "LED Luminaire Having a Mounting System," 10pp.
PCT International patent application No. PCT/US2017/051939 filed on Sep. 16, 2017; 89pp.
International Search Report and Opinion dated Nov. 16, 2017 in PCT International patent application No. PCT/US2017/051939 filed on Sep. 16, 2017; 8pp.
Fletcher et al., U.S. Appl. No. 15/481,223, filed Apr. 6, 2017, 159pp.

* cited by examiner

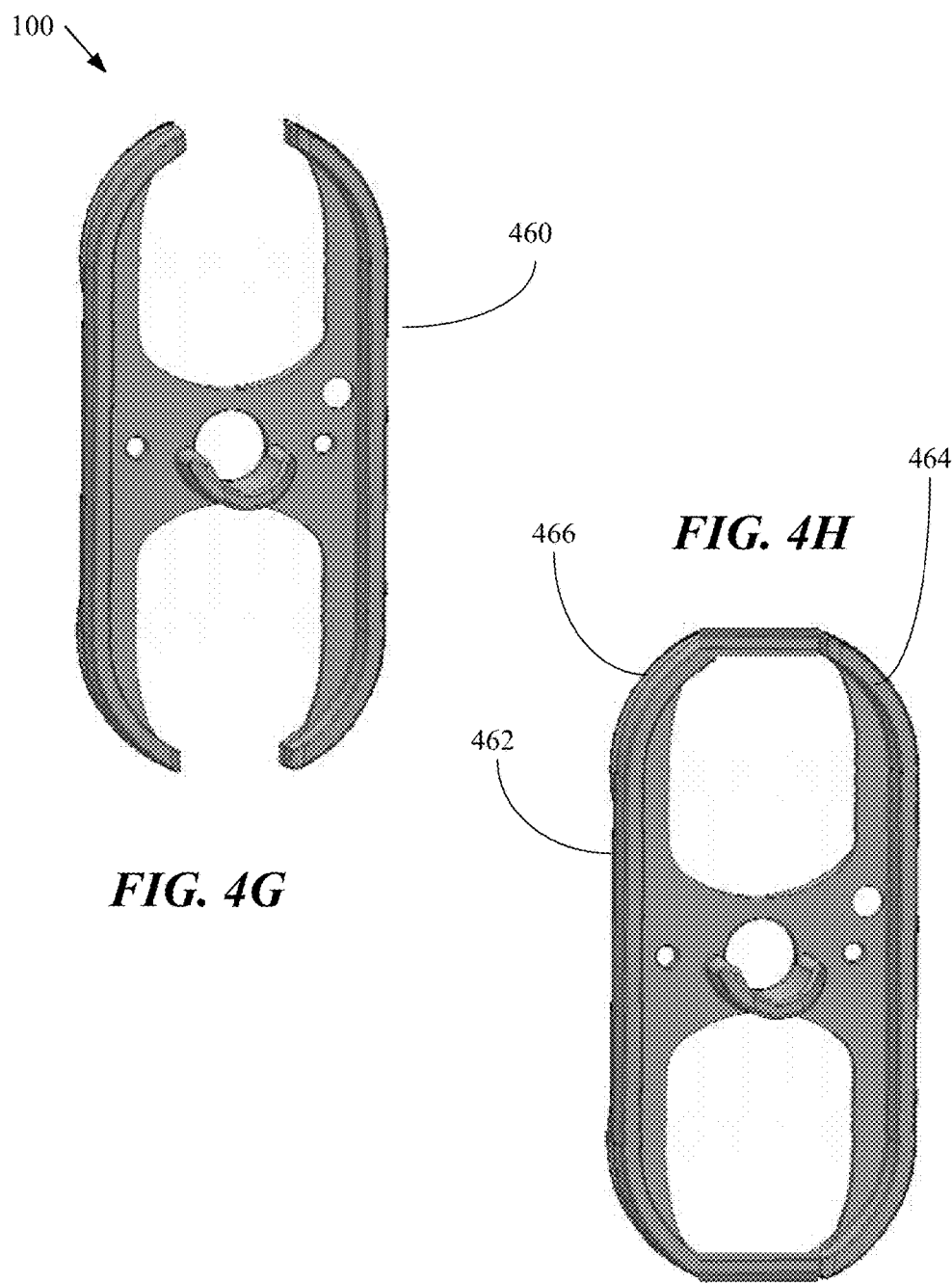

LIGHTING SYSTEM HAVING A MOUNTING DEVICE

CROSS-REFERENCE TO RELATED APPLICATIONS

This application is a continuation-in-part of commonly-owned U.S. patent application Ser. No. 14/816,827 filed on Aug. 3, 2015, entitled "Lighting System Having a Mounting Device," the entirety of which hereby is incorporated herein by reference.

BACKGROUND OF THE INVENTION

1. Field of the Invention

The present invention relates to the field of lighting systems that include semiconductor light-emitting devices.

2. Background of the Invention

Numerous lighting systems have been developed that include lighting modules including semiconductor light-emitting devices. As examples, some of these lighting systems may include mounting devices for the lighting modules. Despite the existence of these lighting systems, further improvements are still needed in lighting systems that include lighting modules and have mounting devices.

SUMMARY

In an example of an implementation, a lighting system is provided that includes: a mounting body; a lever-locking bracket; and a lighting module. In the example of the lighting system, the mounting body has a first end being spaced apart along a longitudinal axis from a second end. The lever-locking bracket in the example of the lighting system includes a bracket body and a lever actuator, and the lever-locking bracket is pivotally connected with the first end of the mounting body by a flange of the lever-locking bracket being retained in alignment with an aperture of the mounting body communicating with a cavity located inside the mounting body. In the example of the lighting system, the lighting module has a housing, and has a semiconductor light-emitting device in the housing. The lighting module in the example of the lighting system has a mounting arm being pivotally connected with the lever-locking bracket by a first pivot joint for rotation of the lighting module to a plurality of primary positions around a first pivot axis. In the example of the lighting system, the flange of the lever-locking bracket forms a part of a second pivot joint for rotation of the lighting module to a plurality of secondary positions around a second pivot axis. The lever-locking bracket of the example of the lighting system is configured for simultaneously locking the lighting module at a one of the primary positions and at a one of the secondary positions by a movement of the lever actuator from an unlocked position to a locked position.

In some examples of the lighting system, the first pivot axis may define a first degree of freedom of movement of the lighting module, and the second pivot axis may define a second degree of freedom of movement of the lighting module.

In further examples of the lighting system, the first pivot axis may be orthogonal to the second pivot axis.

In additional examples of the lighting system, the lever-locking bracket may include a cavity located inside the bracket body, and the lever-locking bracket may include a lever located inside the cavity of the bracket body.

In other examples of the lighting system, the lever may be integrated with the lever actuator.

In some examples of the lighting system, the bracket body may include a lever notch being located inside the cavity of the bracket body, and the lever may include a projecting leverage point being in pivotal contact with the lever notch of the bracket body.

In further examples of the lighting system, the lever-locking bracket may include another lever being located inside the cavity of the bracket body, and the lever and the another lever may be in mutual pivotal contact inside the cavity of the bracket body.

In additional examples of the lighting system, the lever may include a projecting leverage point, and the another lever may include a projecting lever notch, and the projecting leverage point may be in pivotal contact with the projecting lever notch.

In other examples of the lighting system, the lever may include a projecting lever notch, and the another lever may include a projecting leverage point, and the projecting leverage point may be in pivotal contact with the projecting lever notch.

In some examples of the lighting system, the bracket body may include a portion of the flange of the lever-locking bracket, and the lever actuator may include another portion of the flange of the lever-locking bracket.

In further examples of the lighting system, the portion of the flange of the lever-locking bracket may reach a first distance away from the second pivot axis and the another portion of the flange of the lever-locking bracket may reach a second distance away from the second pivot axis; and the first distance may be about the same as the second distance when the lever actuator is in the unlocked position.

In additional examples of the lighting system, the movement of the lever actuator from the unlocked position to the locked position may cause a displacement of the another portion of the flange of the lever-locking bracket farther away from the second pivot axis, so that the second distance may be larger than the first distance when the lever actuator is in the locked position.

In other examples of the lighting system, the flange of the lever-locking bracket may be located inside the mounting body.

In some examples of the lighting system, the aperture of the mounting body may have an edge reaching another distance away from the second pivot axis, and the another distance may be smaller than the first distance reached by the portion of the flange of the lever-locking bracket, and the flange of the lever-locking bracket may be retained inside the cavity of the mounting body by the edge of the aperture of the mounting body.

In further examples of the lighting system, the flange of the lever-locking bracket may be frictionally locked together with the mounting body when the lever actuator is in the locked position.

In additional examples, the lighting system may further include a bracket retainer located inside the cavity of the mounting body, the bracket retainer encircling a portion of the aperture of the mounting body and being in contact with a portion of the flange of the lever-locking bracket.

In other examples, the lighting system may further include a bracket retainer located inside the cavity of the mounting body, the bracket retainer having a side encircling the aperture of the mounting body and being in contact with a portion of the flange of the lever-locking bracket.

In some examples of the lighting system, the bracket retainer may have a flange, and the flange of the bracket retainer may encircle the flange of the lever-locking bracket, and the bracket retainer may maintain the lever-locking bracket in alignment with the second pivot axis.

In further examples of the lighting system, the lever-locking bracket may include another lever actuator, the lever actuator and the another lever actuator being held in mutually opposing positions by the bracket body.

In additional examples of the lighting system, the lever-locking bracket may include another lever located inside the cavity of the bracket body, and the another lever may be integrated with the another lever actuator.

In other examples of the lighting system, the lever and the another lever may be in mutual pivotal contact inside the cavity of the bracket body.

In some examples of the lighting system, the bracket body may include a portion of the flange of the lever-locking bracket, and the lever actuator may include another portion of the flange of the lever-locking bracket, and the another lever actuator may include a further portion of the flange of the lever-locking bracket.

In further examples of the lighting system, the portion of the flange of the lever-locking bracket may reach a first distance away from the second pivot axis, and the another portion of the flange of the lever-locking bracket may reach a second distance away from the second pivot axis, and the further portion of the flange of the lever-locking bracket may reach a third distance away from the second pivot axis; and each one of the first, second and third distances may be about the same when the lever actuator is in the unlocked position and the another lever actuator is in another unlocked position.

In other examples of the lighting system, the movement of the lever actuator from the unlocked position to the locked position and a movement of the another lever actuator from the another unlocked position to another locked position may cause displacements of the another portion of the flange of the lever-locking bracket and of the further portion of the flange of the lever-locking bracket farther away from the second pivot axis, so that each one of the second and third distances may be larger than the first distance when the lever actuator is in the locked position and the another lever actuator is in the another locked position.

In some examples of the lighting system, the flange of the lever-locking bracket may be located inside the mounting body.

In further examples of the lighting system, the aperture of the mounting body may have an edge reaching another distance away from the second pivot axis, and the another distance may be smaller than the first distance reached by the portion of the flange of the lever-locking bracket, and the flange of the lever-locking bracket may be retained inside the cavity of the mounting body by the edge of the aperture of the mounting body.

In additional examples of the lighting system, the flange of the lever-locking bracket may be frictionally locked together with the mounting body when the lever actuator is in the locked position and the another lever actuator is in the another locked position.

In other examples, the lighting system may further include a bracket retainer located inside the cavity of the mounting body, the bracket retainer encircling a portion of the aperture of the mounting body and being in contact with a portion of the flange of the lever-locking bracket.

In some examples, the lighting system may further include a bracket retainer located inside the cavity of the mounting body, the bracket retainer having a side encircling the aperture of the mounting body and being in contact with a portion of the flange of the lever-locking bracket.

In further examples of the lighting system, the bracket retainer may have a flange, and the flange of the bracket retainer may encircle the flange of the lever-locking bracket, and the bracket retainer may maintain the lever-locking bracket in alignment with the second pivot axis.

In additional examples of the lighting system, the flange of the lever-locking bracket may be located at a first end of the lever-locking bracket, and the lever-locking bracket may have a second end being spaced apart along another longitudinal axis extending away from the mounting body.

In other examples of the lighting system, the lever-locking bracket may have an arch shape, and the flange of the lever-locking bracket may form a base of the arch shape.

In some examples of the lighting system, the arch shape of the lever-locking bracket may be a round arch, an elliptical arch, a three-centered arch, a segmental arch, a horseshoe arch, or a pinched arch.

In further examples of the lighting system, the lever-locking bracket may have two spaced-apart mutually-opposing arched sides each having the arch shape.

In additional examples of the lighting system, the mounting arm may have another arch shape and two spaced-apart mutually-opposing arched sides each having the another arch shape.

In other examples of the lighting system, a one of the arched sides of the lever-locking bracket may be pivotally connected with and aligned for rotation around the first pivot axis relative to a one of the arched sides of the mounting arm.

In some examples of the lighting system, the lever-locking bracket may include a cavity located inside the bracket body.

In further examples of the lighting system, the lever actuator may form another one of the arched sides of the lever-locking bracket, and the bracket body and the another one of the arched sides of the lever-locking bracket may cooperatively enclose the cavity of the bracket body.

In additional examples, the lighting system may include an aperture in the one of the arched sides of the mounting arm, being in communication at the first pivot joint with an aperture in the one of the arched sides of the lever-locking bracket.

In other examples, the lighting system may include a fastener forming the first pivot axis, the fastener extending through the aperture in the one of the arched sides of the mounting arm and through the aperture in the one of the arched sides of the lever-locking bracket.

In some examples of the lighting system, the fastener may be configured for causing the lever-locking bracket to be placed under compression with the mounting arm along the first pivot axis.

In further examples of the lighting system, the fastener may be configured for causing the movement of the lever actuator from the unlocked position to the locked position while simultaneously causing the one of the arched sides of the lever-locking bracket to be frictionally locked together with the one of the arched sides of the mounting arm.

In additional examples, the lighting system may include raised bumps being on and arranged around the aperture of the one of the arched sides of the lever-locking bracket, and may include further raised bumps being on and arranged around the aperture of the one of the arched sides of the mounting arm.

In other examples of the lighting system, the raised bumps and the further raised bumps may collectively cause the lever-locking bracket to be frictionally locked together with the mounting arm when the lever actuator is in the locked position, and the raised bumps and the further raised bumps may collectively permit the lighting module to be rotated around the first pivot axis when the lever actuator is in the unlocked position.

In some examples of the lighting system, the mounting arm may include a threaded receptacle, and the fastener may be a bolt connected to the lever-locking bracket and having a threaded shank pivotally located in the threaded receptacle.

In further examples of the lighting system, the lever-locking bracket may include a threaded receptacle, and the fastener may be a bolt connected to the mounting arm and having a threaded shank pivotally located in the threaded receptacle.

In additional examples of the lighting system, the lever-locking bracket may include a lever located inside the cavity of the bracket body.

In other examples of the lighting system, the lever may be integrated with the lever actuator.

In some examples of the lighting system, the bracket body may include a lever notch being located inside the cavity of the bracket body, and the lever may include a projecting leverage point being in pivotal contact with the lever notch.

In further examples of the lighting system, the bracket body may include two spaced-apart lever notches being located inside the cavity of the bracket body, and the lever may include two spaced-apart projecting leverage points, a one of the projecting leverage points being in pivotal contact with a one of the lever notches and another one of the projecting leverage points being in pivotal contact with another one of the lever notches.

In additional examples of the lighting system, the cavity of the bracket body may have an aperture being in communication with the cavity of the mounting body.

In other examples of the lighting system, the lighting module may have an aperture being in communication with a passageway of the mounting arm, and the passageway of the mounting arm may be in communication with the aperture in the one of the arched sides of the mounting arm.

In some examples, the lighting system may include an electrical conductor passing from the cavity of the mounting body into the cavity of the bracket body, and passing from the cavity of the bracket body into the passageway of the mounting arm, and passing from the passageway of the mounting arm into the lighting module.

In further examples, the lighting system may include a mounting post having a first end being spaced apart along a further longitudinal axis from a second end, the second end of the mounting body being connected with the second end of the mounting post.

In additional examples, the lighting system may include a mounting base at the first end of the mounting post and being configured for positioning the lighting system on a working surface, and the lighting system may include a third pivot joint for rotation of the lighting module to a plurality of tertiary positions around a third pivot axis being orthogonal to the working surface.

In other examples of the lighting system, the mounting base may be configured for attaching the lighting system to the working surface.

In some examples of the lighting system, the mounting base may include a fastener for attaching the lighting system to the working surface.

In further examples of the lighting system, the first pivot axis may define a first degree of freedom of movement of the lighting module, and the second pivot axis may define a second degree of freedom of movement of the lighting module, and the third pivot axis may define a third degree of freedom of movement of the lighting module.

In additional examples of the lighting system, the first pivot axis may be orthogonal to the second pivot axis.

In other examples of the lighting system, the second end of the mounting post may include another mounting arm, and the second end of the mounting body may be attached to the another mounting arm at a fourth pivot joint for rotation of the lighting module to a plurality of quaternary positions around a fourth pivot axis being orthogonal to the third pivot axis.

In some examples, the lighting system may include a first circular cylinder having a first cylinder base spaced apart by a first sidewall from a first rim, and the first rim may be located at the first end of the mounting post, and the lighting system may include a second circular cylinder having a second cylinder base spaced apart by a second sidewall from a second rim, and the first circular cylinder may benested inside the second circular cylinder.

In further examples of the lighting system, the first rim of the first circular cylinder may be attached to the mounting base.

In additional examples of the lighting system, the second end of the mounting post may include another mounting arm, and the second end of the mounting body may be attached to the another mounting arm at a fourth pivot joint for rotation of the lighting module to a plurality of quaternary positions around a fourth pivot axis.

In other examples of the lighting system, the another mounting arm may include a flange being interposed between the first cylinder base and the second cylinder base.

In some examples of the lighting system, the first sidewall of the first circular cylinder may include a plurality of spaced-apart raised ribs extending toward the second sidewall of the second circular cylinder, and the raised ribs may be positioned for centering the first circular cylinder inside the second circular cylinder in alignment with the third pivot axis.

In further examples, the lighting system may include another lever-locking bracket having another bracket body and a further lever actuator, the another lever-locking bracket being pivotally connected with the second end of the mounting post at the third pivot joint being formed by a flange of the another lever-locking bracket retained in alignment with an aperture in the first cylinder base of the first circular cylinder, and the flange of the another lever-locking bracket may be interposed between the first cylinder base of the first circular cylinder and the second cylinder base of the second circular cylinder.

In additional examples of the lighting system, the second end of the mounting body may be pivotally connected with the another lever-locking bracket by a fourth pivot joint for rotation of the lighting module to a plurality of quaternary positions around a fourth pivot axis, the another lever-locking bracket being configured for simultaneously locking the lighting module at a one of the tertiary positions and at a one of the quaternary positions by moving the further lever actuator from an unlocked position to a locked position.

In other examples of the lighting system, the first pivot axis may define a first degree of freedom of movement of the lighting module, and the second pivot axis may define a second degree of freedom of movement of the lighting module, and the third pivot axis may define a third degree of freedom of movement of the lighting module, and the fourth pivot axis may define a fourth degree of freedom of movement of the lighting module.

In some examples of the lighting system, the another lever-locking bracket may include a cavity located inside the another bracket body, and the another lever-locking bracket may include a further lever located inside the cavity of the another bracket body.

In further examples of the lighting system, the further lever may be integrated with the further lever actuator.

In additional examples of the lighting system, the another bracket body may include another lever notch being located inside the cavity of the another bracket body, and the further lever may include a projecting leverage point being in pivotal contact with the another lever notch of the another bracket body.

In other examples of the lighting system, the another bracket body may include a portion of the flange of the another lever-locking bracket, and the further lever actuator may include another portion of the flange of the another lever-locking bracket.

In some examples of the lighting system, the portion of the flange of the another lever-locking bracket may reach a first distance away from the third pivot axis and the another portion of the flange of the another lever-locking bracket may reach a second distance away from the third pivot axis; and the first distance may be about the same as the second distance when the further lever actuator is in an unlocked position.

In further examples of the lighting system, the movement of the further lever actuator from the unlocked position to a locked position may cause a displacement of the another portion of the flange of the another lever-locking bracket farther away from the third pivot axis, so that the second distance may be larger than the first distance when the further lever actuator is in the locked position.

In additional examples of the lighting system, the flange of the another lever-locking bracket may be located inside the mounting post.

In other examples of the lighting system, an aperture in the first cylinder base of the first circular cylinder may have an edge reaching an additional distance away from the third pivot axis, and the additional distance may be smaller than the first distance reached by the portion of the flange of the another lever-locking bracket, and the flange of the another lever-locking bracket may be retained inside the mounting post by the edge of the aperture in the first cylinder base.

In some examples of the lighting system, the flange of the another lever-locking bracket may be frictionally locked together with the mounting post when the further lever actuator is in the locked position.

In further examples of the lighting system, the flange of the another lever-locking bracket may be located at a first end of the another lever-locking bracket, and the another lever-locking bracket may have a second end being spaced apart along an additional longitudinal axis extending away from the mounting post.

In additional examples of the lighting system, the another lever-locking bracket may have an arch shape, and the flange of the another lever-locking bracket may form a base of the arch shape.

In other examples of the lighting system, the arch shape of the another lever-locking bracket may be a round arch, an elliptical arch, a three-centered arch, a segmental arch, a horseshoe arch, or a pinched arch.

In some examples of the lighting system, the another lever-locking bracket may have two spaced-apart mutually-opposing arched sides each having the arch shape.

In further examples of the lighting system, the second end of the mounting body may have another arch shape and two spaced-apart mutually-opposing arched sides each having the another arch shape.

In additional examples of the lighting system, the arch shape of the second end of the mounting body may be a round arch, an elliptical arch, a three-centered arch, a segmental arch, a horseshoe arch, or a pinched arch.

In other examples of the lighting system, a one of the arched sides of the another lever-locking bracket may be pivotally connected with and aligned for rotation around the fourth pivot axis relative to a one of the arched sides of the second end of the mounting body.

In some examples of the lighting system, the another lever-locking bracket may include a cavity located inside the another bracket body.

In further examples of the lighting system, the further lever actuator may form another one of the arched sides of the another lever-locking bracket, and the another bracket body and the another one of the arched sides of the another lever-locking bracket may cooperatively enclose the cavity of the another bracket body.

In additional examples, the lighting system may include an aperture in the one of the arched sides of the second end of the mounting body, being in communication at the fourth pivot joint with an aperture in the one of the arched sides of the another lever-locking bracket.

In other examples, the lighting system may include a fastener forming the fourth pivot axis, the fastener extending through the aperture in the one of the arched sides of the second end of the mounting body and through the aperture in the one of the arched sides of the another lever-locking bracket.

In some examples of the lighting system, the fastener may be configured for causing the another lever-locking bracket to be placed under compression with the second end of the mounting body along the fourth pivot axis.

In further examples of the lighting system, the fastener may be configured for causing a movement of the further lever actuator from the unlocked position to the locked position while simultaneously causing the one of the arched sides of the another lever-locking bracket to be frictionally locked together with the one of the arched sides at the second end of the mounting body.

In additional examples, the lighting system may include raised bumps being on and arranged around the aperture of the one of the arched sides of the another lever-locking bracket, and further raised bumps being on and arranged around the aperture of the one of the arched sides of the second end of the mounting body.

In other examples of the lighting system, the raised bumps and the further raised bumps may collectively cause the another lever-locking bracket to be frictionally locked together with the second end of the mounting body when the further lever actuator is in the locked position, and the raised bumps and the further raised bumps may collectively permit the lighting module to be rotated around the fourth pivot axis when the another lever actuator is in the unlocked position.

In some examples of the lighting system, the second end of the mounting body may include a threaded receptacle, and the fastener may be a bolt connected to the another lever-locking bracket and having a threaded shank pivotally located in the threaded receptacle.

In further examples of the lighting system, the another lever-locking bracket may include a threaded receptacle, and the fastener may be a bolt connected to the second end of the mounting body and having a threaded shank pivotally located in the threaded receptacle.

In additional examples of the lighting system, the another lever-locking bracket may include a further lever located inside the cavity of the another bracket body.

In other examples of the lighting system, the further lever may be integrated with the further lever actuator.

In some examples of the lighting system, the another bracket body may include a further lever notch being located inside the cavity of the another bracket body, and the further lever may include a projecting leverage point being in pivotal contact with the further lever notch.

In further examples of the lighting system, the another bracket body may include two spaced-apart further lever notches being located inside the cavity of the another bracket body, and the further lever may include two spaced-apart further projecting leverage points, a one of the further projecting leverage points being in pivotal contact with a one of the further lever notches and another one of the further projecting leverage points being in pivotal contact with another one of the further lever notches.

In additional examples of the lighting system, the cavity of the another bracket body may have an aperture being in communication with the cavity of the mounting body.

In other examples of the lighting system, the mounting base may have an aperture being in communication with the aperture in the one of the arched sides of the mounting post.

In some examples, the lighting system may include an electrical conductor passing from a cavity of the mounting post into the cavity of the mounting body, and passing from the cavity of the mounting body into the cavity of the bracket body, and passing from the cavity of the bracket body into the passageway of the mounting arm, and passing from the passageway of the mounting arm into the lighting module.

In further examples of the lighting system, the lighting system may include another lever-locking bracket having another bracket body and a further lever actuator, the another lever-locking bracket being pivotally connected with the second end of the mounting post by a flange of the another lever-locking bracket.

In additional examples, the lighting system may include a circular cylinder having a cylinder base spaced apart by a sidewall from a rim, and the rim of the circular cylinder may be attached to the mounting base.

In other examples, the lighting system may include a threaded ring, and a portion of the sidewall adjacent to the cylinder base of the circular cylinder may be threaded for insertion into the threaded ring, and the flange of the additional lever-locking bracket may be interposed between the cylinder base and the threaded ring.

In some examples, the lighting system may have a second lever-locking bracket including a second bracket body and a second lever actuator, the second lever-locking bracket being pivotally connected with the mounting body at a position being either aligned along the longitudinal axis with and spaced apart from another position of the lever-locking bracket, or being spaced apart at a distance away from the longitudinal axis being about the same as another distance by which another position of the lever-locking bracket is spaced apart from the longitudinal axis.

In further examples of the lighting system, the second lever-locking bracket may be pivotally connected with the mounting body at the position as being aligned along the longitudinal axis with and spaced apart from another position of the lever-locking bracket.

In additional examples, the lighting system may include a second lighting module having a second mounting arm being pivotally connected with the second lever-locking bracket.

In other examples of the lighting system, the second lighting module may include four semiconductor light-emitting devices in a second housing, and the second housing may include a divider for causing light emissions from each of the four semiconductor light-emitting devices to be separately emitted from the second lighting module.

In some examples of the lighting system, the second lever-locking bracket may be pivotally connected with the mounting body by a flange of the second lever-locking bracket being retained in alignment with a second aperture of the mounting body communicating with the cavity located inside the mounting body.

In further examples of the lighting system, the mounting body may have two mutually-opposing sides, and the lever-locking bracket may be connected to the lighting system at a one of the two mutually-opposing sides of the mounting body, and the second lever-locking bracket may be connected to the lighting system at another one of the two mutually-opposing sides of the mounting body.

In additional examples of the lighting system, the mounting body may have two mutually-opposing sides, and the lever-locking bracket may be connected to the lighting system at a one of the two mutually-opposing sides of the mounting body, and the second lever-locking bracket also may be connected to the lighting system at the one of the two mutually-opposing sides of the mounting body.

In other examples, the lighting system may have two additional lever-locking brackets each including an additional bracket body and an additional lever actuator, and a one of the additional lever-locking brackets may be connected to the lighting system at the another one of the two mutually-opposing sides of the mounting body, and another one of the additional lever-locking brackets may be aligned along the longitudinal axis with and spaced apart from the one of the additional lever-locking brackets and may also be connected to the lighting system at the another one of the two mutually-opposing sides of the mounting body.

In some examples of the lighting system, the mounting body may have two mutually-opposing sides, and the mounting body may include two half-bodies collectively forming the mounting body, each one of the two half-bodies forming a one of the mutually-opposing sides of the mounting body.

In further examples of the lighting system, the flange of the lever-locking bracket may be interposed between a bracket retainer and a one of the two mutually-opposing sides of the mounting body, and a flange of a second lever-locking bracket may be interposed between another bracket retainer and the another one of the two mutually-opposing sides of the mounting body.

In additional examples of the lighting system, a second lever-locking bracket may be pivotally connected with the mounting body at a position being spaced apart at a distance away from the longitudinal axis being about the same as another distance by which another position of the lever-locking bracket is spaced apart from the longitudinal axis.

In other examples, the lighting system may have two additional lever-locking brackets each including an additional bracket body and an additional lever actuator, and a one of the additional lever-locking brackets may be connected to the lighting system at the another one of the two mutually-opposing sides of the mounting body, and another one of the additional lever-locking brackets may also connected to the lighting system at the another one of the two mutually-opposing sides of the mounting body and may be spaced apart at a distance away from the longitudinal axis being about the same as another distance by which the one of the additional lever-locking brackets may be spaced apart from the longitudinal axis.

Other systems, devices, processes, features and advantages of the invention will be or will become apparent to one with skill in the art upon examination of the following figures and detailed description. It is intended that all such additional systems, devices, processes, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIGS. 4G and 4H are perspective views showing two examples of retainers for the lever-locking bracket [102] of the example [100] of the lighting system.

DETAILED DESCRIPTION

Figure 1:
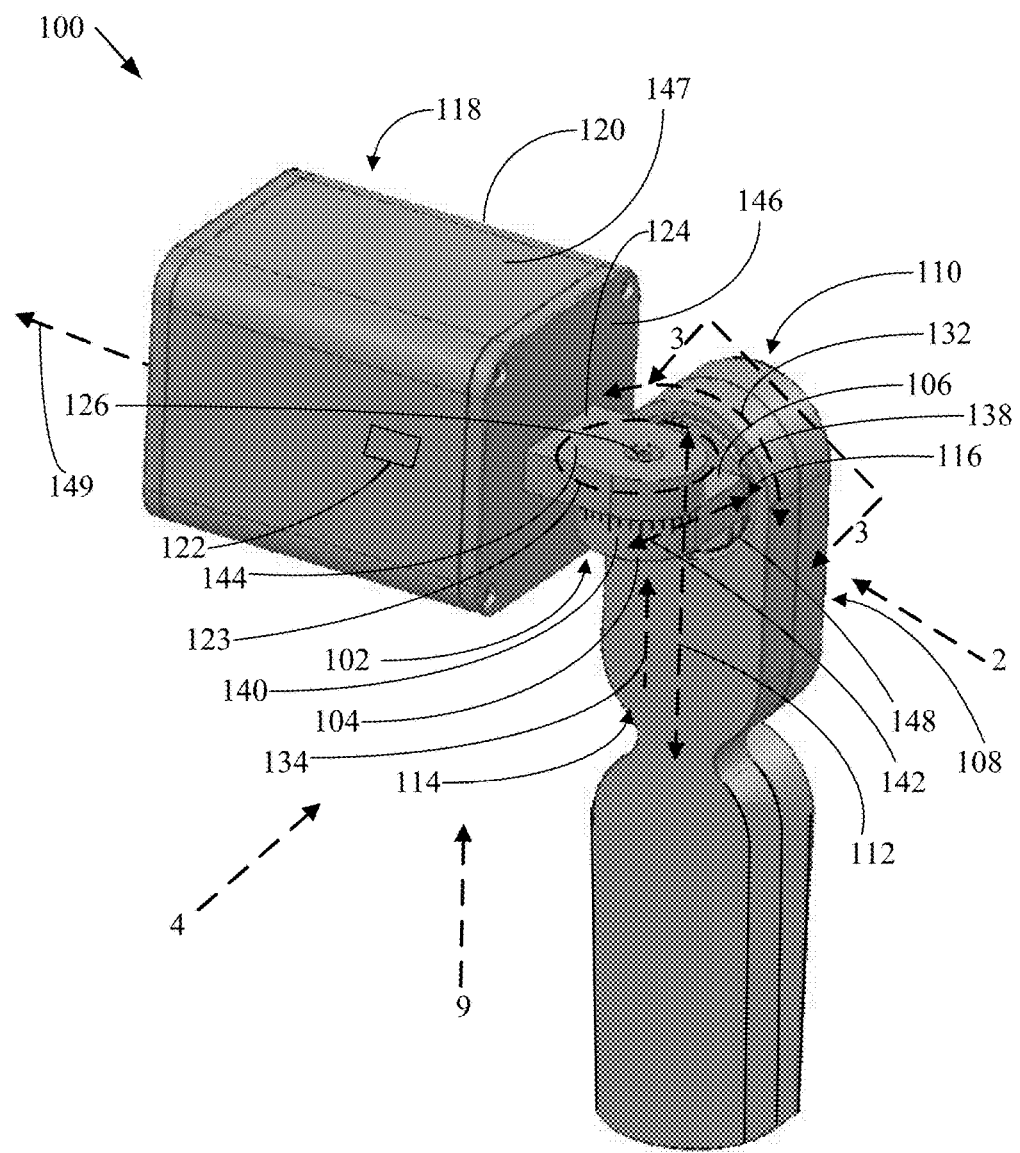
FIG. 1 is a perspective left side view showing an example [100] of an implementation of a lighting system.

Various lighting systems that utilize semiconductor light-emitting devices have been designed. Many such lighting systems exist that include mounting devices. However, existing lighting systems often have demonstrably failed to provide mounting devices that facilitate the rapid, precise, easily-executed, adjustable, and secure positioning of each of a plurality of lighting modules in independently-selectable directions.

In some examples, a lighting system accordingly is provided herein, that may include a mounting body, a lever-locking bracket, and a lighting module. In these examples of the lighting system, the mounting body has a first end being spaced apart along a longitudinal axis from a second end. The lever-locking bracket in the examples of the lighting system includes a bracket body and a lever actuator, and the lever-locking bracket is pivotally connected with the first end of the mounting body by a flange of the lever-locking bracket being retained in alignment with an aperture of the mounting body communicating with a cavity located inside the mounting body. In the examples of the lighting system, the lighting module has a housing, and has a semiconductor light-emitting device in the housing. The lighting module in the examples of the lighting system has a mounting arm being pivotally connected with the lever-locking bracket by a first pivot joint for rotation of the lighting module to a plurality of primary positions around a first pivot axis. In the examples of the lighting system, the flange of the lever-locking bracket forms a part of a second pivot joint for rotation of the lighting module to a plurality of secondary positions around a second pivot axis. The lever-locking bracket of the examples of the lighting system is configured for simultaneously locking the lighting module at a one of the primary positions and at a one of the secondary positions by a movement of the lever actuator from an unlocked position to a locked position.

The following definitions of terms, being stated as applying "throughout this specification", are hereby deemed to be incorporated throughout this specification, including but not limited to the Summary, Brief Description of the Figures, Detailed Description, and Claims.

Throughout this specification, the term "semiconductor" means: a substance, examples including a solid chemical element or compound, that can conduct electricity under some conditions but not others, making the substance a good medium for the control of electrical current.

Throughout this specification, the term "semiconductor light-emitting device" (also being abbreviated as "SLED") means: a light-emitting diode; an organic light-emitting diode; a laser diode; or any other light-emitting device having one or more layers containing inorganic and/or organic semiconductor(s). Throughout this specification, the term "light-emitting diode" (herein also referred to as an "LED") means: a two-lead semiconductor light source having an active pn-junction. As examples, an LED may include a series of semiconductor layers that may be epitaxially grown on a substrate such as, for example, a substrate that includes sapphire, silicon, silicon carbide, gallium nitride or gallium arsenide. Further, for example, one or more semiconductor p-n junctions may be formed in these epitaxial layers. When a sufficient voltage is applied across the p-n junction, for example, electrons in the n-type semiconductor layers and holes in the p-type semiconductor layers may flow toward the p-n junction. As the electrons and holes flow toward each other, some of the electrons may recombine with corresponding holes, and emit photons. The energy release is called electroluminescence, and the color of the light, which corresponds to the energy of the photons, is determined by the energy band gap of the semiconductor. As examples, a spectral power distribution of the light generated by an LED may generally depend on the particular semiconductor materials used and on the structure of the thin epitaxial layers that make up the "active region" of the device, being the area where the light is generated. As examples, an LED may have a light-emissive electroluminescent layer including an inorganic semiconductor, such as a Group III-V semiconductor, examples including: gallium nitride; silicon; silicon carbide; and zinc oxide. Throughout this specification, the term "organic light-emitting diode" (herein also referred to as an "OLED") means: an LED having a light-emissive electroluminescent layer including an organic semiconductor, such as small organic molecules or an organic polymer. It is understood throughout this specification that a semiconductor light-emitting device may include: a non-semiconductor-substrate or a semiconductor-substrate; and may include one or more electrically-conductive contact layers. Further, it is understood throughout this specification that an LED may include a substrate formed of materials such as, for example: silicon carbide; sapphire; gallium nitride; or silicon. It is additionally understood throughout this specification that a semiconductor light-emitting device may have a cathode contact on one side and an anode contact on an opposite side, or may alternatively have both contacts on the same side of the device.

Further background information regarding semiconductor light-emitting devices is provided in the following documents, the entireties of all of which hereby are incorporated by reference herein: U.S. Pat. Nos. 7,564,180; 7,456,499; 7,213,940; 7,095,056; 6,958,497; 6,853,010; 6,791,119; 6,600,175; 6,201,262; 6,187,606; 6,120,600; 5,912,477; 5,739,554; 5,631,190; 5,604,135; 5,523,589; 5,416,342; 5,393,993; 5,359,345; 5,338,944; 5,210,051; 5,027,168; 5,027,168; 4,966,862; and 4,918,497; and U.S. Patent Application Publication Nos. 2014/0225511; 2014/0078715; 2013/0241392; 2009/0184616; 2009/0080185; 2009/0050908; 2009/0050907; 2008/0308825; 2008/0198112; 2008/0179611; 2008/0173884; 2008/0121921; 2008/0012036; 2007/0253209; 2007/0223219; 2007/0170447; 2007/0158668; 2007/0139923; and 2006/0221272.

Throughout this specification, the term "spectral power distribution" means: the emission spectrum of the one or more wavelengths of light emitted by a semiconductor light-emitting device. Throughout this specification, the term "peak wavelength" means: the wavelength where the spectral power distribution of a semiconductor light-emitting device reaches its maximum value as detected by a photo-detector. As an example, an LED may be a source of nearly monochromatic light and may appear to emit light having a single color. Thus, the spectral power distribution of the light emitted by such an LED may be centered about its peak wavelength. As examples, the "width" of the spectral power distribution of an LED may be within a range of between about 10 nanometers and about 30 nanometers, where the width is measured at half the maximum illumination on each side of the emission spectrum. Throughout this specification, the term "full-width-half-maximum" ("FWHM") means: the full width of the spectral power distribution of a semiconductor light-emitting device measured at half the maximum illumination on each side of its emission spectrum. Throughout this specification, the term "half-width-half-maximum" ("HWHM") means: half of the full width of a FWHM. Throughout this specification, the term "dominant wavelength" means: the wavelength of monochromatic light that has the same apparent color as the light emitted by a semiconductor light-emitting device, as perceived by the human eye. As an example, since the human eye perceives yellow and green light better than red and blue light, and because the light emitted by a semiconductor light-emitting device may extend across a range of wavelengths, the color perceived (i.e., the dominant wavelength) may differ from the peak wavelength.

Throughout this specification, the term "luminous flux", also referred to as "luminous power", means: the measure in lumens of the perceived power of light, being adjusted to reflect the varying sensitivity of the human eye to different wavelengths of light. Throughout this specification, the term "radiant flux" means: the measure of the total power of electromagnetic radiation without being so adjusted. Throughout this specification, the term "central light emission axis" means a direction along which the light emissions of a semiconductor light-emitting device have a greatest radiant flux. It is understood throughout this specification that light emissions "along a central light emission axis" means light emissions that: include light emissions in the directions of the central light emission axis; and may further include light emissions in a plurality of other generally similar directions.

It is understood throughout this specification that "directions along a longitudinal axis" means the directions of the longitudinal axis; and may further include a plurality of other generally similar directions. It is understood throughout this specification that "directions spaced apart from directions along a longitudinal axis" means directions being similar to and spaced apart from the directions along the longitudinal axis.

It is understood throughout this specification that light emissions "along the longitudinal axis" means light emissions that: include light emissions in the directions of the longitudinal axis; and may further include light emissions in a plurality of other generally similar directions. It is understood throughout this specification that light emissions "in directions transverse to the longitudinal axis" means light emissions that: include light emissions in the directions being orthogonal to the longitudinal axis; and may further include light emissions in a plurality of other generally similar directions. It is understood throughout this specification that light emissions "in directions spaced apart from directions along the longitudinal axis" means light emissions in directions being similar to and spaced apart from the directions along the longitudinal axis. It is understood throughout this specification that light emissions "in directions spaced apart from directions transverse to the longitudinal axis" means light emissions in directions being similar to and spaced apart from the directions being transverse to the longitudinal axis.

Throughout this specification, the term "luminescent" means: characterized by absorption of electromagnetic radiation (e.g., visible light, UV light or infrared light) causing the emission of light by, as examples: fluorescence; and phosphorescence.

Throughout this specification, the term "object" means a material article or device. Throughout this specification, the term "surface" means an exterior boundary of an object. Throughout this specification, the term "incident visible light" means visible light that propagates in one or more directions towards a surface. Throughout this specification, the term "reflective surface" means a surface of an object that causes incident visible light, upon reaching the surface, to then propagate in one or more different directions away from the surface without passing through the object. Throughout this specification, the term "planar reflective surface" means a generally flat reflective surface.

Throughout this specification, the term "reflectance" means a fraction of a radiant flux of incident visible light having a specified wavelength that is caused by a reflective surface of an object to propagate in one or more different directions away from the surface without passing through the object. Throughout this specification, the term "reflected light" means the incident visible light that is caused by a reflective surface to propagate in one or more different directions away from the surface without passing through the object. Throughout this specification, the term "Lambertian reflectance" means diffuse reflectance of visible light from a surface, in which the reflected light has uniform radiant flux in all of the propagation directions. Throughout this specification, the term "specular reflectance" means mirror-like reflection of visible light from a surface, in which light from a single incident direction is reflected into a single propagation direction. Throughout this specification, the term "spectrum of reflectance values" means a spectrum of values of fractions of radiant flux of incident visible light, the values corresponding to a spectrum of wavelength values of visible light, that are caused by a reflective surface to propagate in one or more different directions away from the surface without passing through the object. Throughout this specification, the term "transmittance" means a fraction of a radiant flux of incident visible light having a specified wavelength that is permitted by a reflective surface to pass through the object having the reflective surface. Throughout this specification, the term "transmitted light" means the incident visible light that is permitted by a reflective surface to pass through the object having the reflective surface. Throughout this specification, the term "spectrum of transmittance values" means a spectrum of values of fractions of radiant flux of incident visible light, the values corresponding to a spectrum of wavelength values of visible light, that are permitted by a reflective surface to pass through the object having the reflective surface. Throughout this specification, the term "absorbance" means a fraction of a radiant flux of incident visible light having a specified wavelength that is permitted by a reflective surface to pass through the reflective surface and is absorbed by the object having the reflective surface. Throughout this specification, the term "spectrum of absorbance values" means a spectrum of values of fractions of radiant flux of incident visible light, the values corresponding to a spectrum of wavelength values of visible light, that are permitted by a reflective surface to pass through the reflective surface and are absorbed by the object having the reflective surface. Throughout this specification, it is understood that a reflective surface, or an object, may have a spectrum of reflectance values, and a spectrum of transmittance values, and a spectrum of absorbance values. The spectra of reflectance values, absorbance values, and transmittance values of a reflective surface or of an object may be measured, for example, utilizing an ultraviolet-visible-near infrared (UV-VIS-NIR) spectrophotometer. Throughout this specification, the term "visible light reflector" means an object having a reflective surface. In examples, a visible light reflector may be selected as having a reflective surface characterized by light reflections that are more Lambertian than specular.

Throughout this specification, the term "lumiphor" means: a medium that includes one or more luminescent materials being positioned to absorb light that is emitted at a first spectral power distribution by a semiconductor light-emitting device, and to re-emit light at a second spectral power distribution in the visible or ultra violet spectrum being different than the first spectral power distribution, regardless of the delay between absorption and re-emission. Lumiphors may be categorized as being down-converting, i.e., a material that converts photons to a lower energy level (longer wavelength); or up-converting, i.e., a material that converts photons to a higher energy level (shorter wavelength). As examples, a luminescent material may include: a phosphor; a quantum dot; a quantum wire; a quantum well; a photonic nanocrystal; a semiconducting nanoparticle; a scintillator; a lumiphoric ink; a lumiphoric organic dye; a day glow tape; a phosphorescent material; or a fluorescent material. Throughout this specification, the term "quantum material" means any luminescent material that includes: a quantum dot; a quantum wire; or a quantum well. Some quantum materials may absorb and emit light at spectral power distributions having narrow wavelength ranges, for example, wavelength ranges having spectral widths being within ranges of between about 25 nanometers and about 50 nanometers. In examples, two or more different quantum materials may be included in a lumiphor, such that each of the quantum materials may have a spectral power distribution for light emissions that may not overlap with a spectral power distribution for light absorption of any of the one or more other quantum materials. In these examples, cross-absorption of light emissions among the quantum materials of the lumiphor may be minimized. As examples, a lumiphor may include one or more layers or bodies that may contain one or more luminescent materials that each may be: (1) coated or sprayed directly onto an semiconductor light-emitting device; (2) coated or sprayed onto surfaces of a lens or other elements of packaging for an semiconductor light-emitting device; (3) dispersed in a matrix medium; or (4) included within a clear encapsulant (e.g., an epoxy-based or silicone-based curable resin or glass or ceramic) that may be positioned on or over an semiconductor light-emitting device. A lumiphor may include one or multiple types of luminescent materials. Other materials may also be included with a lumiphor such as, for example, fillers, diffusants, colorants, or other materials that may as examples improve the performance of or reduce the overall cost of the lumiphor. In examples where multiple types of luminescent materials may be included in a lumiphor, such materials may, as examples, be mixed together in a single layer or deposited sequentially in successive layers.

Throughout this specification, the term "volumetric lumiphor" means a lumiphor being distributed in an object having a shape including defined exterior surfaces. In some examples, a volumetric lumiphor may be formed by dispersing a lumiphor in a volume of a matrix medium having suitable spectra of visible light transmittance values and visible light absorbance values. As examples, such spectra may be affected by a thickness of the volume of the matrix medium, and by a concentration of the lumiphor being distributed in the volume of the matrix medium. In examples, the matrix medium may have a composition that includes polymers or oligomers of: a polycarbonate; a silicone; an acrylic; a glass; a polystyrene; or a polyester such as polyethylene terephthalate. Throughout this specification, the term "remotely-located lumiphor" means a lumiphor being spaced apart at a distance from and positioned to receive light that is emitted by a semiconductor light-emitting device.

Throughout this specification, the term "light-scattering particles" means small particles formed of a non-luminescent, non-wavelength-converting material. In some examples, a volumetric lumiphor may include light-scattering particles being dispersed in the volume of the matrix medium for causing some of the light emissions having the first spectral power distribution to be scattered within the volumetric lumiphor. As an example, causing some of the light emissions to be so scattered within the matrix medium may cause the luminescent materials in the volumetric lumiphor to absorb more of the light emissions having the first spectral power distribution. In examples, the light-scattering particles may include: rutile titanium dioxide; anatase titanium dioxide; barium sulfate; diamond; alumina; magnesium oxide; calcium titanate; barium titanate; strontium titanate; or barium strontium titanate. In examples, light-scattering particles may have particle sizes being within a range of about 0.01 micron (10 nanometers) and about 2.0 microns (2,000 nanometers).

In some examples, a visible light reflector may be formed by dispersing light-scattering particles having a first index of refraction in a volume of a matrix medium having a second index of refraction being suitably different from the first index of refraction for causing the volume of the matrix medium with the dispersed light-scattering particles to have suitable spectra of reflectance values, transmittance values, and absorbance values for functioning as a visible light reflector. As examples, such spectra may be affected by a thickness of the volume of the matrix medium, and by a concentration of the light-scattering particles being distributed in the volume of the matrix medium, and by physical characteristics of the light-scattering particles such as the particle sizes and shapes, and smoothness or roughness of exterior surfaces of the particles. In an example, the smaller the difference between the first and second indices of refraction, the more light-scattering particles may need to be dispersed in the volume of the matrix medium to achieve a given amount of light-scattering. As examples, the matrix medium for forming a visible light reflector may have a composition that includes polymers or oligomers of: a polycarbonate; a silicone; an acrylic; a glass; a polystyrene; or a polyester such as polyethylene terephthalate. In further examples, the light-scattering particles may include: rutile titanium dioxide; anatase titanium dioxide; barium sulfate; diamond; alumina; magnesium oxide; calcium titanate; barium titanate; strontium titanate; or barium strontium titanate. In other examples, a visible light reflector may include a reflective polymeric or metallized surface formed on a visible light—transmissive polymeric or metallic object such as, for example, a volume of a matrix medium. Additional examples of visible light reflectors may include microcellular foamed polyethylene terephthalate sheets ("MCPET"). Suitable visible light reflectors may be commercially available under the trade names White Optics® and MIRO® from WhiteOptics LLC, 243-G Quigley Blvd., New Castle, Del. 19720 USA. Suitable MCPET visible light reflectors may be commercially available from the Furukawa Electric Co., Ltd., Foamed Products Division, Tokyo, Japan. Additional suitable visible light reflectors may be commercially available from CVI Laser Optics, 200 Dorado Place SE, Albuquerque, N. Mex. 87123 USA.

In some examples, a converging or diverging lens may be formed as a volume of a matrix medium having a suitable shape for functioning as a lens. In further examples, forming a diverging lens may include dispersing light-scattering particles having a first index of refraction in a volume of a matrix medium having a second index of refraction being suitably different from the first index of refraction for causing the volume of the matrix medium with the dispersed light-scattering particles to have suitable light-scattering value for functioning as a diverging lens. As examples, the matrix medium for forming a lens may have a composition that includes polymers or oligomers of: a polycarbonate; a silicone; an acrylic; a glass; a polystyrene; or a polyester such as polyethylene terephthalate. In further examples, the light-scattering particles may include: rutile titanium dioxide; anatase titanium dioxide; barium sulfate; diamond; alumina; magnesium oxide; calcium titanate; barium titanate; strontium titanate; or barium strontium titanate.

In further examples, a volumetric lumiphor and a visible light reflector may be integrally formed. As examples, a volumetric lumiphor and a visible light reflector may be integrally formed in respective layers of a volume of a matrix medium, including a layer of the matrix medium having a dispersed lumiphor, and including another layer of the same or a different matrix medium having light-scattering particles being suitably dispersed for causing the another layer to have suitable spectra of reflectance values, transmittance values, and absorbance values for functioning as the visible light reflector. In other examples, an integrally-formed volumetric lumiphor and visible light reflector may incorporate any of the further examples of variations discussed above as to separately-formed volumetric lumiphors and visible light reflectors.

Throughout this specification, the term "phosphor" means: a material that exhibits luminescence when struck by photons. Examples of phosphors that may be utilized include: $CaAlSiN_3$:Eu, $SrAlSiN_3$:Eu, $CaAlSiN_3$:Eu, $Ba_3Si_6O_{12}N_2$:Eu, $Ba_2SiO_4$:Eu, $Sr_2SiO_4$:Eu, $Ca_2SiO_4$:Eu, $Ca_3Sc_2Si_3O_{12}$:Ce, $Ca_3Mg_2Si_3O_{12}$:Ce, $CaSc_2O_4$:Ce, $CaSi_2O_2N_2$:Eu, $SrSi_2O_2N_2$:Eu, $BaSi_2O_2N_2$:Eu, $Ca_5(PO_4)_3Cl$:Eu, $Ba_5(PO_4)_3Cl$:Eu, $Cs_2CaP_2O_7$, $Cs_2SrP_2O_7$, $SrGa_2S_4$:Eu, $Lu_3Al_5O_{12}$:Ce, $Ca_8Mg(SiO_4)_4Cl_2$:Eu, $Sr_8Mg(SiO_4)_4Cl_2$:Eu, $La_3Si_6N_{11}$:Ce, $Y_3Al_5O_{12}$:Ce, $Y_3Ga_5O_{12}$:Ce, $Gd_3Al_5O_{12}$:Ce, $Gd_3Ga_5O_{12}$:Ce, $Tb_3Al_5O_{12}$:Ce, $Tb_3Ga_5O_{12}$:Ce, $Lu_3Ga_5O_{12}$:Ce, $(SrCa)AlSiN_3$:Eu, LuAG:Ce, $(Y,Gd)_2Al_5)_{12}$:Ce, CaS:Eu, SrS:Eu, $SrGa_2S_4$:$E_4$, $Ca_2(Sc,Mg)_2SiO_{12}$:Ce, $Ca_2Sc_2Si_2)_{12}$:C2, $Ca_2Sc_2O_4$:Ce, $Ba_2Si_6O_{12}N_2$:Eu, $(Sr,Ca)AlSiN_2$:Eu, and $CaAlSiN_2$:Eu.

Throughout this specification, the term "quantum dot" means: a nanocrystal made of semiconductor materials that are small enough to exhibit quantum mechanical properties, such that its excitons are confined in all three spatial dimensions.

Throughout this specification, the term "quantum wire" means: an electrically conducting wire in which quantum effects influence the transport properties.

Throughout this specification, the term "quantum well" means: a thin layer that can confine (quasi-)particles (typically electrons or holes) in the dimension perpendicular to the layer surface, whereas the movement in the other dimensions is not restricted.

Throughout this specification, the term "photonic nanocrystal" means: a periodic optical nanostructure that affects the motion of photons, for one, two, or three dimensions, in much the same way that ionic lattices affect electrons in solids.

Throughout this specification, the term "semiconducting nanoparticle" means: a particle having a dimension within a range of between about 1 nanometer and about 100 nanometers, being formed of a semiconductor.

Throughout this specification, the term "scintillator" means: a material that fluoresces when struck by photons.

Throughout this specification, the term "lumiphoric ink" means: a liquid composition containing a luminescent material. For example, a lumiphoric ink composition may contain semiconductor nanoparticles. Examples of lumiphoric ink compositions that may be utilized are disclosed in Cao et al., U.S. Patent Application Publication No. 20130221489 published on Aug. 29, 2013, the entirety of which hereby is incorporated herein by reference.

Throughout this specification, the term "lumiphoric organic dye" means an organic dye having luminescent up-converting or down-converting activity. As an example, some perylene-based dyes may be suitable.

Throughout this specification, the term "day glow tape" means: a tape material containing a luminescent material.

Throughout this specification, the term "visible light" means light having one or more wavelengths being within a range of between about 380 nanometers and about 670 nanometers; and "visible light spectrum" means the range of wavelengths of between about 380 nanometers and about 670 nanometers.

Throughout this specification, the term "white light" means: light having a color point located at a delta(uv) of about equal to or less than 0.006 and having a CCT being within a range of between about 10000K and about 1800K (herein referred to as a "white color point."). Many different hues of light may be perceived as being "white." For example, some "white" light, such as light generated by a tungsten filament incandescent lighting device, may appear yellowish in color, while other "white" light, such as light generated by some fluorescent lighting devices, may appear more bluish in color. As examples, white light having a CCT of about 3000K may appear yellowish in color, while white light having a CCT of about equal to or greater than 8000K may appear more bluish in color and may be referred to as "cool" white light. Further, white light having a CCT of between about 2500K and about 4500K may appear reddish or yellowish in color and may be referred to as "warm" white light. "White light" includes light having a spectral power distribution of wavelengths including red, green and blue color points. In an example, a CCT of a lumiphor may be tuned by selecting one or more particular luminescent materials to be included in the lumiphor. For example, light emissions from a semiconductor light-emitting device that includes three separate emitters respectively having red, green and blue color points with an appropriate spectral power distribution may have a white color point. As another example, light perceived as being "white" may be produced by mixing light emissions from a semiconductor light-emitting device having a blue, greenish-blue or purplish-blue color point together with light emissions having a yellow color point being produced by passing some of the light emissions having the blue, greenish-blue or purplish-blue color point through a lumiphor to down-convert them into light emissions having the yellow color point. General background information on systems, devices and processes for generating light perceived as being "white" is provided in "Class A Color Designation for Light Sources Used in General Illumination", Freyssinier and Rea, *J. Light & Vis. Env.*, Vol. 37, No. 2 & 3 (Nov. 7, 2013, Illuminating Engineering Institute of Japan), pp. 10-14; the entirety of which hereby is incorporated herein by reference.

Throughout this specification, the term "in contact with" means: that a first object, being "in contact with" a second object, is in either direct or indirect contact with the second object. Throughout this specification, the term "in indirect contact with" means: that the first object is not in direct contact with the second object, but instead that there are a plurality of objects (including the first and second objects), and each of the plurality of objects is in direct contact with at least one other of the plurality of objects (e.g., the first and second objects are in a stack and are separated by one or more intervening layers). Throughout this specification, the term "in direct contact with" means: that the first object, which is "in direct contact" with a second object, is touching the second object and there are no intervening objects between at least portions of both the first and second objects.

Throughout this specification, the term "spectrophotometer" means: an apparatus that can measure a light beam's intensity as a function of its wavelength and calculate its total luminous flux.

Throughout this specification, the term "integrating sphere—spectrophotometer" means: a spectrophotometer operationally connected with an integrating sphere. An integrating sphere (also known as an Ulbricht sphere) is an optical component having a hollow spherical cavity with its interior covered with a diffuse white reflective coating, with small holes for entrance and exit ports. Its relevant property is a uniform scattering or diffusing effect. Light rays incident on any point on the inner surface are, by multiple scattering reflections, distributed equally to all other points. The effects of the original direction of light are minimized. An integrating sphere may be thought of as a diffuser which preserves power but destroys spatial information. Another type of integrating sphere that can be utilized is referred to as a focusing or Coblentz sphere. A Coblentz sphere has a mirror-like (specular) inner surface rather than a diffuse inner surface. Light scattered by the interior of an integrating sphere is evenly distributed over all angles. The total power (radiant flux) of a light source can then be measured without inaccuracy caused by the directional characteristics of the source. Background information on integrating sphere—spectrophotometer apparatus is provided in Liu et al., U.S. Pat. No. 7,532,324 issued on May 12, 2009, the entirety of which hereby is incorporated herein by reference. It is understood throughout this specification that color points may be measured, for example, by utilizing a spectrophotometer, such as an integrating sphere—spectrophotometer. The spectra of reflectance values, absorbance values, and transmittance values of a reflective surface or of an object may be measured, for example, utilizing an ultraviolet-visible-near infrared (UV-VIS-NIR) spectrophotometer.

Throughout this specification, the term "lenticular features" means: an array of semicircular convex lenses ("lenticles") on a surface, being arranged as a sinusoidal series of mutually parallel ridges between troughs, forming a series of "lenticular toroidal lenses." Background information on lenticular toroidal lenses and lenticular features is provided in Seo U.S. Pat. No. 8,503,083 issued on Aug. 6, 2013, the entirety of which hereby is incorporated herein by reference.

Throughout this specification, the term "microprismatic features" means an array of small, equally-spaced multifaceted prisms being arranged in a regular array forming a "microprismatic lens" on a surface. Background information on microprismatic lenses is provided in Pakhchyan U.S. Patent Application Publication No. 2011/0292483A1 published on Dec. 1, 2011, the entirety of which hereby is incorporated herein by reference.

Throughout this specification, the term "upward direction" means a direction illustrated as being upward, as indicated by an arrow shown in a Figure herein, being upward relative to an object shown in the Figure. Throughout this specification, the term "downward direction" means a direction illustrated as being downward, as indicated by an arrow shown in a Figure herein, being downward relative to an object shown in the Figure. It is understood that the terms "upward direction" and "downward direction" are relative terms defined by the corresponding arrows illustrated in the Figures as indicating such directions; and that the lighting systems illustrated in the Figures may be oriented in other directions.

Throughout this specification, the term "aperture" means an opening in a surface of an object, which forms a cavity in the object, and which may also form a passageway through the object communicating with the opening and with another opening in another surface of the object.

Throughout this specification, the term "configured" means "set up for operation especially in a particular way."

It is understood throughout this specification that numbering of the names of elements as being "first", "second" etcetera, is solely for purposes of clarity in referring to such elements in connection with various examples of lighting systems.

Figure 2:
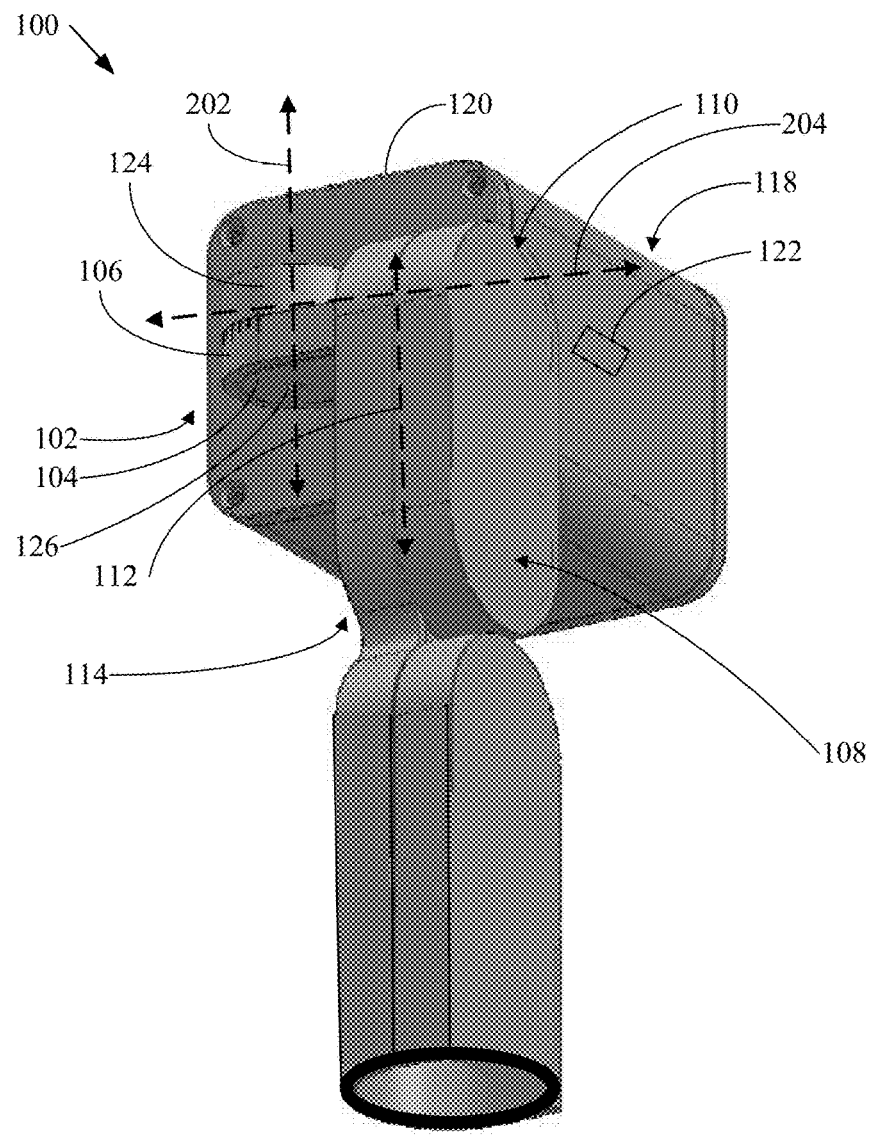
FIG. 2 is a perspective right side view taken along the line [2], showing the example of the lighting system.
Figure 3:
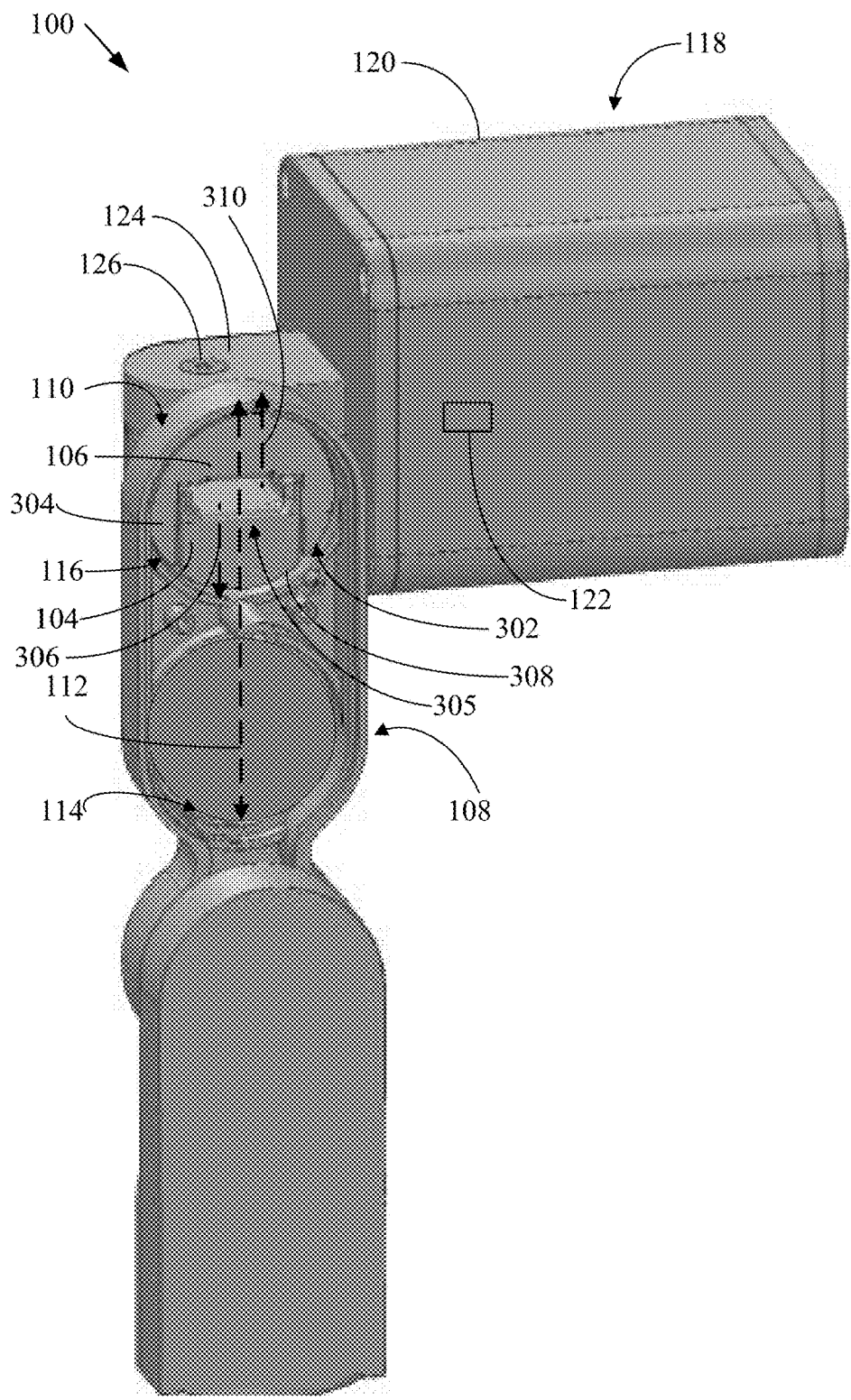
FIG. 3 is a cross-sectional side view taken along the line [3-3], showing the example of the lighting system.
Figure 4A:
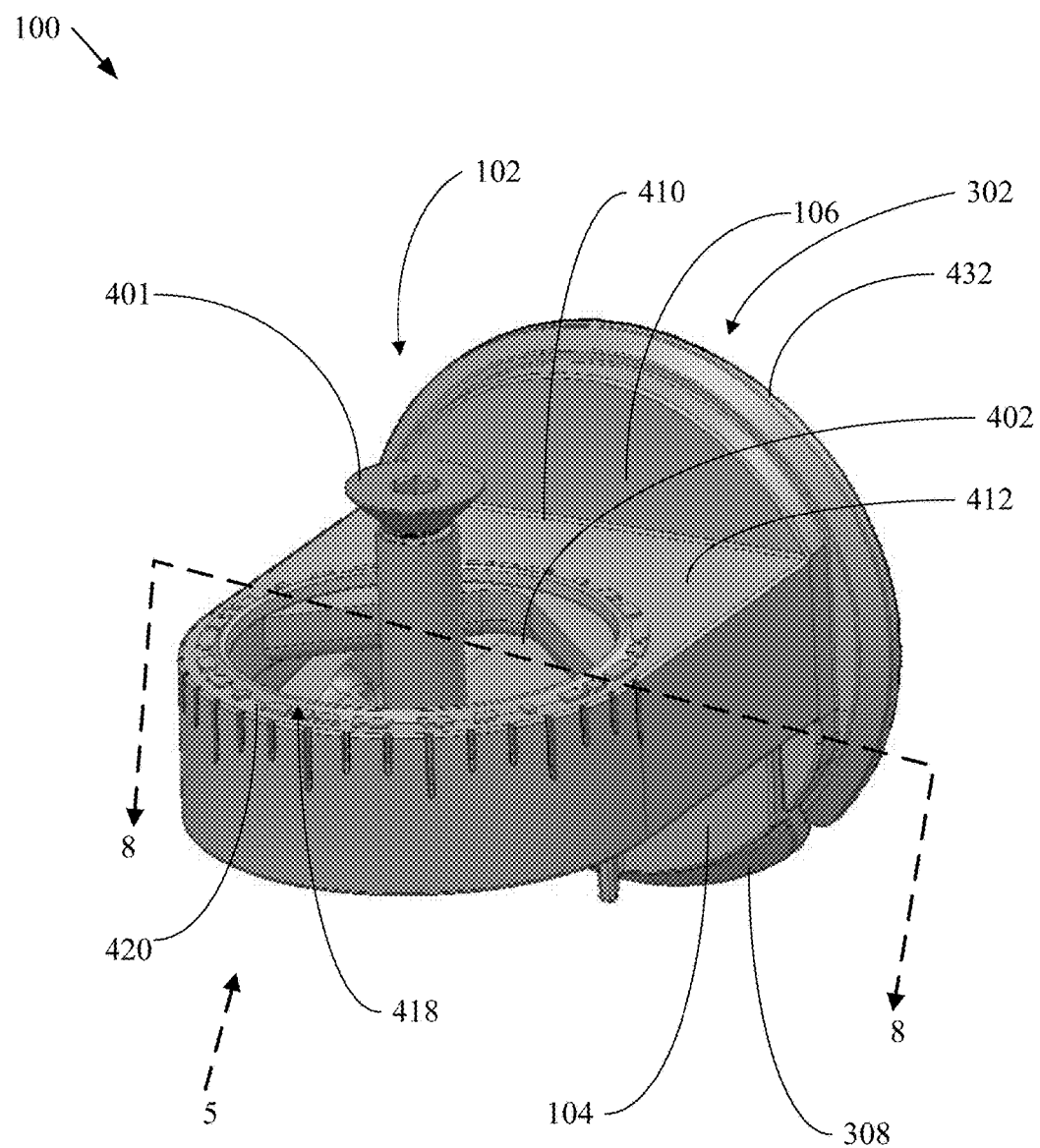
FIG. 4A is a perspective right side view taken along the line [4], showing a lever-locking bracket [102] of the example [100] of the lighting system.
Figure 4B:
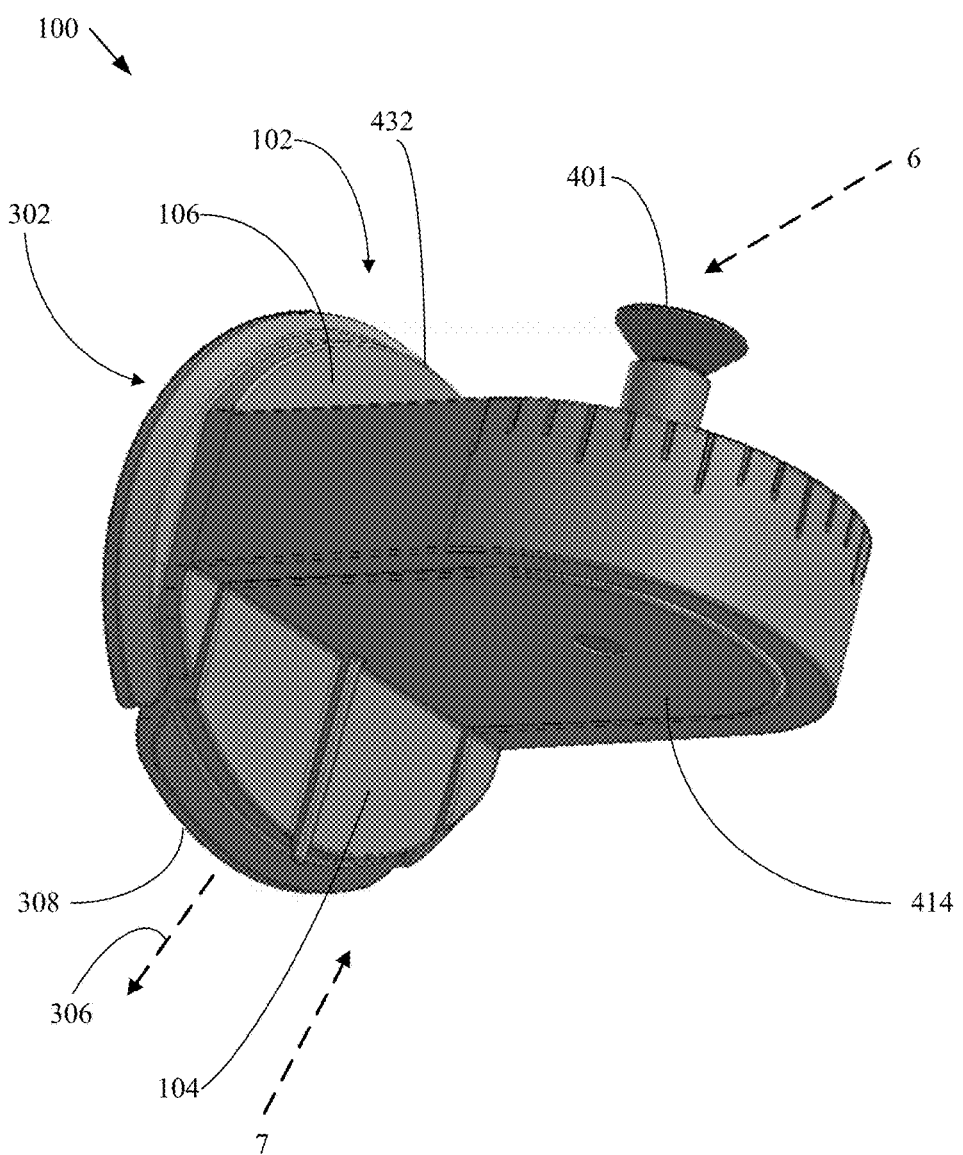
FIG. 4B is a perspective left side view taken along the line [5], showing the lever-locking bracket [102] of the example [100] of the lighting system.
Figure 4C:
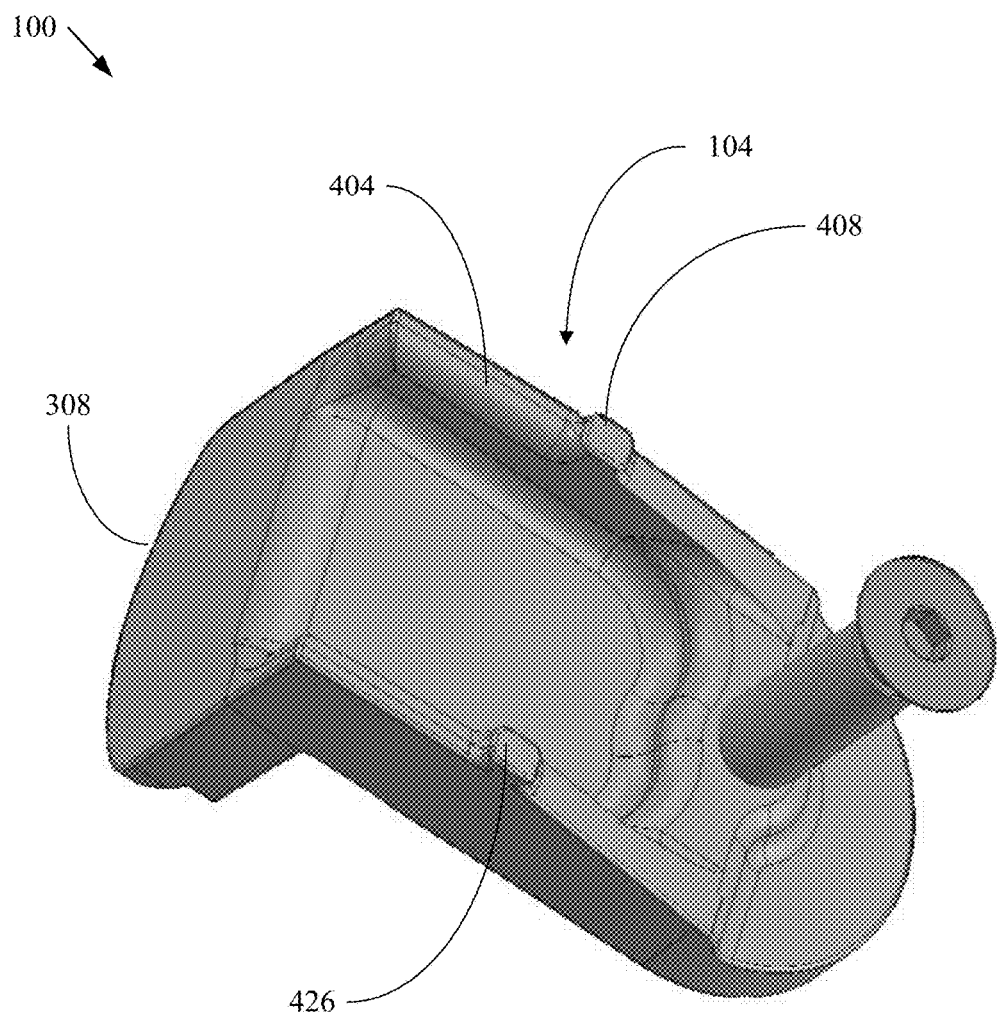
FIG. 4C is a perspective view taken along the line [6], showing a lever actuator [104] of the lever-locking bracket [102] of the example [100] of the lighting system.
Figure 4D:
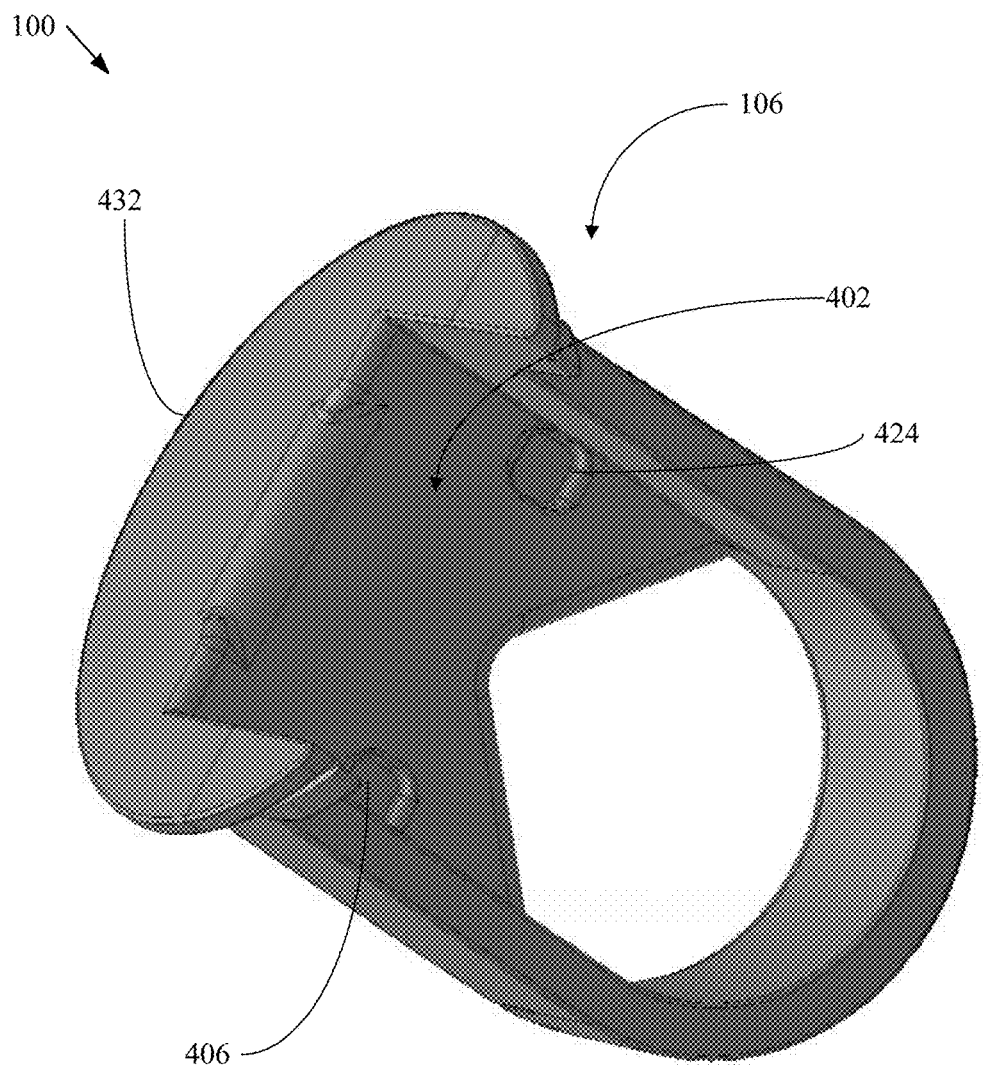
FIG. 4D is a perspective view taken along the line [7], showing a bracket body [106] of the lever-locking bracket [102] of the example [100] of the lighting system.
Figure 4E:
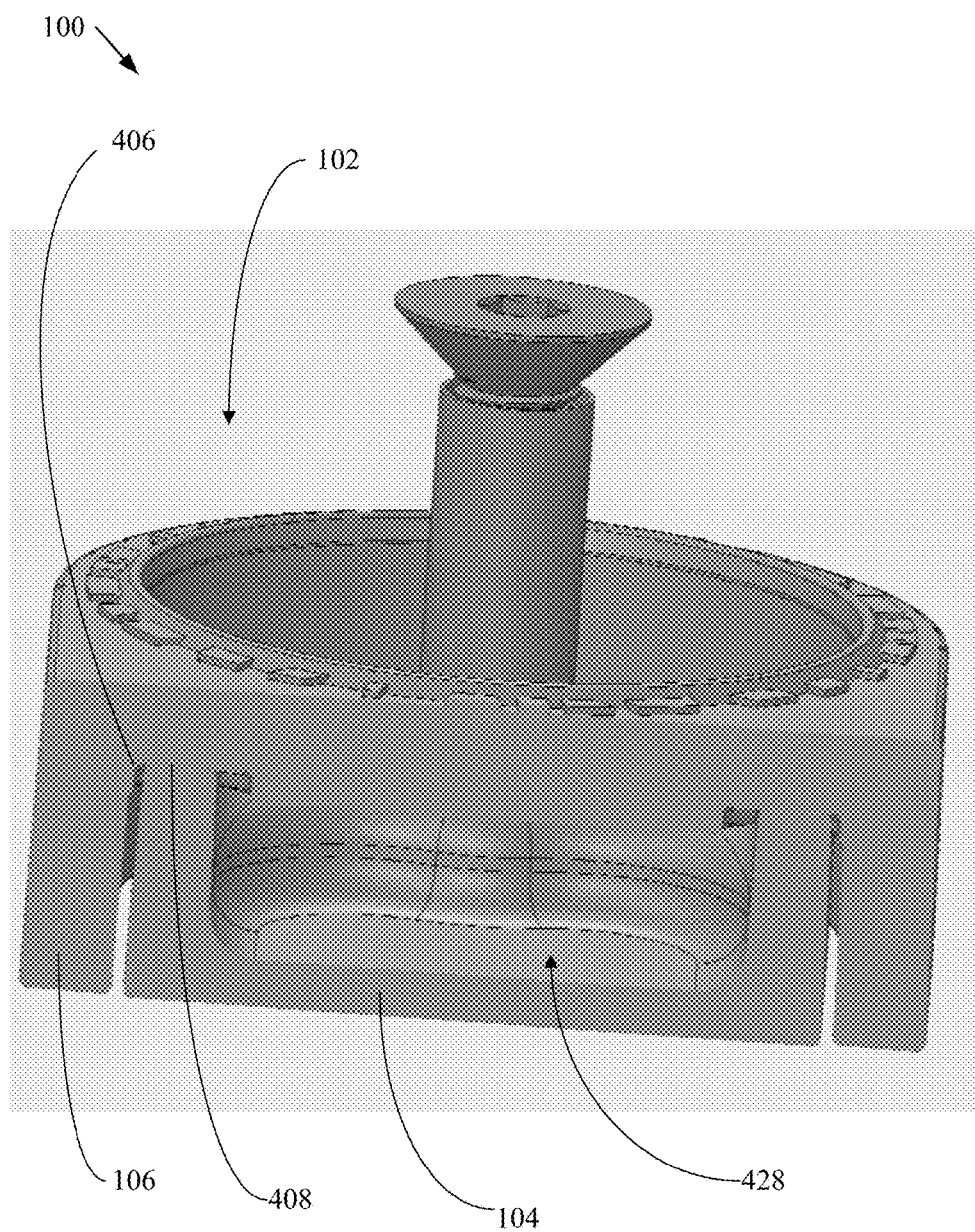
FIG. 4E is a cross-sectional view taken along line [8-8] of the lever-locking bracket [102].
Figure 4F:
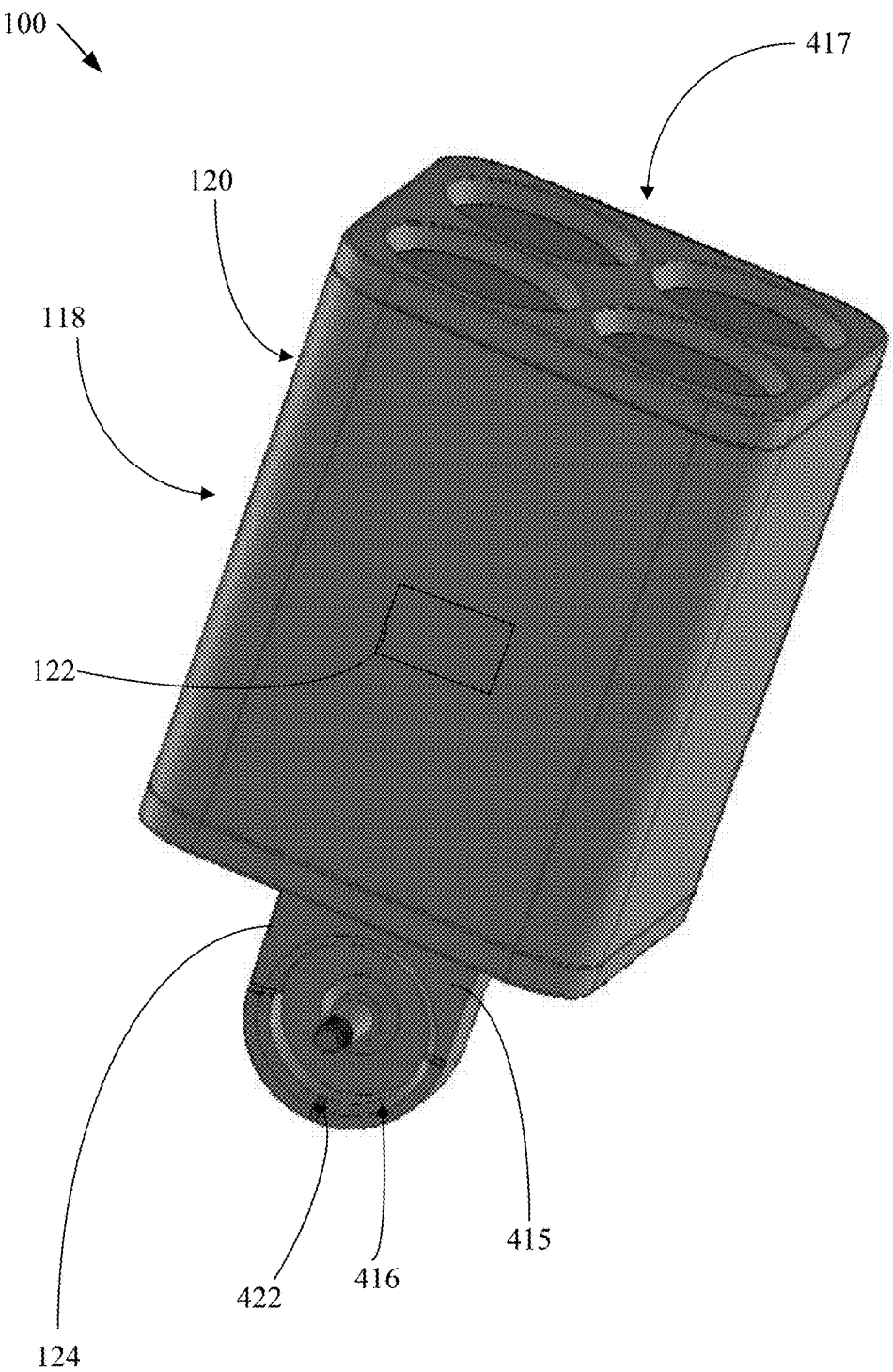
FIG. 4F is a perspective view taken along the line [9], showing the lighting module and the mounting arm [124] of the example [100] of the lighting system.

FIG. 1 is a perspective left side view showing an example [100] of an implementation of a lighting system. FIG. 2 is a perspective right side view taken along the line [2], showing the example [100] of the lighting system. FIG. 3 is a cross-sectional side view taken along the line [3-3], showing the example [100] of the lighting system. FIG. 4A is a perspective right side view taken along the line [4], showing a lever-locking bracket [102] of the example [100] of the lighting system. FIG. 4B is a perspective left side view taken along the line [5], showing the lever-locking bracket [102] of the example [100] of the lighting system. FIG. 4C is a perspective view taken along the line [6], showing a lever actuator [104] of the lever-locking bracket [102] of the example [100] of the lighting system. FIG. 4D is a perspective view taken along the line [7], showing a bracket body [106] of the lever-locking bracket [102] of the example [100] of the lighting system. FIG. 4E is a cross-sectional view taken along line [8-8] of the lever-locking bracket [102]. FIG. 4F is a perspective view taken along the line [9], showing the lighting module [118] and the mounting arm [124] of the example [100] of the lighting system. FIGS. 4G and 4H are perspective views showing two examples of retainers for the lever-locking bracket [102] of the example [100] of the lighting system. It is understood throughout this specification that an example [100] of a lighting system may include any combination of the features that are discussed herein in connection with the examples [100], [500], [800], [1100], [1500] of lighting systems. Accordingly, the entireties of the discussions herein of the other examples [500], [800], [1100], [1500] of lighting systems are hereby incorporated in this discussion of the examples of the lighting systems.

As shown in FIGS. 1, 2, 3, 4A, 4B, 4C, 4D, 4E, 4F, 4G and 4H, the example [100] of the implementation of the lighting system includes a mounting body [108] having a first end [110] being spaced apart along a longitudinal axis [112] from a second end [114]. The example [100] of the implementation of the lighting system also includes a lever-locking bracket [102] including a bracket body [106] and a lever actuator [104]. In the example [100] of the implementation of the lighting system, the lever-locking bracket [102] is pivotally connected with the first end [110] of the mounting body [108] by a flange [302] of the lever-locking bracket [102] being retained in alignment with an aperture [116] of the mounting body [108] communicating with a cavity [304] located inside the mounting body [108]. The example [100] of the implementation of the lighting system further includes a lighting module [118] having a housing [120] and having a semiconductor light-emitting device [122] in the housing [120]. In the example [100] of the implementation of the lighting system, the lighting module [118] has a mounting arm [124] being pivotally connected with the lever-locking bracket [102] by a first pivot joint [126] for rotation of the lighting module [118] to a plurality of primary positions being represented by a dashed curve [123] around a first pivot axis being represented by a dashed line [202]. Additionally in the example [100] of the implementation of the lighting system, the flange [302] of the lever-locking bracket [102] forms a part of a second pivot joint [305] for rotation of the lighting module [118] to a plurality of secondary positions being represented by a dashed curve [132] around a second pivot axis being represented by a dashed line [204]. In the example [100] of the implementation of the lighting system, the lever-locking bracket [102] is configured for simultaneously locking the lighting module [118] at a one of the primary positions [123] and at a one of the secondary positions [132] by a movement of the lever actuator [104] from an unlocked position to a locked position.

In the example [100] of the implementation of the lighting system, the lever-locking bracket [102] may, for example, simultaneously lock the lighting module [118] at a one of the primary positions [123] and at a one of the secondary positions [132] by being configured for a movement of the lever actuator [104] in a direction being represented by an arrow [134]. For example in the example [100] of the lighting system, the movement of the lever actuator [104] in the direction of the arrow [134] may frictionally lock the lever-locking bracket [102] together with the mounting arm [124] at a one of the primary positions [123]. Further for example, in the example [100] of the lighting system, the movement of the lever actuator [104] in the direction of the arrow [134] may cause a displacement, in a direction being represented by an arrow [306], of a portion [308] of the flange [302] attached to the lever actuator [104]. As an example in the example [100] of the lighting system, the displacement of the portion [308] of the flange [302] in the direction of the arrow [306] may frictionally lock the lever-locking bracket [102] together with the aperture [116] of the mounting body [108] at a one of the secondary positions [132]. As examples, in the example [100] of the lighting system, the lever-locking bracket [102] and the mounting arm [124] may be attached together at the first pivot joint [126] by a fastener [401], such as a threaded bolt, forming the first pivot axis [202]. Further for example, in the example [100] of the lighting system, tightening the fastener [401] may place the lever-locking bracket [102] and the mounting arm [124] under compression along the first pivot axis [202], which compression simultaneously may frictionally lock the lever-locking bracket [102] together with the mounting arm [124] at a one of the primary positions [123];

and together with the aperture [116] of the mounting body [108] at a one of the secondary positions [132].

In examples of the example [100] of the lighting system, the first pivot axis [202] may define a first degree of freedom of movement of the lighting module [118], and the second pivot axis [204] may define a second degree of freedom of movement of the lighting module [118]. Further in examples of the example [100] of the lighting system, the first pivot axis [202] may be about orthogonal to, or orthogonal to, or at another angle of intersection with, the second pivot axis [204]. As examples of the example [100] of the lighting system, the lever-locking bracket [102] may include a cavity [402] located inside the bracket body [106]. In further examples [100] of the lighting system, the lever-locking bracket [102] may include a lever [404] located inside the cavity [402] of the bracket body [106]. As examples of the example [100] of the lighting system, the lever [404] may be integrated with the lever actuator [104]. For example, in examples of the example [100] of the lighting system, the bracket body [106] may include a lever notch [406] being located inside the cavity [402] of the bracket body [106]. In examples of the example [100] of the lighting system, the lever [404] may include a projecting leverage point [408] being in pivotal contact with the lever notch [406] of the bracket body [106]. As further examples of the example [100] of the lighting system, the lever-locking bracket [102] may include another lever (not shown) being located inside the cavity [402] of the bracket body [106], the lever [404] and the another lever being in mutual pivotal contact inside the cavity [402] of the bracket body [106]. In examples of the example [100] of the lighting system, the lever [404] may include the projecting leverage point [408], and the another lever may include a projecting lever notch (not shown) reaching across a portion of the cavity [402] toward the projecting leverage point [408] in substitution for the lever notch [406], and the projecting leverage point [408] may be in pivotal contact with the projecting lever notch. As further examples of the example [100] of the lighting system, the lever [404] may include a projecting lever notch (not shown) in substitution for the projecting leverage point [408], and the another lever (not shown) may include a projecting leverage point (not shown) in substitution for the lever notch [406] and reaching across a portion of the cavity [402] toward the projecting lever notch; and the projecting leverage point may be in pivotal contact with the projecting lever notch.

As examples of the example [100] of the lighting system, the flange [302] of the lever-locking bracket [102] may be located at a first end [138] of the lever-locking bracket [102], and the lever-locking bracket [102] may have a second end [140] being spaced apart along another longitudinal axis represented by a dashed line [142] extending away from the mounting body [108]. In examples of the example [100] of the lighting system, the lever-locking bracket [102] may have an arch shape as shown in FIGS. 1, 4A, 4B, 4C and 4D, and the flange [302] of the lever-locking bracket [102] may form a base [410] of the arch shape. As an example of the example [100] of the lighting system, the arch shape of the lever-locking bracket [102] may be a round arch as shown in FIGS. 1, 4A, 4B, 4C and 4D. In examples (not shown) of the example [100] of the lighting system, the arch shape of the lever-locking bracket [102] may be another type of an arch, such as an elliptical arch, a three-centered arch, a segmental arch, a horseshoe arch, or a pinched arch. As examples of the example [100] of the lighting system, the lever-locking bracket [102] may have two spaced-apart mutually-opposing arched sides [412], [414], each having the arch shape. In further examples of the example [100] of the lighting system, the mounting arm [124] may have another arch shape as shown in FIGS. 1 and 2, and the mounting arm [124] may have two spaced-apart mutually-opposing arched sides [144], [415] each having the another arch shape. As examples of the example [100] of the lighting system, a one [412] of the arched sides of the lever-locking bracket [102] may be pivotally connected with and aligned for rotation around the first pivot axis [202] relative to a one [415] of the arched sides of the mounting arm [124]. In examples of the example [100] of the lighting system, the lever-locking bracket [102] may include the cavity [402] located inside the bracket body [106]. As examples of the example [100] of the lighting system, the lever actuator [104] may form another one [414] of the arched sides of the lever-locking bracket [102]; and the bracket body [106] and the another one [414] of the arched sides of the lever-locking bracket [102] may cooperatively enclose the cavity [402] of the bracket body [106]. In further examples of the example [100] of the lighting system, the mounting arm [124] may have an aperture [416] in the one [415] of the arched sides of the mounting arm [124], being in communication at the first pivot joint [126] with an aperture [418] in the one [412] of the arched sides of the lever-locking bracket [102]. The examples of the example [100] of the lighting system may include, in further examples, the fastener [401] as forming the first pivot axis [202], the fastener [401] extending through the aperture [416] in the one [415] of the arched sides of the mounting arm [124] and through the aperture [418] in the one [412] of the arched sides of the lever-locking bracket [102]. In examples of the example [100] of the lighting system, the fastener [401] may be configured for causing the lever-locking bracket [102] to be placed under compression with the mounting arm [124] along the first pivot axis [202]. As examples of the example [100] of the lighting system, the fastener [401] may be configured for causing the movement of the lever actuator [104] in the direction of the arrow [134] from the unlocked position to the locked position while simultaneously causing the one [412] of the arched sides of the lever-locking bracket [102] to be frictionally locked together with the one [415] of the arched sides of the mounting arm [124]. Further in examples of the example [100] of the lighting system, the lever-locking bracket [102] may include raised bumps [420] being on and arranged around the aperture [418] of the one [412] of the arched sides of the lever-locking bracket [102], and the mounting arm [124] may include further raised bumps [422] being on and arranged around the aperture [416] of the one [415] of the arched sides of the mounting arm [124]. As examples of the example [100] of the lighting system, the raised bumps [420] and the further raised bumps [422] may collectively cause the lever-locking bracket [102] to be frictionally locked together with the mounting arm [124] when the lever actuator [104] is in the locked position; and the raised bumps [420] and the further raised bumps [422] may collectively permit the lighting module [118] to be rotated around the first pivot axis [202] when the lever actuator [104] is in the unlocked position. In examples of the example [100] of the lighting system, the mounting arm [124] may include a threaded receptacle (not shown) within the aperture [416]; and the fastener [401] may be a bolt connected to the lever-locking bracket [102] and having a threaded shank (not shown) pivotally located along the first pivot axis [202] in the threaded receptacle. For example, the fastener [401] may be turned on the first pivot axis [202] to drive the threaded shank into the threaded receptacle, causing the lever-locking bracket [102] to be compressed along directions of the first pivot axis together with the mounting arm [124]. As examples, the fastener [401] may be a threaded bolt, a threaded machine screw, or the like. In examples of the example [100] of the lighting system, the lever-locking bracket [102] may include a threaded receptacle (not shown) within the aperture [418]; and the fastener [401] may be a bolt connected to the mounting arm [124] and having a threaded shank (not shown) pivotally located along the first pivot axis [202] in the threaded receptacle. In examples of the example [100] of the lighting system, the housing [120] may include a light emission aperture [417], and the housing [120] may include a back plate [146] being spaced apart by a side wall [147] along a central light emission axis being represented by an arrow [149]. As further examples of the example [100] of the lighting system, the housing [120] may include a lens (not shown). Additionally, for example, the housing [120] may include further optical components (not shown), such as a lens carrier and a primary reflector. In some examples [100] of the lighting system, the side wall [147] may have a shape, which may as examples include: a cylindrical shape; a spherical shape; a bullet shape; a frusto-conical shape; an ellipsoid shape, or a polyhedron shape such as a cube or a prism; and in some examples, the prism may include a rectangular prism; a pentagonal prism; or a hexagonal prism.

In examples of the example [100] of the lighting system, the lever-locking bracket [102] may include the lever [404] located inside the cavity [402] of the bracket body [106]. As examples of the example [100] of the lighting system, the lever [404] may be integrated with the lever actuator [104]. As examples of the example [100] of the lighting system, the bracket body [106] may include the lever notch [406] being located inside the cavity [402] of the bracket body [106]; and the lever [404] may include the projecting leverage point [408] being in pivotal contact with the lever notch [406]. Further, in examples of the example [100] of the lighting system, the bracket body [106] may include two spaced-apart lever notches [406], [424] being located inside the cavity [402] of the bracket body [106]; and the lever [404] may include two spaced-apart projecting leverage points [408], [426]. In examples of the example [100] of the lighting system, a one [408] of the projecting leverage points may be in pivotal contact with a one [406] of the lever notches, and another one [426] of the projecting leverage points may be in pivotal contact (not shown) with another one [424] of the lever notches. As examples of the example [100] of the lighting system, the cavity [402] of the bracket body [106] may have an aperture [428] being in communication with the cavity [304] of the mounting body [108]. In further examples of the example [100] of the lighting system, the lighting module [118] may have an aperture (not shown) located in the backplate [146] and being in communication with a passageway (not shown) of the mounting arm [124]; and the passageway of the mounting arm [124] may be in communication with the aperture [416] in the one [415] of the arched sides of the mounting arm [124]. As examples, the example [100] of the lighting system may include an electrical conductor (not shown) passing from the cavity [304] of the mounting body [108] into the cavity [402] of the bracket body [106], and passing from the cavity [402] of the bracket body [106] into the passageway of the mounting arm [124], and passing from the passageway of the mounting arm [124] into the lighting module [118].

In examples of the example [100] of the lighting system, the bracket body [106] may include the portion [432] of the flange [302] of the lever-locking bracket [102], and the lever actuator [104] may include another portion [308] of the flange [302] of the lever-locking bracket [102]. As examples of the example [100] of the lighting system, the portion [308] of the flange [302] of the lever-locking bracket [102] may reach a first distance being represented by an arrow [310] away from the second pivot axis [204] and the another portion [432] of the flange [302] of the lever-locking bracket [102] may reach a second distance being represented by an arrow [306] away from the second pivot axis [204]; and the first distance [310] may be about the same as the second distance [306] when the lever actuator [104] is in the unlocked position. As additional examples of the example [100] of the lighting system, the movement of the lever actuator [104] in the direction of the arrow [134] from the unlocked position to the locked position may cause a displacement of the another portion [308] of the flange [302] of the lever-locking bracket [102] farther away from the second pivot axis [204], so that the second distance [306] may be larger than the first distance [310] when the lever actuator [104] is in the locked position. In an example of the example [100] of the lighting system, the flange [302] of the lever-locking bracket [102] may be located inside the mounting body [108]. As another example of the example [100] of the lighting system, the aperture [116] of the mounting body [108] may have an edge [148] reaching another distance away from the second pivot axis [204], and the another distance may be smaller than the first distance [310] reached by the portion [342] of the flange [302] of the lever-locking bracket [102], and the flange [302] of the lever-locking bracket [102] may be retained inside the cavity [304] of the mounting body [108] by the edge [148] of the aperture [116] of the mounting body [108]. In examples of the example [100] of the lighting system, the flange [302] of the lever-locking bracket [102] may be frictionally locked together with the mounting body [108] when the lever actuator [104] is in the locked position.

In examples, the example [100] of the lighting system may further include a bracket retainer [460] located inside the cavity [304] of the mounting body [108], the bracket retainer [406] encircling a portion of the aperture [116] of the mounting body [108] and being in contact with a portion of the flange [302] of the lever-locking bracket [102]. As further examples of the example [100] of the lighting system, another bracket retainer [462] may be substituted for the bracket retainer [460], having a side [464] encircling the aperture [116] of the mounting body [108] and being in contact with a portion of the flange [302] of the lever-locking bracket [102]. In examples of the example [100] of the lighting system, the bracket retainer [462] may have a flange [466]; and the flange [466] of the bracket retainer [462] may encircle the flange [302] of the lever-locking bracket [102]; and the bracket retainer [462] may maintain the lever-locking bracket [102] in alignment with the second pivot axis [204].

As examples of the example [100] of the lighting system, the lever-locking bracket [102] may have the two spaced-apart mutually-opposing arched sides [412], [414], each having the arch shape. Further in these examples of the example [100] of the lighting system, the lever-locking bracket [102] may include another lever actuator (not shown) in substitution for the arched side [412], the lever actuator [104] and the another lever actuator being held in mutually opposing positions by the bracket body [106]. In examples of the example [100] of the lighting system, the lever-locking bracket [102] may include another lever located inside the cavity [402] of the bracket body [106], and the another lever may be integrated with the another lever actuator. As examples of the example [100] of the lighting system, the lever [404] and the another lever may be in mutual pivotal contact inside the cavity [402] of the bracket body [106]. In examples of the example [100] of the lighting system, the bracket body [106] may include a portion [342] of the flange [302] of the lever-locking bracket [102], and the lever actuator [104] may include another portion [308] of the flange [302] of the lever-locking bracket [102], and the another lever actuator may include a further portion (not shown) of the flange [302] of the lever-locking bracket [102]. In examples of the example [100] of the lighting system, the portion [432] of the flange [302] of the lever-locking bracket [102] may reach the first distance [310] away from the second pivot axis [204], and the another portion [308] of the flange [302] of the lever-locking bracket [102] may reach the second distance [306] away from the second pivot axis [204], and the further portion of the flange [302] of the lever-locking bracket [102] may reach a third distance (not shown) away from the second pivot axis [204]; and each one of the first [310], second [306] and third distances may be about the same when the lever actuator [104] is in the unlocked position and the another lever actuator is in another unlocked position. As further examples of the example [100] of the lighting system, the movement of the lever actuator [104] from the unlocked position to the locked position and a movement of the another lever actuator from the another unlocked position to another locked position may cause displacements of the another portion of the flange [302] of the lever-locking bracket [102] and of the further portion of the flange of the lever-locking bracket [302] farther away from the second pivot axis [204], so that each one of the second [306] and third distances may be larger than the first distance [310] when the lever actuator [104] is in the locked position and the another lever actuator is in the another locked position. In examples of the example [100] of the lighting system, the flange [302] of the lever-locking bracket [102] may be located inside the mounting body [108]. As additional examples of the example [100] of the lighting system, the aperture [116] of the mounting body [108] may have the edge [148] reaching another distance away from the second pivot axis [204], and the another distance may be smaller than the first distance [310] reached by the portion [342] of the flange [302] of the lever-locking bracket [102], and the flange [302] of the lever-locking bracket [102] may be retained inside the cavity [304] of the mounting body [108] by the edge [148] of the aperture [116] of the mounting body [108]. In examples of the example [100] of the lighting system, the flange [302] of the lever-locking bracket [102] may be frictionally locked together with the mounting body [108] when the lever actuator [104] is in the locked position and the another lever actuator is in the another locked position. As examples, the example [100] of the lighting system may further include the bracket retainer [460], [462] located inside the cavity [304] of the mounting body [108]. In examples of the example [100] of the lighting system, the bracket retainer [460], [462] may be in contact with a portion of the flange [302] of the lever-locking bracket [102], and may: encircle a portion of the aperture [116] of the mounting body [108]; or may have a side [434] encircling the aperture [116] of the mounting body [108]. As examples of the example [100] of the lighting system, the bracket retainer [462] may have a flange [466], and the flange [466] of the bracket retainer [460] may encircle the flange [302] of the lever-locking bracket [102], and the bracket retainer [460] may maintain the lever-locking bracket [102] in alignment with the second pivot axis [204].

Figure 5:
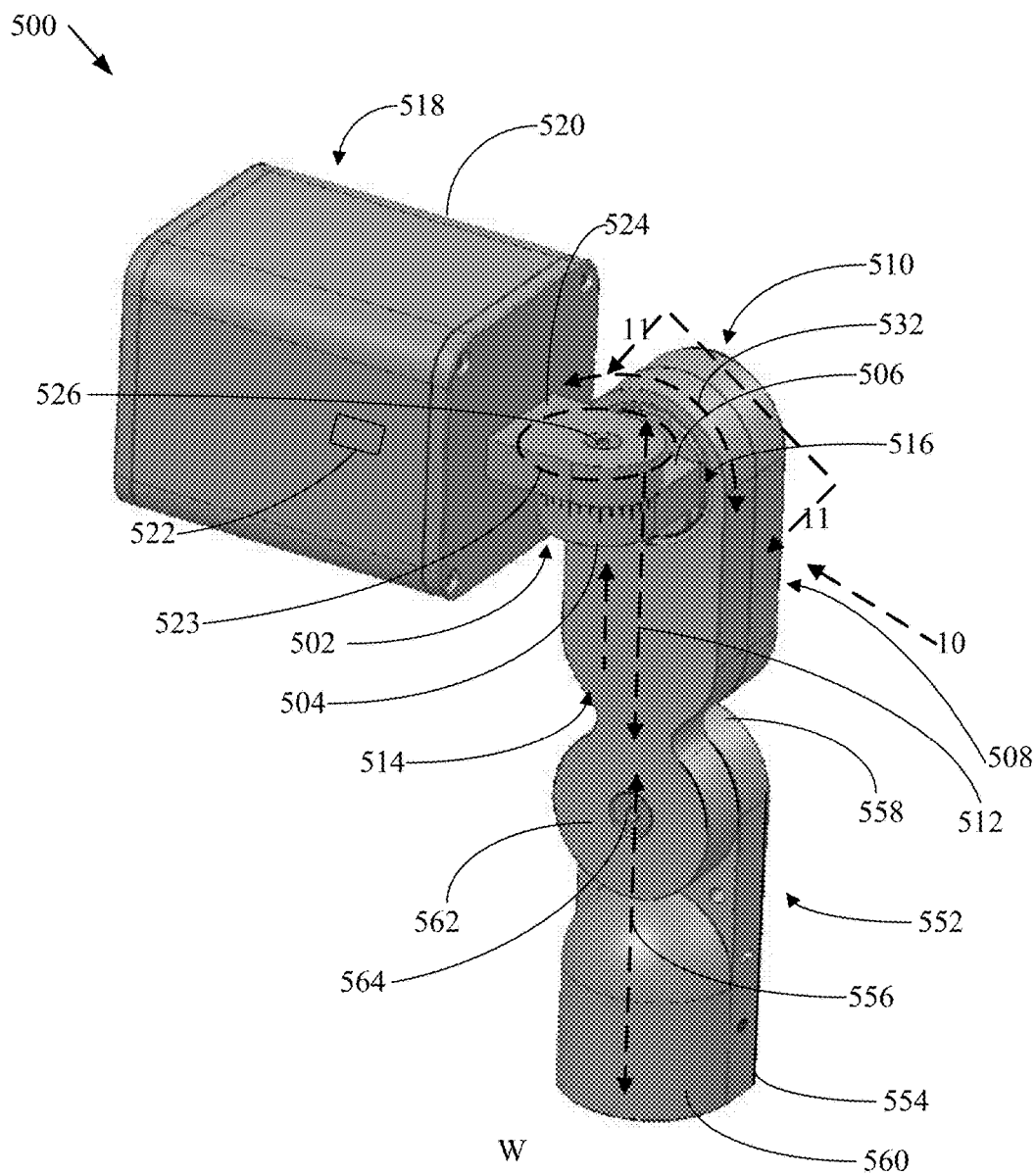
FIG. 5 is a perspective left side view showing an example [500] of an implementation of a lighting system.
Figure 6:
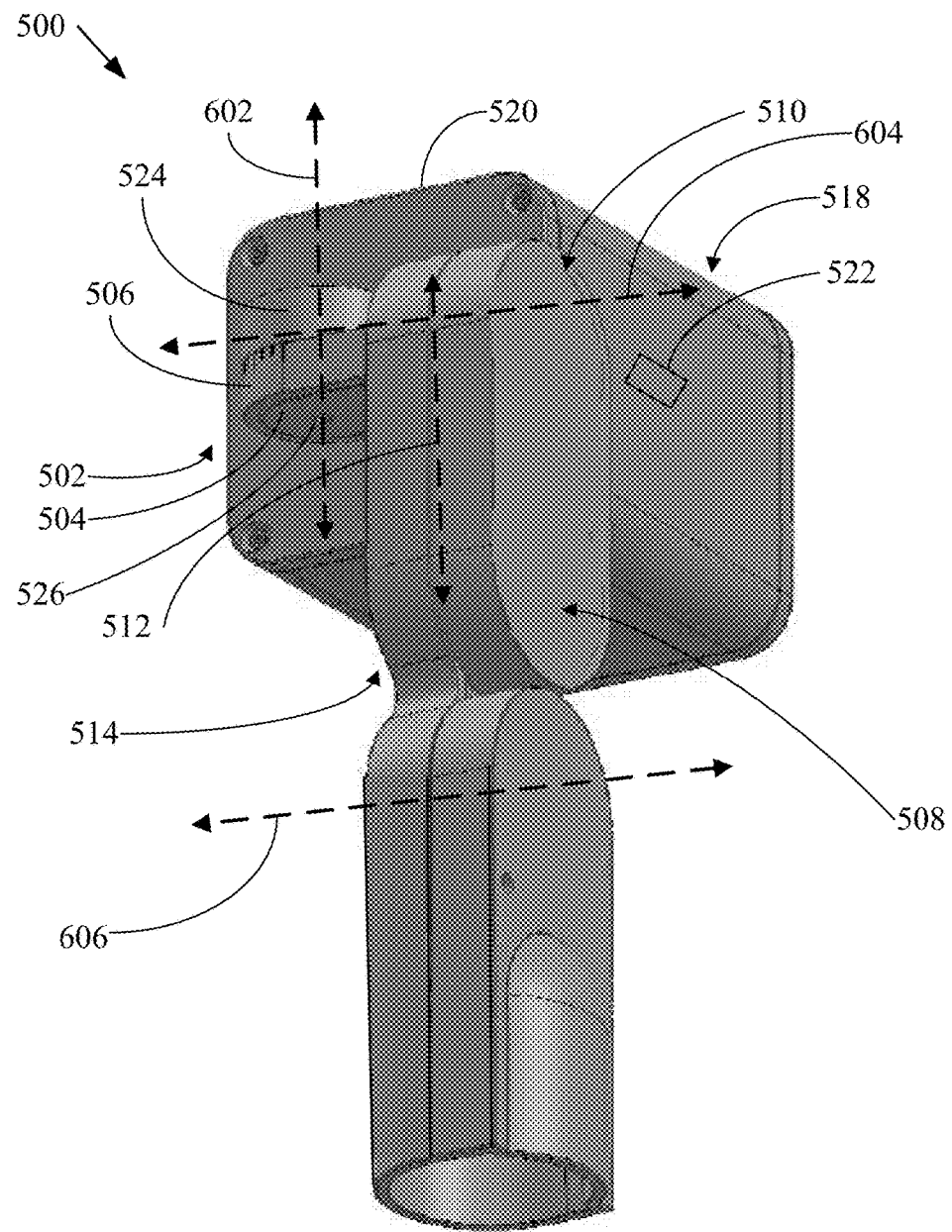
FIG. 6 is a perspective right side view taken along the line [10], showing the example of the lighting system.
Figure 7:
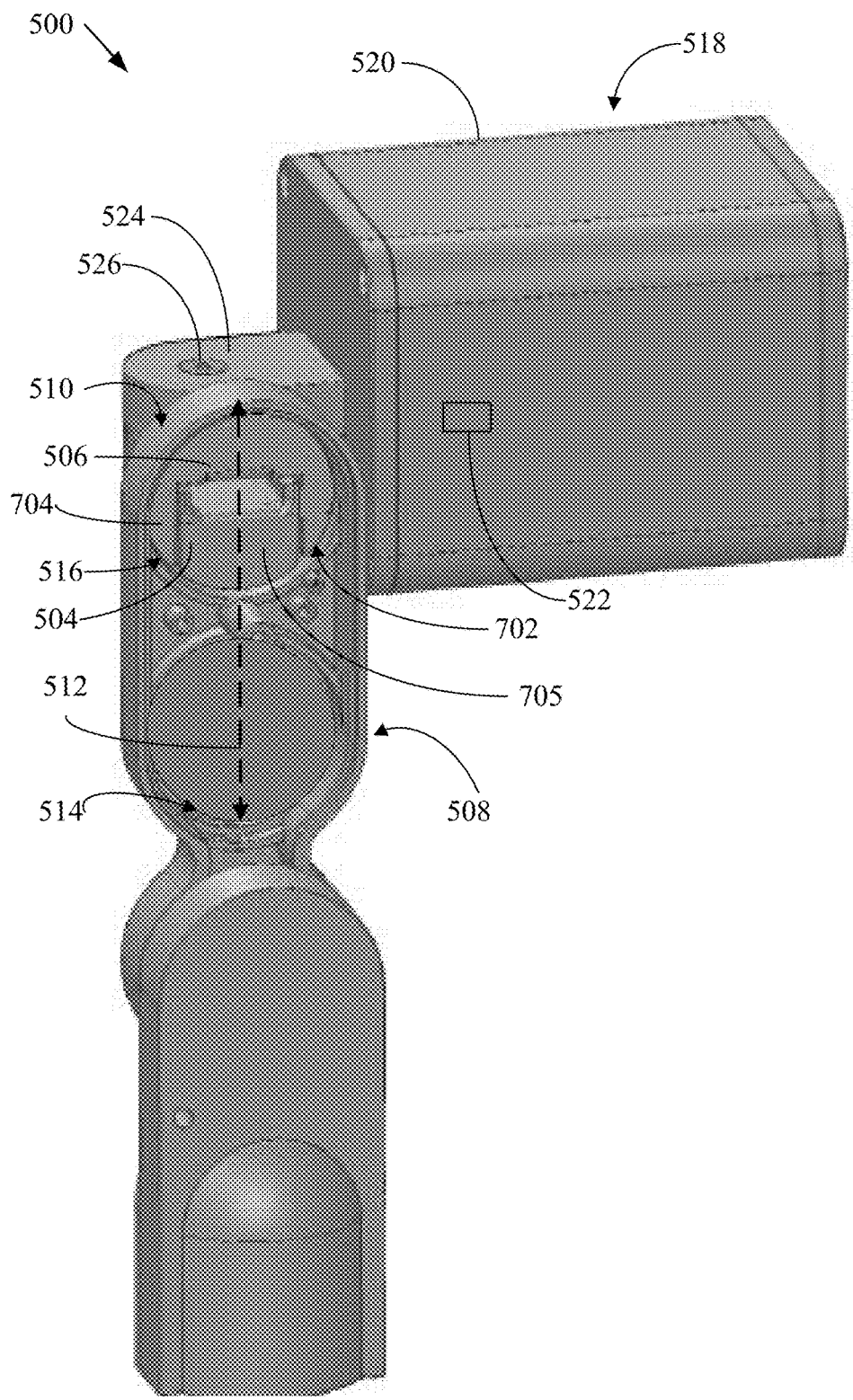
FIG. 7 is a cross-sectional side view taken along the line [11-11], showing the example [500] of the lighting system.

FIG. 5 is a perspective left side view showing an example [500] of an implementation of a lighting system. FIG. 6 is a perspective right side view taken along the line [10], showing the example [500] of the lighting system. FIG. 7 is a cross-sectional side view taken along the line [11-11], showing the example [500] of the lighting system. It is understood throughout this specification that an example [500] of a lighting system may include any combination of the features that are discussed herein in connection with the examples [100], [500], [800], [1100], [1500] of lighting systems. Accordingly, the entireties of the discussions herein of the other examples [100], [800], [1100], [1500] of lighting systems are hereby incorporated in this discussion of the examples [500] of the lighting systems.

As shown in FIGS. 5, 6 and 7, the example [500] of the implementation of the lighting system includes a mounting body [508] having a first end [510] being spaced apart along a longitudinal axis [512] from a second end [514]. The example [500] of the implementation of the lighting system also includes a lever-locking bracket [502] including a bracket body [506] and a lever actuator [504]. In the example [500] of the implementation of the lighting system, the lever-locking bracket [502] is pivotally connected with the first end [510] of the mounting body [508] by a flange [702] of the lever-locking bracket [502] being retained in alignment with an aperture [516] of the mounting body [508] communicating with a cavity [704] located inside the mounting body [508]. The example [500] of the implementation of the lighting system further includes a lighting module [518] having a housing [520] and having a semiconductor light-emitting device [522] in the housing [520]. In the example [500] of the implementation of the lighting system, the lighting module [518] has a mounting arm [524] being pivotally connected with the lever-locking bracket [502] by a first pivot joint [526] for rotation of the lighting module [518] to a plurality of primary positions being represented by a dashed curve [523] around a first pivot axis being represented by a dashed line [602]. Additionally in the example [500] of the implementation of the lighting system, the flange [702] of the lever-locking bracket [502] forms a part of a second pivot joint [538] for rotation of the lighting module [518] to a plurality of secondary positions being represented by a dashed curve [532] around a second pivot axis being represented by a dashed line [604]. In the example [500] of the implementation of the lighting system, the lever-locking bracket [502] is configured for simultaneously locking the lighting module [518] at a one of the primary positions [523] and at a one of the secondary positions [532] by a movement of the lever actuator [504] from an unlocked position to a locked position.

In examples, the example [500] of the lighting system may include a mounting post [552] having a first end [554] being spaced apart along a further longitudinal axis [556] from a second end [558], and the second end [514] of the mounting body [508] may be connected with the second end [558] of the mounting post [552]. As examples, the example [500] of the lighting system may include a mounting base [560] at the first end [554] of the mounting post [552], and the mounting base [560] may be configured for positioning the lighting system [500] on a working surface W. In examples, the example [500] of the lighting system may include a third pivot joint for rotation of the lighting module [500] to a plurality of tertiary positions around a third pivot axis being represented by the dashed line [556]. As examples of the example [500] of the lighting system, the third pivot axis [556] may be about orthogonal, or orthogonal, or at another angle of intersection with, the working surface W. In examples of the example [500] of the lighting system, the mounting base [560] may be configured for attaching the lighting system [500] to the working surface W. In examples of the example [500] of the lighting system, the mounting base [560] may include a fastener (not shown) for attaching the lighting system [500] to the working surface W. As additional examples of the example [500] of the lighting system [500], the first pivot axis [602] may define a first degree of freedom of movement of the lighting module [518], and the second pivot axis [604] may define a second degree of freedom of movement of the lighting module [518], and the third pivot axis [556] may define a third degree of freedom of movement of the lighting module [518]. In examples of the example [500] of the lighting system, the first pivot axis may be orthogonal to the second pivot axis. As further examples of the example [500] of the lighting system, the second end [558] of the mounting post [552] may include another mounting arm [562], and the second end [514] of the mounting body [508] may be attached to the another mounting arm [562] at a fourth pivot joint [564] for rotation of the lighting module [500] to a plurality of quaternary positions around a fourth pivot axis being represented by a dashed line [606]. As examples of the example [500] of the lighting system, the fourth pivot axis [606] may be about orthogonal to, or orthogonal to, or may have another angle of intersection with, the third pivot axis [556].

Figure 8:
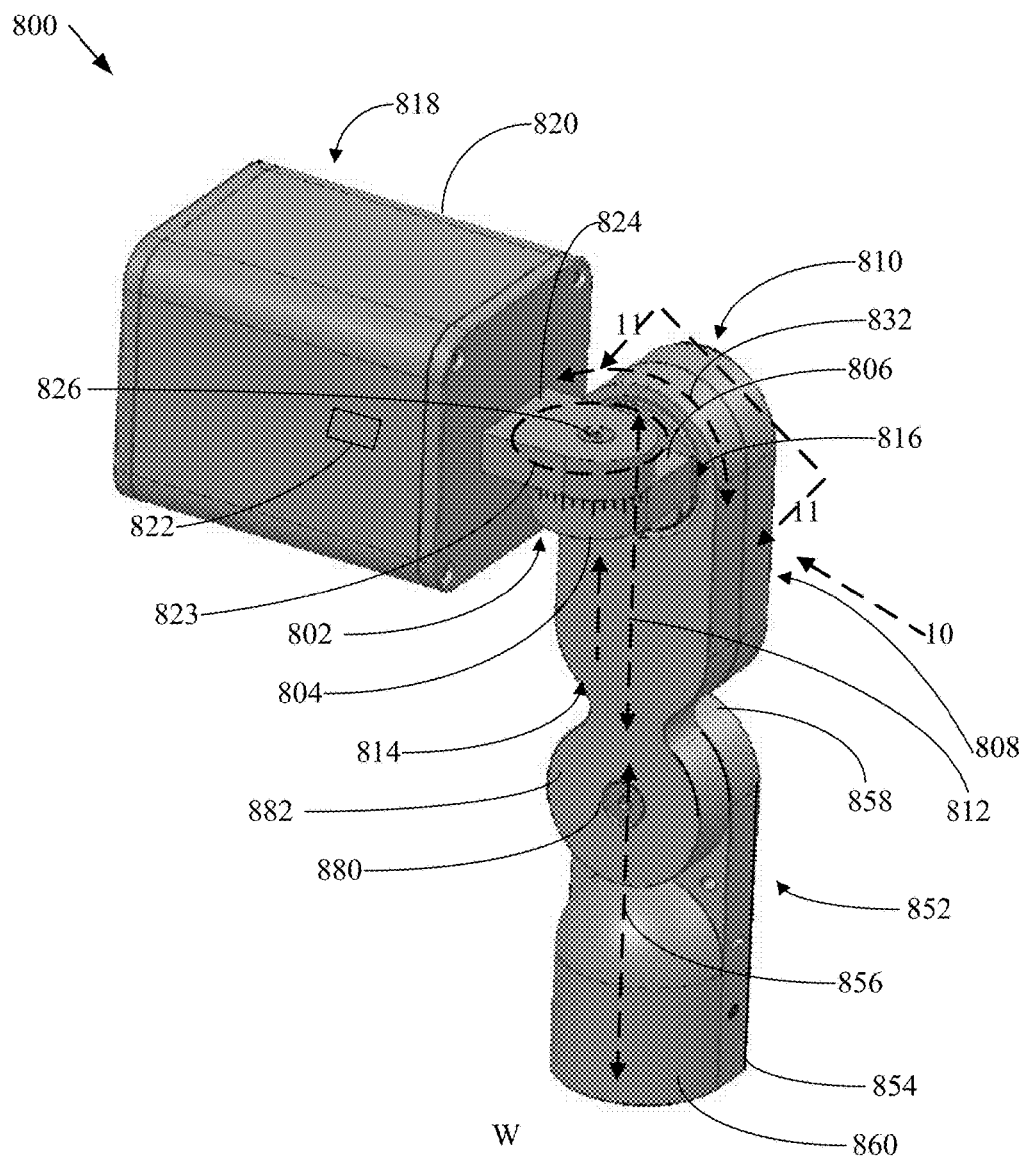
FIG. 8 is a perspective left side view showing an example [800] of an implementation of a lighting system.
Figure 9:
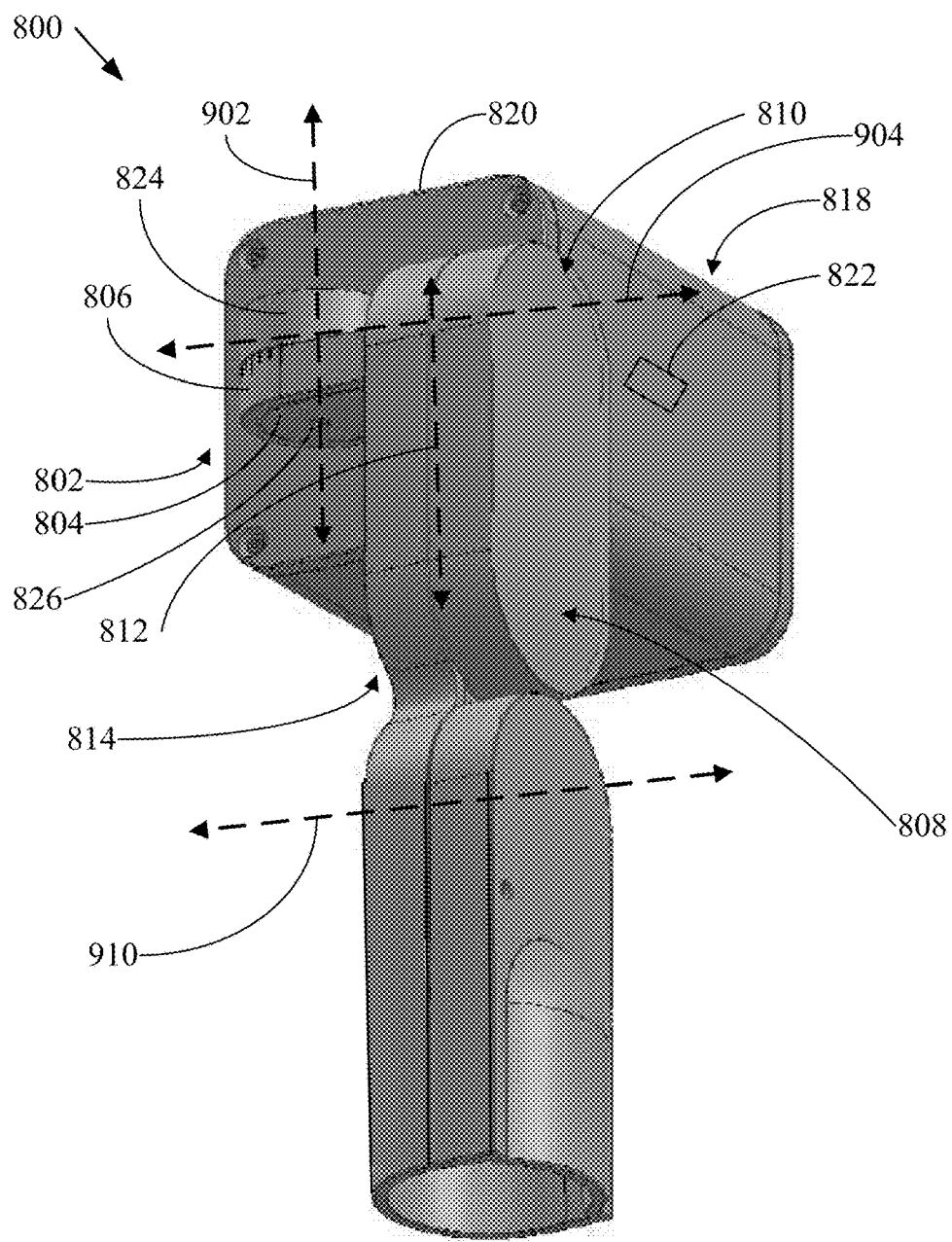
FIG. 9 is a perspective right side view taken along the line [10], showing the example of the lighting system.
Figure 10A:
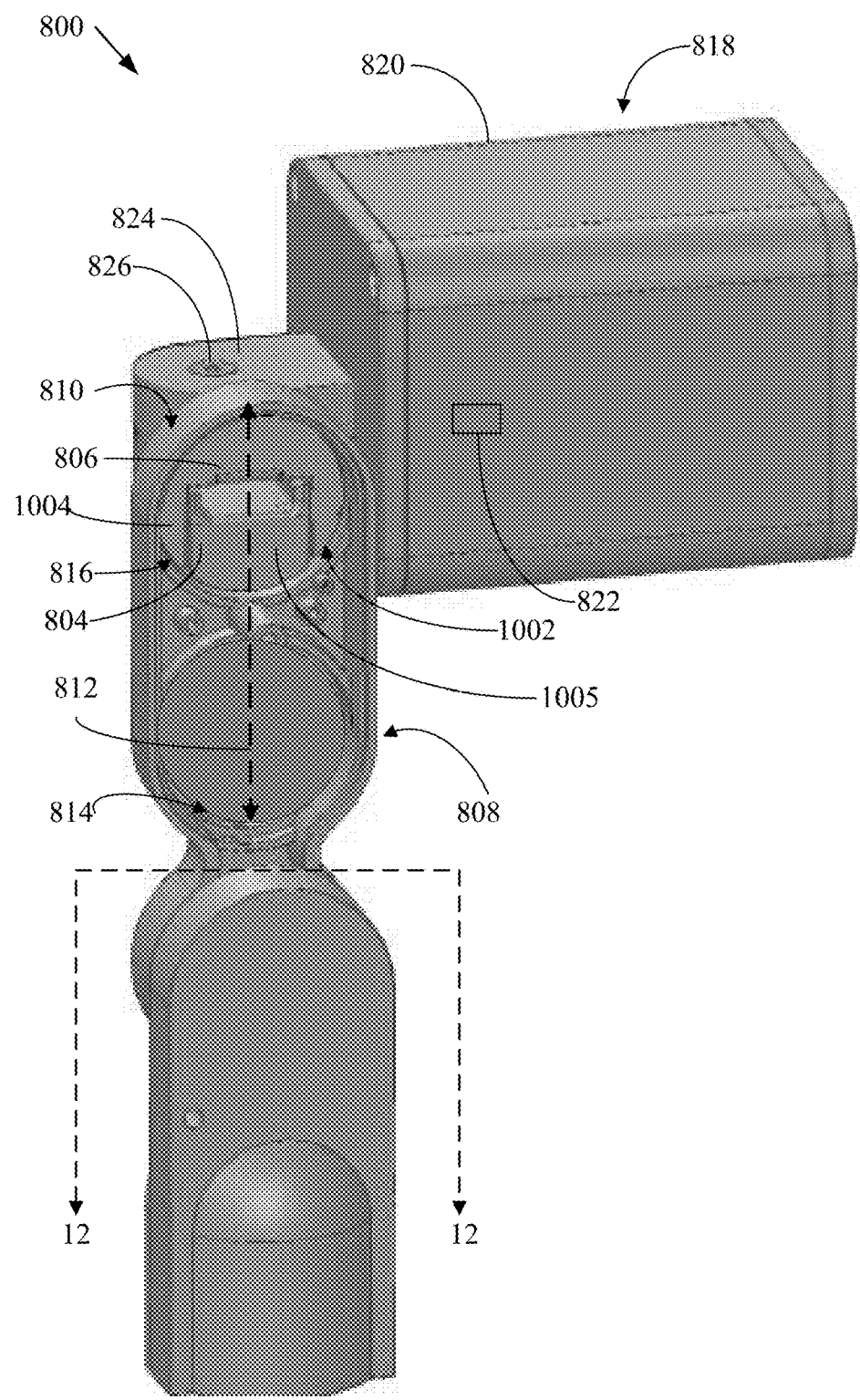
FIG. 10A is a cross-sectional side view taken along the line [12-12], showing the example [800] of the lighting system.
Figure 10B:
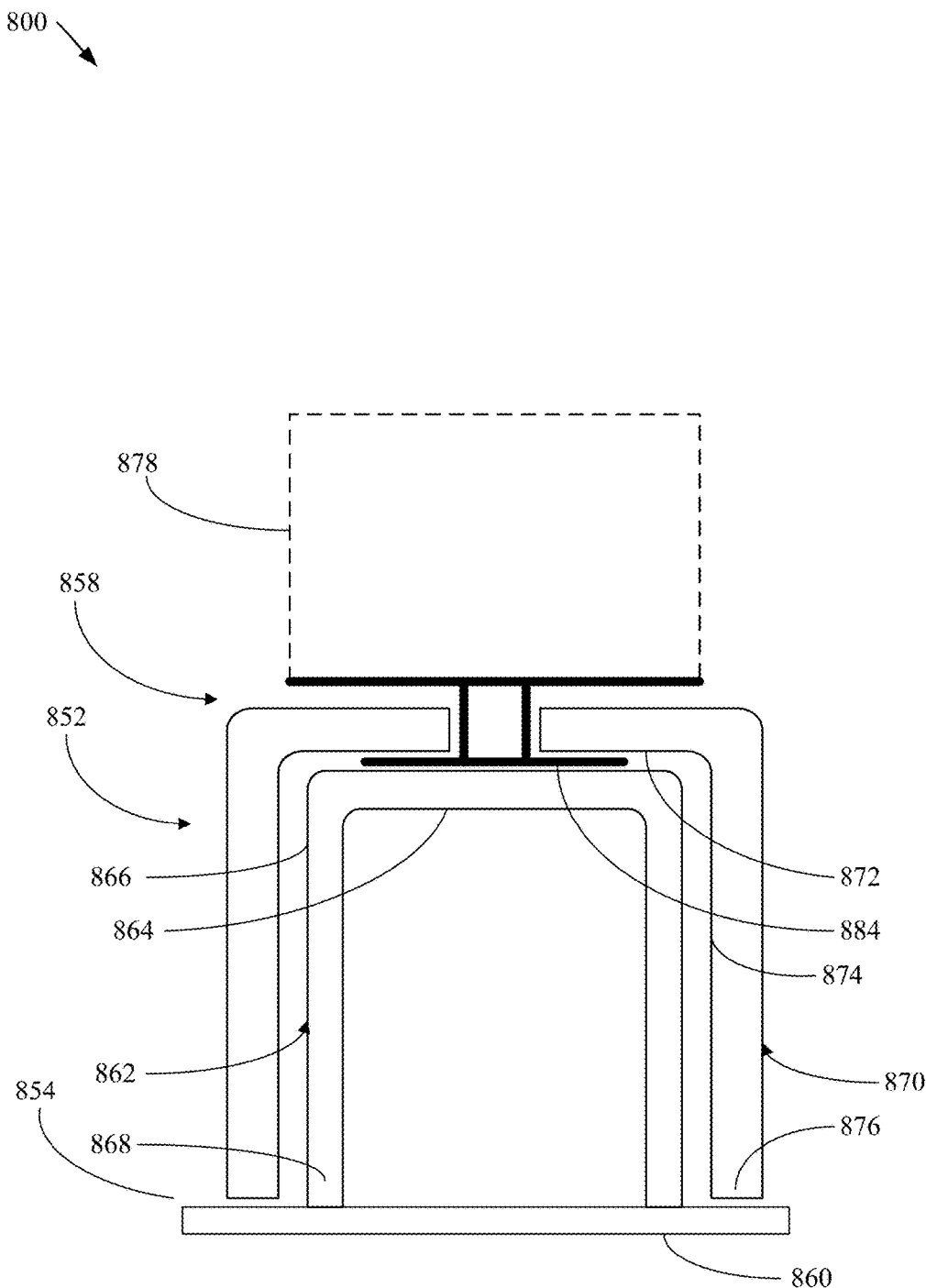
FIG. 10B is a schematic cross-section of the mounting post of the example [800] of the lighting system.

FIG. 8 is a perspective left side view showing an example [800] of an implementation of a lighting system. FIG. 9 is a perspective right side view taken along the line [10], showing the example [800] of the lighting system. FIG. 10A is a cross-sectional side view taken along the line [12-12], showing the example [800] of the lighting system. FIG. 10B is a schematic cross-section of the mounting post of the example [800] of the lighting system. It is understood throughout this specification that an example [800] of a lighting system may include any combination of the features that are discussed herein in connection with the examples [100], [500], [800], [1100], [1500] of lighting systems. Accordingly, the entireties of the discussions herein of the other examples [100], [500], [1100], [1500] of lighting systems are hereby incorporated in this discussion of the examples [800] of the lighting systems.

As shown in FIGS. 8, 9, 10A and 10B, the example [800] of the implementation of the lighting system includes a mounting body [808] having a first end [810] being spaced apart along a longitudinal axis [812] from a second end [814]. The example [800] of the implementation of the lighting system also includes a lever-locking bracket [802] including a bracket body [806] and a lever actuator [804]. In the example [800] of the implementation of the lighting system, the lever-locking bracket [802] is pivotally connected with the first end [810] of the mounting body [808] by a flange [1002] of the lever-locking bracket [802] being retained in alignment with an aperture [816] of the mounting body [808] communicating with a cavity [1004] located inside the mounting body [808]. The example [800] of the implementation of the lighting system further includes a lighting module [818] having a housing [820] and having a semiconductor light-emitting device [822] in the housing [820]. In the example [800] of the implementation of the lighting system, the lighting module [818] has a mounting arm [824] being pivotally connected with the lever-locking bracket [802] by a first pivot joint [826] for rotation of the lighting module [818] to a plurality of primary positions being represented by a dashed curve [823] around a first pivot axis being represented by a dashed line [902]. Additionally in the example [800] of the implementation of the lighting system, the flange [1002] of the lever-locking bracket [802] forms a part of a second pivot joint [1005] for rotation of the lighting module [818] to a plurality of secondary positions being represented by a dashed curve [832] around a second pivot axis being represented by a dashed line [904]. In the example [800] of the implementation of the lighting system, the lever-locking bracket [802] is configured for simultaneously locking the lighting module [818] at a one of the primary positions [823] and at a one of the secondary positions [832] by a movement of the lever actuator [804] from an unlocked position to a locked position.

In examples, the example [800] of the lighting system may include a mounting post [852] having a first end [854] being spaced apart along a further longitudinal axis [856] from a second end [858], and the second end [814] of the mounting body [808] may be connected with the second end [858] of the mounting post [852]. As examples, the example [800] of the lighting system may include a mounting base [860] at the first end [854] of the mounting post [852], and the mounting base [860] may be configured for positioning the lighting system [800] on a working surface W. In examples, the example [800] of the lighting system may include a third pivot joint for rotation of the lighting module [800] to a plurality of tertiary positions around a third pivot axis being represented by the dashed line [856]. As examples of the example [800] of the lighting system, the third pivot axis [1018] may be about orthogonal, or orthogonal, or at another angle of intersection with, the working surface W. In examples of the example [800] of the lighting system, the mounting base [860] may be configured for attaching the lighting system [800] to the working surface W. In examples of the example [800] of the lighting system, the mounting base [860] may include a fastener (not shown) for attaching the lighting system [800] to the working surface W. As additional examples of the example [800] of the lighting system, the first pivot axis [902] may define a first degree of freedom of movement of the lighting module [818], and the second pivot axis [904] may define a second degree of freedom of movement of the lighting module [818], and the third pivot axis [1018] may define a third degree of freedom of movement of the lighting module [818]. In examples of the example [800] of the lighting system, the first pivot axis may be orthogonal to the second pivot axis.

In examples, the example [800] of the lighting system may include a first circular cylinder [862] having a first cylinder base [864] spaced apart by a first sidewall [866] from a first rim [868]. As further examples of the example [800] of the lighting system, the first rim [868] may be located at the first end [854] of the mounting post [852]. In additional examples, the example [800] of the lighting system may include a second circular cylinder [870] having a second cylinder base [872] spaced apart by a second sidewall [874] from a second rim [876]; and the first circular cylinder [862] may be nested inside the second circular cylinder [870]. As additional examples of the example [800] of the lighting system, the first rim [868] of the first circular cylinder [862] may be attached to the mounting base [860]. In examples of the example [800] of the lighting system, the second end [858] of the mounting post [852] may include another mounting arm schematically shown by the dashed line [878], and the second end [858] of the mounting body [814] may be attached to the another mounting arm [878]. In examples of the example [800] of the lighting system, the second end [858] of the mounting body [814] may be attached to the another mounting arm [878] at a fourth pivot joint [880] for rotation of the lighting module [818] to a plurality of quaternary positions around a fourth pivot axis [910]. In examples of the example [800] of the lighting system, the another mounting arm [878] may include a flange [884] being interposed between the first cylinder base [864] and the second cylinder base [872]. As further examples of the example [800] of the lighting system, the first sidewall [866] of the first circular cylinder [862] may include a plurality of spaced-apart raised ribs (not shown) extending toward the second sidewall [874] of the second circular cylinder [870], and the raised ribs may be positioned for centering the first circular cylinder [862] inside the second circular cylinder [870] in alignment with the third pivot axis [1018].

In examples of the example [800] of the lighting system, the another mounting arm [878] at the second end [858] of the mounting post [852] may be substituted by another lever-locking bracket (not shown) having the structure of one of the lever-locking brackets [102], [502], [802]; and the second end [858] of the mounting body [814] may be attached to the another lever-locking bracket. As examples, the example [800] of the lighting system may include the another lever-locking bracket [102], [502], [802] as having another bracket body [106], [506], [806] and a further lever actuator [104], [504], [804], the another lever-locking bracket being pivotally connected with the second end [858] of the mounting post [852] at the third pivot joint being formed by a flange [302], [702], [1002] of the another lever-locking bracket retained in alignment with an aperture [888] in the first cylinder base [864] of the first circular cylinder [862]; and the flange [302], [702], [1002] of the another lever-locking bracket may be interposed between the first cylinder base [864] of the first circular cylinder [862] and the second cylinder base [872] of the second circular cylinder [870]. In further examples, the second circular cylinder may be omitted, and the example [800] of the lighting system may include a threaded ring (not shown), and a portion of the first sidewall adjacent to the first cylinder base of the first circular cylinder may be threaded (not shown) for insertion into the threaded ring, and the flange [302], [702], [1002] of the additional lever-locking bracket may be interposed between the first cylinder base [864] and the threaded ring. In examples of the example [800] of the lighting system, the second end [814] of the mounting body [808] may be pivotally connected with the another lever-locking bracket by a fourth pivot joint [910] for rotation of the lighting module [818] to a plurality of quaternary positions around a fourth pivot axis [910], the another lever-locking bracket being configured for simultaneously locking the lighting module [818] at a one of the tertiary positions and at a one of the quaternary positions by moving the further lever actuator from an unlocked position to a locked position. In examples of the example [800] of the lighting system, the second end [858] of the mounting body [808] may include an additional mounting arm [882], and the second end [858] of the mounting body [808] may be attached to the another lever-locking bracket [102], [502], [802]. In examples of the example [800] of the lighting system, the second end [814] of the mounting body [808] may (not shown) have another arch shape and two spaced-apart mutually-opposing arched sides each having the another arch shape. As examples of the example [800] of the lighting system, the arch shape of the second end [814] of the mounting body [814] may be a round arch, an elliptical arch, a three-centered arch, a segmental arch, a horseshoe arch, or a pinched arch. In examples of the example [800] of the lighting system, a one of the arched sides of the another lever-locking bracket may be pivotally connected with and aligned for rotation around the fourth pivot axis relative to a one of the arched sides of the second end [814] of the mounting body [808]. As additional examples of the example [800] of the lighting system, the first pivot axis [902] may define a first degree of freedom of movement of the lighting module [818], and the second pivot axis [904] may define a second degree of freedom of movement of the lighting module [818], the third pivot axis [1018] may define a third degree of freedom of movement of the lighting module [818], and the fourth pivot axis [910] may define a fourth degree of freedom of movement of the lighting module [818]. In additional examples, the example [800] of the lighting system may include an electrical conductor passing from a cavity of the mounting post into the cavity [1004] of the mounting body [808], and passing from the cavity [1004] of the mounting body [808] into the cavity [402] of the bracket body [806], and passing from the cavity of the bracket body [806] into a passageway of the mounting arm [824], and passing from the passageway of the mounting arm [824] into the lighting module [818].

Figure 11:
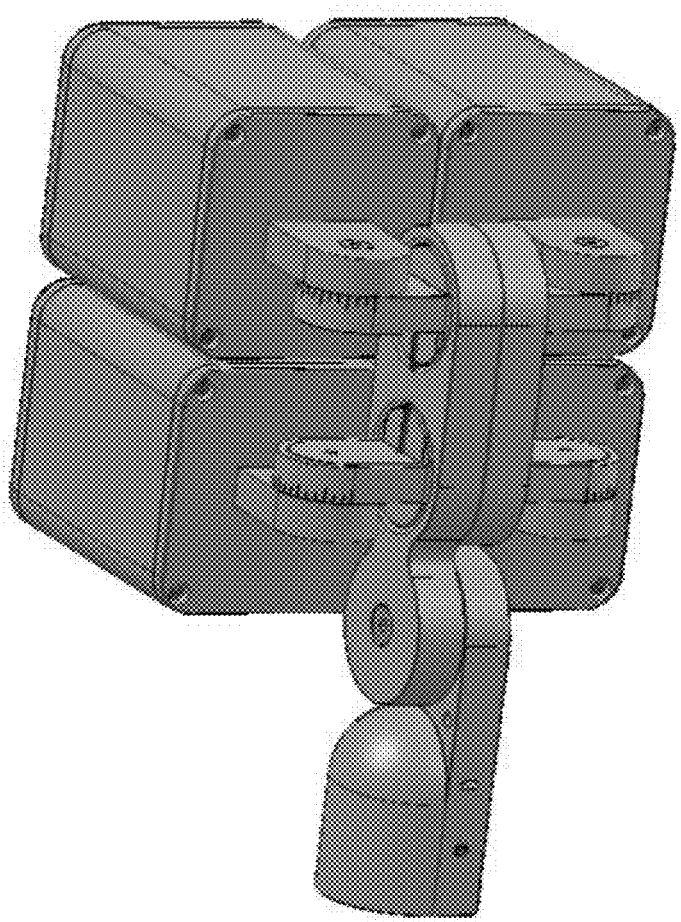
FIG. 11 is a perspective left side view showing an example [1100] of an implementation of a lighting system.
Figure 12:
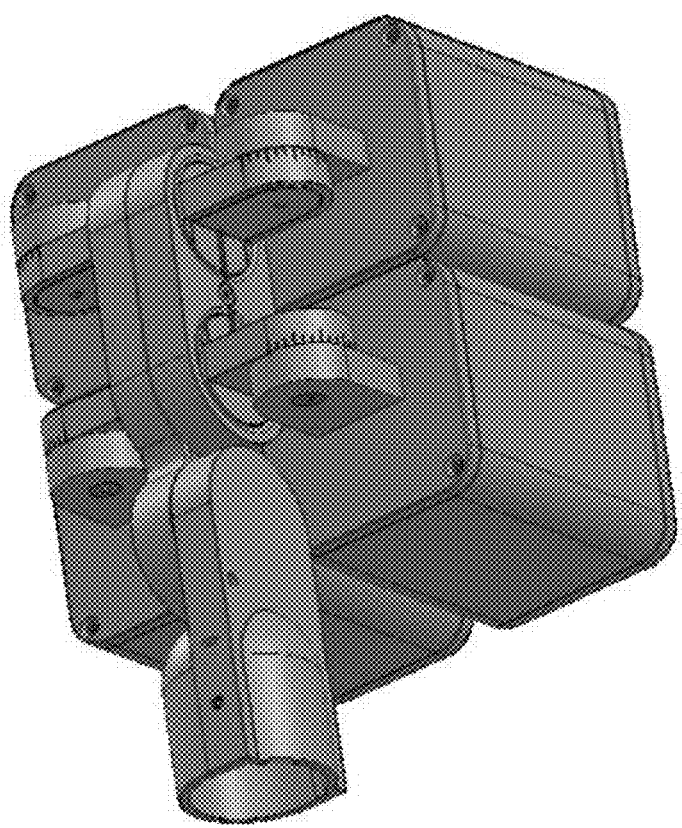
FIG. 12 is a perspective right side view showing the example [1100] of the lighting system.
Figure 13:
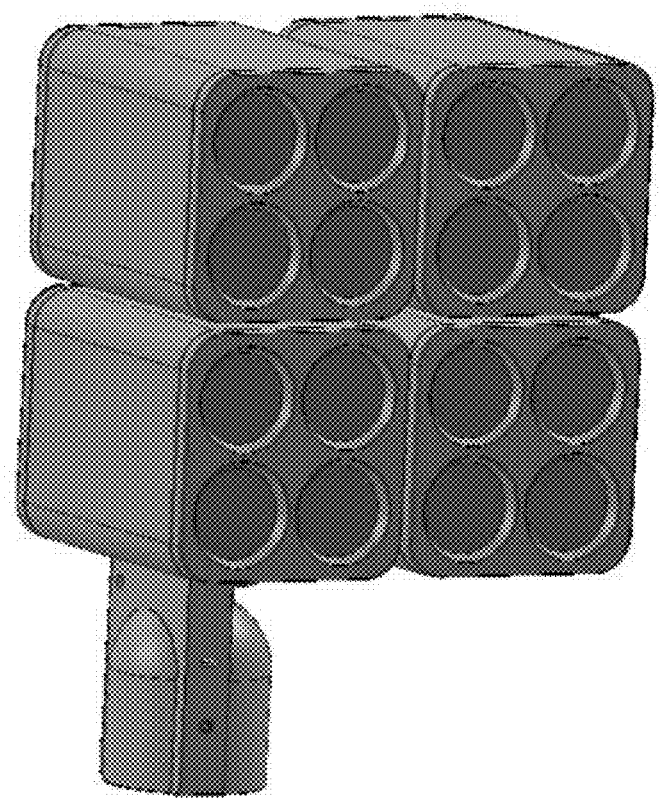
FIG. 13 is a perspective front view showing the example [1100] of the lighting system.
Figure 14:
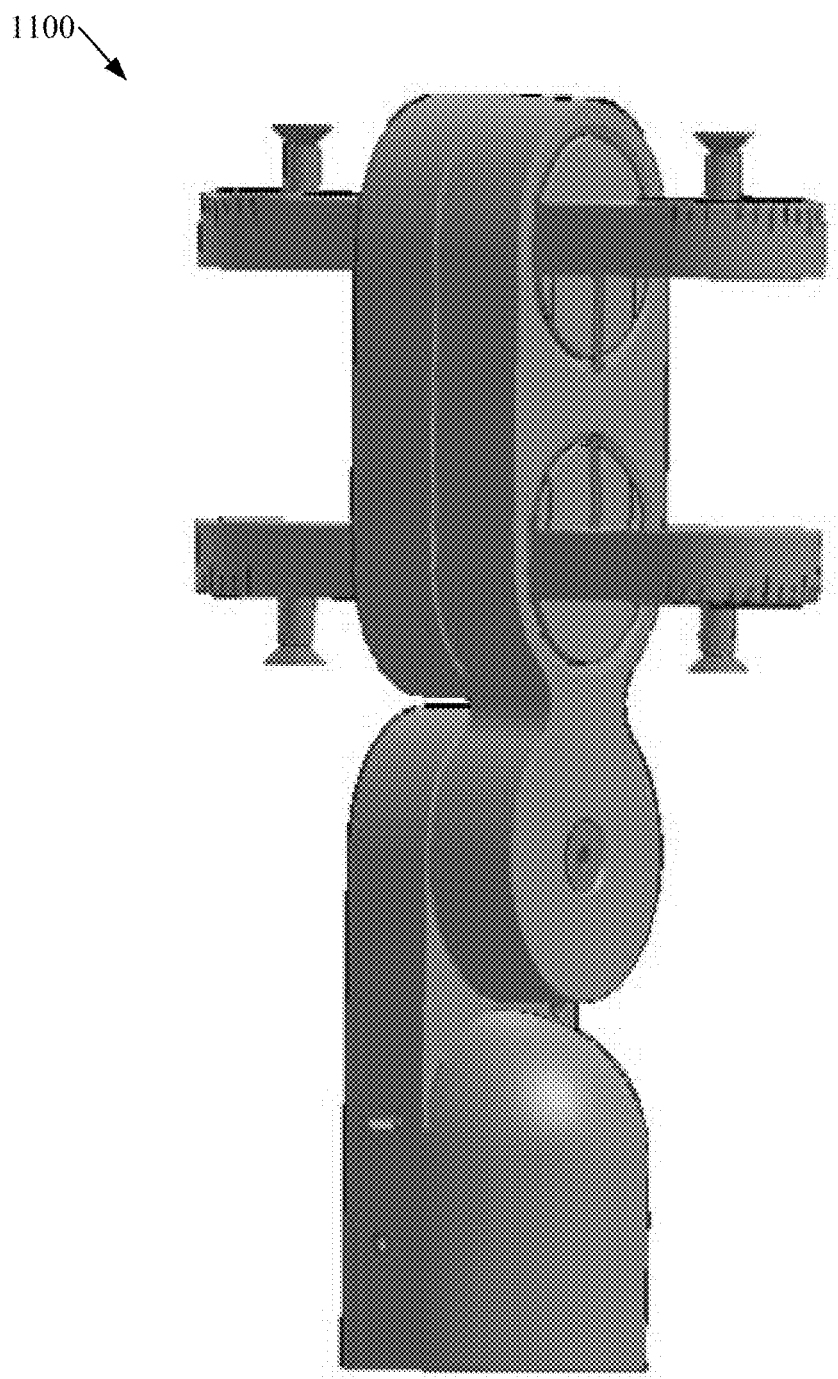
FIG. 14 is a perspective view of a mounting body of the example [1100] of the lighting system.

FIG. 11 is a perspective left side view showing an example [1100] of an implementation of a lighting system. FIG. 12 is a perspective right side view showing the example [1100] of the lighting system. FIG. 13 is a perspective front view showing the example [1100] of the lighting system. FIG. 14 is a perspective view of a mounting body of the example [1100] of the lighting system. It is understood throughout this specification that an example [1100] of a lighting system may include any combination of the features that are discussed herein in connection with the examples [100], [500], [800], [1100], [1500] of lighting systems. Accordingly, the entireties of the discussions herein of the other examples [100], [500], [800], [1500] of lighting systems are hereby incorporated in this discussion of the examples [1100] of the lighting systems.

As shown in FIGS. 11, 12, 13 and 14, the example [1100] of the implementation of the lighting system includes a mounting body [1108] having a first end [1110] being spaced apart along a longitudinal axis [1112] from a second end [1114]. The example [1100] of the implementation of the lighting system also includes a lever-locking bracket including a bracket body and a lever actuator. In the example [1100] of the implementation of the lighting system, the lever-locking bracket is pivotally connected with the first end of the mounting body by a flange of the lever-locking bracket being retained in alignment with an aperture of the mounting body communicating with a cavity located inside the mounting body. The example [1100] of the implementation of the lighting system further includes a lighting module having a housing and having a semiconductor light-emitting device in the housing. In the example [1100] of the implementation of the lighting system, the lighting module has a mounting arm being pivotally connected with the lever-locking bracket by a first pivot joint for rotation of the lighting module to a plurality of primary positions around a first pivot axis. Additionally in the example [1100] of the implementation of the lighting system, the flange of the lever-locking bracket forms a part of a second pivot joint for rotation of the lighting module to a plurality of secondary positions around a second pivot axis. In the example [1100] of the implementation of the lighting system, the lever-locking bracket is configured for simultaneously locking the lighting module at a one of the primary positions and at a one of the secondary positions by a movement of the lever actuator from an unlocked position to a locked position.

In examples, the example [1100] of the lighting system may have a second lever-locking bracket including a second bracket body and a second lever actuator, the second lever-locking bracket being pivotally connected with the mounting body at a position being aligned along the longitudinal axis with and spaced apart from another position of the lever-locking bracket. As examples, the example [1100] of the lighting system may include a second lighting module having a second mounting arm being pivotally connected with the second lever-locking bracket. In examples of the example [1100] of the lighting system, the second lighting module may include four semiconductor light-emitting devices in a second housing, and the second housing may include a divider for causing light emissions from each of the four semiconductor light-emitting devices to be separately emitted from the second lighting module. As examples of the example [1100] of the lighting system, the second lever-locking bracket may be pivotally connected with the mounting body by a flange of the second lever-locking bracket being retained in alignment with a second aperture of the mounting body communicating with the cavity located inside the mounting body. In further examples of the example [1100] of the lighting system, the mounting body may have two mutually-opposing sides, and the lever-locking bracket may be connected to the lighting system [1100] at a one of the two mutually-opposing sides of the mounting body, and the second lever-locking bracket may be connected to the lighting system [1100] at: another one of the two mutually-opposing sides of the mounting body; or at the same one of the two mutually-opposing sides of the mounting body. As additional examples, the example [1100] of the lighting system may have the lever-locking brackets both being connected to the lighting system at the one of the two mutually-opposing sides of the mounting body; and may also have two additional lever-locking brackets respectively including an additional bracket body and an additional lever actuator, wherein a one of the additional lever-locking brackets is connected to the lighting system [1100] at the another one of the two mutually-opposing sides of the mounting body, and wherein another one of the additional lever-locking brackets is aligned along the longitudinal axis with and spaced apart from the one of the additional lever-locking brackets and is also connected to the lighting system [1100] at the another one of the two mutually-opposing sides of the mounting body. As further examples of the example [1100] of the lighting system, the mounting body may have two mutually-opposing sides, and the mounting body may include two half-bodies collectively forming the mounting body, each one of the two half-bodies forming a one of the mutually-opposing sides of the mounting body. In examples of the example [1100] of the lighting system, the flange of the lever-locking bracket may be interposed between a bracket retainer and a one of the two mutually-opposing sides of the mounting body, and the flange of the second lever-locking bracket may be interposed between another bracket retainer and the another one of the two mutually-opposing sides of the mounting body.

Figure 15:
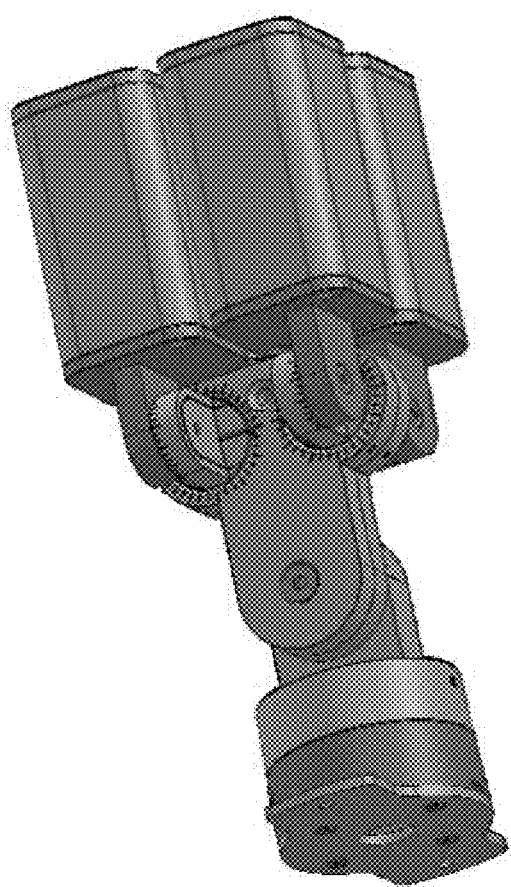
FIG. 15 is a perspective left side view showing an example [1500] of an implementation of a lighting system.
Figure 16:
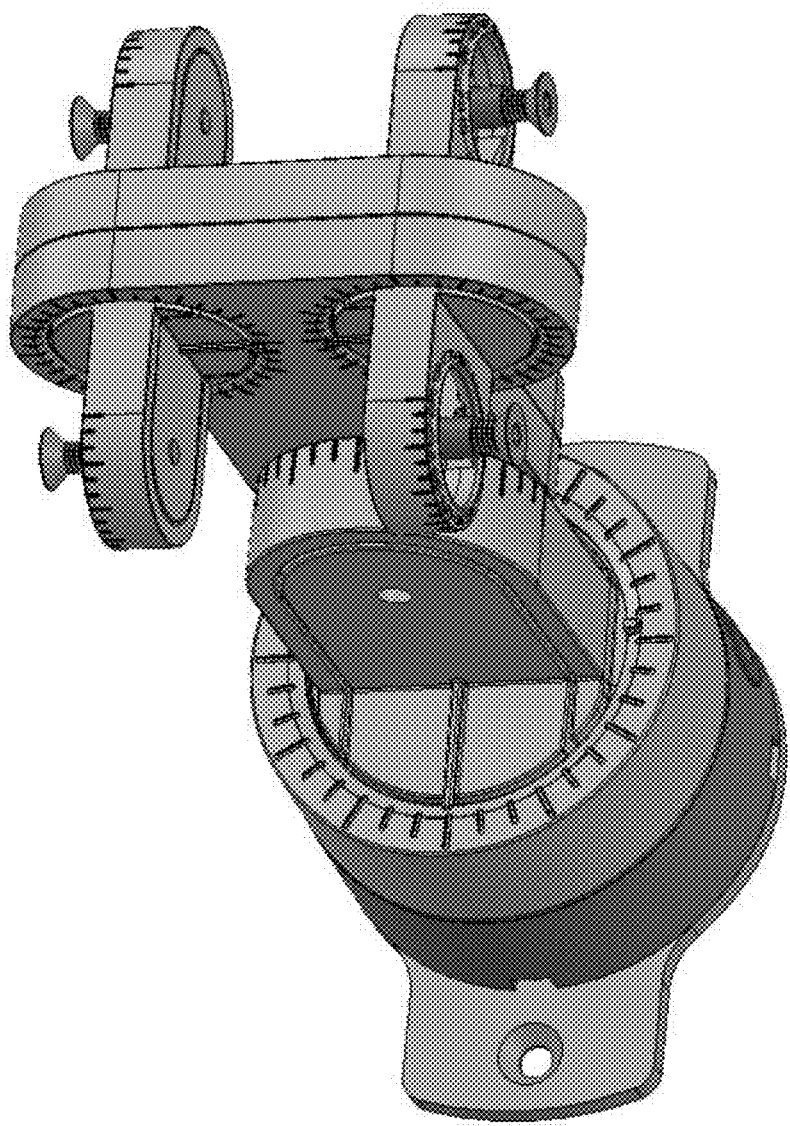
FIG. 16 is another perspective view, showing the example [1500] of the lighting system.
Figure 17:
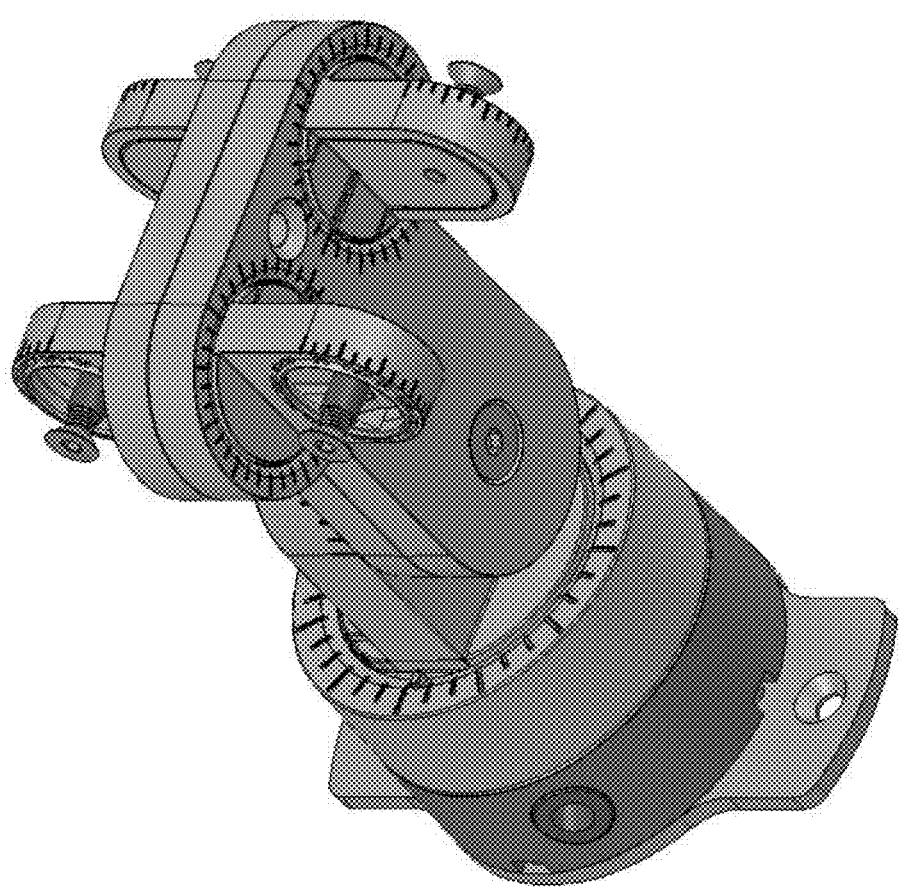
FIG. 17 is a further perspective view, showing the example [1500] of the lighting system.
Figure 18:
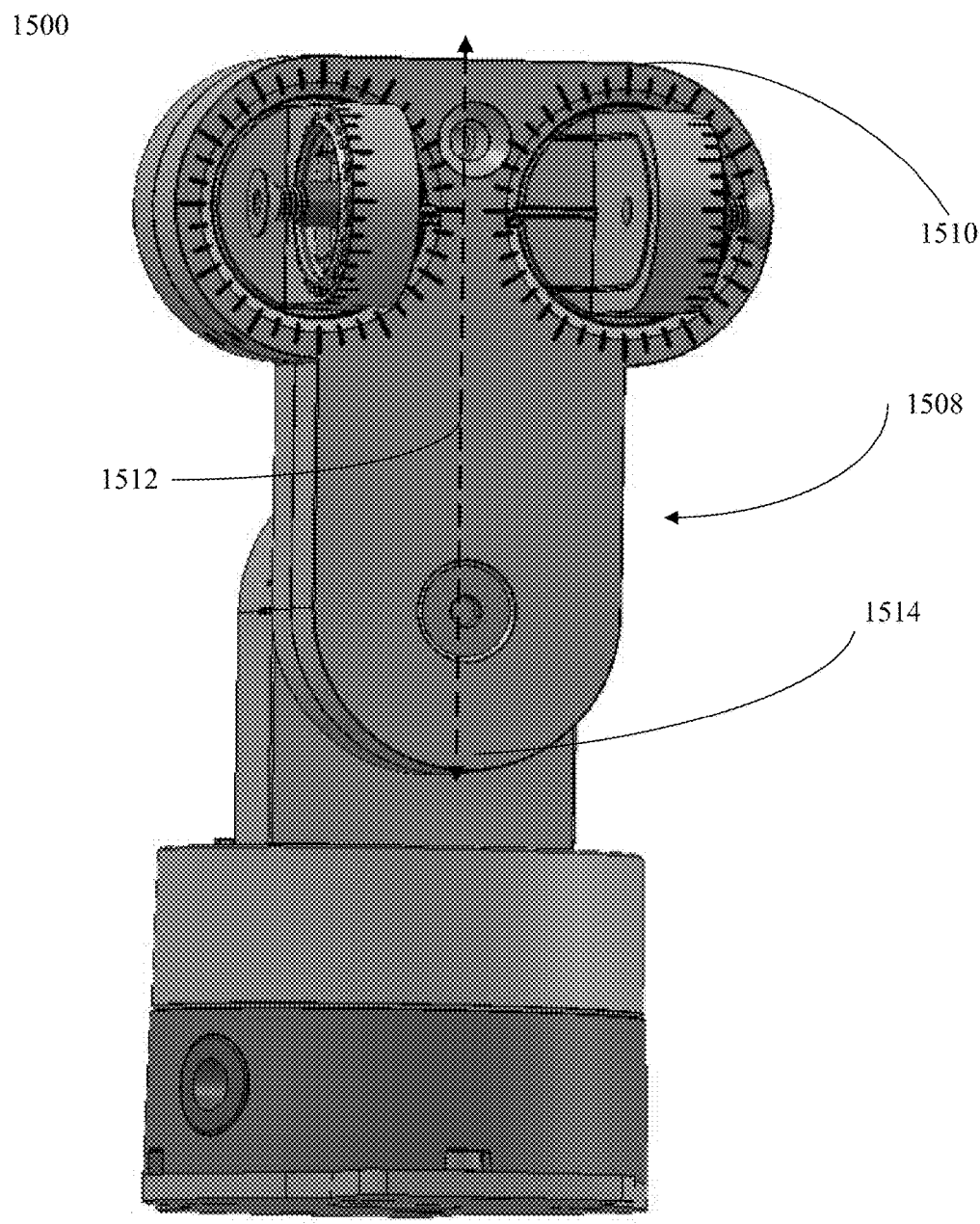
FIG. 18 is a perspective view of a mounting body of the example [1500] of the lighting system

FIG. 15 is a perspective left side view showing an example [1500] of an implementation of a lighting system. FIG. 16 is another perspective view, showing the example [1500] of the lighting system. FIG. 17 is a further perspective view, showing the example [1500] of the lighting system. FIG. 18 is a perspective view of a mounting body of the example [1100] of the lighting system. It is understood throughout this specification that an example [1500] of a lighting system may include any combination of the features that are discussed herein in connection with the examples [100], [500], [800], [1100], [1500] of lighting systems. Accordingly, the entireties of the discussions herein of the other examples [100], [500], [800], [1100] of lighting systems are hereby incorporated in this discussion of the examples [1500] of the lighting systems.

As shown in FIGS. 15, 16, 17 and 18, the example [1500] of the implementation of the lighting system includes a mounting body [1508] having a first end [1510] being spaced apart along a longitudinal axis [1512] from a second end [1514]. The example [1500] of the implementation of the lighting system also includes a lever-locking bracket including a bracket body and a lever actuator. In the example [1500] of the implementation of the lighting system, the lever-locking bracket is pivotally connected with the first end of the mounting body by a flange of the lever-locking bracket being retained in alignment with an aperture of the mounting body communicating with a cavity located inside the mounting body. The example [1500] of the implementation of the lighting system further includes a lighting module having a housing and having a semiconductor light-emitting device in the housing. In the example [1500] of the implementation of the lighting system, the lighting module has a mounting arm being pivotally connected with the lever-locking bracket by a first pivot joint for rotation of the lighting module to a plurality of primary positions around a first pivot axis. Additionally in the example [1500] of the implementation of the lighting system, the flange of the lever-locking bracke forms a part of a second pivot joint for rotation of the lighting module to a plurality of secondary positions around a second pivot axis. In the example [1500] of the implementation of the lighting system, the lever-locking bracket is configured for simultaneously locking the lighting module at a one of the primary positions and at a one of the secondary positions by a movement of the lever actuator from an unlocked position to a locked position.

In examples, the example [1500] of the lighting system may have a second lever-locking bracket including a second bracket body and a second lever actuator, the second lever-locking bracket being pivotally connected with the mounting body at a position being spaced apart at a distance away from the longitudinal axis being about the same as another distance by which another position of the lever-locking bracket may be spaced apart from the longitudinal axis. As examples, the example [1500] of the lighting system may include a second lighting module having a second mounting arm being pivotally connected with the second lever-locking bracket. In further examples of the example [1500] of the lighting system, the second lighting module may include four semiconductor light-emitting devices in a second housing, and the second housing may include a divider for causing light emissions from each of the four semiconductor light-emitting devices to be separately emitted from the second lighting module. As examples of the example [1500] of the lighting system, the second lever-locking bracket may be pivotally connected with the mounting body by a flange of the second lever-locking bracket being retained in alignment with a second aperture of the mounting body communicating with the cavity located inside the mounting body. In additional examples of the example [1500] of the lighting system, the mounting body may have two mutually-opposing sides, and the lever-locking bracket may be connected to the lighting system [1500] at a one of the two mutually-opposing sides of the mounting body, and the second lever-locking bracket may be connected to the lighting system [1500] at another one of the two mutually-opposing sides of the mounting body. As examples of the example [1500] of the lighting system, the mounting body may have the two mutually-opposing sides, and the lever-locking bracket may be connected to the lighting system [1500] at a one of the two mutually-opposing sides of the mounting body, and the second lever-locking bracket also may be connected to the lighting system [1500] at the one of the two mutually-opposing sides of the mounting body. In additional examples, the example [1500] of the lighting system may have two additional lever-locking brackets respectively including additional bracket bodies and additional lever actuators, wherein a one of the additional lever-locking brackets may be connected to the lighting system [1500] at the another one of the two mutually-opposing sides of the mounting body, and wherein another one of the additional lever-locking brackets may also be connected to the lighting system [1500] at the another one of the two mutually-opposing sides of the mounting body and may be spaced apart at a distance away from the longitudinal axis being about the same as another distance by which the one of the additional lever-locking brackets may be spaced apart from the longitudinal axis. As further examples of the example [1500] of the lighting system, the mounting body may have the two mutually-opposing sides, and the mounting body may include two half-bodies collectively forming the mounting body, each one of the two half-bodies forming a one of the mutually-opposing sides of the mounting body. In examples of the example [1500] of the lighting system, the flange of the lever-locking bracket may be interposed between a bracket retainer and a one of the two mutually-opposing sides of the mounting body, and the flange of the second lever-locking bracket may be interposed between another bracket retainer and the another one of the two mutually-opposing sides of the mounting body.

The examples [100], [500], [800], [1100], [1500] of lighting systems may generally be utilized in end-use applications for lighting systems that include a plurality of independently-positionable lighting modules. The examples of lighting systems that are disclosed herein may also be fabricated and utilized together with the teachings disclosed in the following commonly-owned U.S. patent applications, the entireties of which are hereby incorporated herein by reference: U.S. patent application Ser. No. 14/816,827 filed on Aug. 3, 2015, entitled "Lighting System Having a Mounting Device,"; U.S. patent application Ser. No. 14/526,504 filed on Oct. 28, 2014, entitled "Lighting Systems Having Multiple Light Sources"; U.S. patent application Ser. No. 14/636,204 filed on Mar. 3, 2015, entitled "Lighting Systems Including Lens Modules For Selectable Light Distribution"; U.S. patent application Ser. No. 14/617,849 filed on Feb. 9, 2015, entitled "Lighting Systems Generating Controlled and Wavelength-Converted Light Emissions"; U.S. patent application Ser. No. 14/702,800 filed on May 4, 2015, entitled "Lighting Systems Including Asymmetric Lens Modules For Selectable Light Distribution"; and U.S. patent application Ser. No. 14/702,765 filed on May 4, 2015, entitled "Lighting System Having a Sealing System."

While the present invention has been disclosed in a presently defined context, it will be recognized that the present teachings may be adapted to a variety of contexts consistent with this disclosure and the claims that follow. For example, the lighting systems shown in the figures and discussed above can be adapted in the spirit of the many optional parameters described.

What is claimed is:

1. A lighting system, comprising:
a mounting body having a first end being spaced apart along a longitudinal axis from a second end;
a lever-locking bracket including a bracket body and a lever actuator, the lever-locking bracket being pivotally connected with the first end of the mounting body by a flange of the lever-locking bracket being retained in alignment with an aperture of the mounting body communicating with a cavity located inside the mounting body;
a lighting module having a housing and having a semiconductor light-emitting device in the housing, the lighting module having a mounting arm being pivotally connected with the lever-locking bracket by a first pivot joint for rotation of the lighting module to a plurality of primary positions around a first pivot axis, the flange of the lever-locking bracket forming a part of a second pivot joint for rotation of the lighting module to a plurality of secondary positions around a second pivot axis, the lever-locking bracket being configured for simultaneously locking the lighting module at a one of the primary positions and at a one of the secondary positions by a movement of the lever actuator from an unlocked position to a locked position.

2. The lighting system of claim 1, wherein the first pivot axis defines a first degree of freedom of movement of the lighting module, and wherein the second pivot axis defines a second degree of freedom of movement of the lighting module.

3. The lighting system of claim 1, wherein the first pivot axis is orthogonal to the second pivot axis.

4. The lighting system of claim 1, wherein the lever-locking bracket includes a cavity located inside the bracket body, and wherein the lever-locking bracket includes a lever located inside the cavity of the bracket body.

5. The lighting system of claim 4, wherein the lever is integrated with the lever actuator.

6. The lighting system of claim 4, wherein the bracket body includes a lever notch being located inside the cavity of the bracket body, and wherein the lever includes a projecting leverage point being in pivotal contact with the lever notch of the bracket body.

7. The lighting system of claim 4, wherein the lever-locking bracket includes another lever being located inside the cavity of the bracket body, and wherein the lever and the another lever are in mutual pivotal contact inside the cavity of the bracket body.

8. The lighting system of claim 7, wherein the lever includes a projecting leverage point, and wherein the another lever includes a projecting lever notch, and wherein the projecting leverage point is in pivotal contact with the projecting lever notch.

9. The lighting system of claim 7, wherein the lever includes a projecting lever notch, and wherein the another lever includes a projecting leverage point, and wherein the projecting leverage point is in pivotal contact with the projecting lever notch.

10. The lighting system of claim 4, wherein the bracket body includes a portion of the flange of the lever-locking bracket, and wherein the lever actuator includes another portion of the flange of the lever-locking bracket.

11. The lighting system of claim 10, wherein the portion of the flange of the lever-locking bracket reaches a first distance away from the second pivot axis and the another portion of the flange of the lever-locking bracket reaches a second distance away from the second pivot axis; and wherein the first distance is about the same as the second distance when the lever actuator is in the unlocked position.

12. The lighting system of claim 11, wherein the movement of the lever actuator from the unlocked position to the locked position causes a displacement of the another portion of the flange of the lever-locking bracket farther away from the second pivot axis, so that the second distance is larger than the first distance when the lever actuator is in the locked position.

13. The lighting system of claim 12, wherein the flange of the lever-locking bracket is located inside the mounting body.

14. The lighting system of claim 13, wherein the aperture of the mounting body has an edge reaching another distance away from the second pivot axis, and wherein the another distance is smaller than the first distance reached by the portion of the flange of the lever-locking bracket, and wherein the flange of the lever-locking bracket is retained inside the cavity of the mounting body by the edge of the aperture of the mounting body.

15. The lighting system of claim 13, wherein the flange of the lever-locking bracket is frictionally locked together with the mounting body when the lever actuator is in the locked position.

16. The lighting system of claim 13, further including a bracket retainer located inside the cavity of the mounting body, the bracket retainer encircling a portion of the aperture of the mounting body and being in contact with a portion of the flange of the lever-locking bracket.

17. The lighting system of claim 13, further including a bracket retainer located inside the cavity of the mounting body, the bracket retainer having a side encircling the aperture of the mounting body and being in contact with a portion of the flange of the lever-locking bracket.

18. The lighting system of claim 17, wherein the bracket retainer has a flange, and wherein the flange of the bracket retainer encircles the flange of the lever-locking bracket, and wherein the bracket retainer maintains the lever-locking bracket in alignment with the second pivot axis.

19. The lighting system of claim 1, wherein the lever-locking bracket includes another lever actuator, the lever actuator and the another lever actuator being held in mutually opposing positions by the bracket body.

20. The lighting system of claim 19, wherein the lever-locking bracket includes another lever located inside the cavity of the bracket body, and wherein the another lever is integrated with the another lever actuator.

21. The lighting system of claim 20, wherein the lever and the another lever are in mutual pivotal contact inside the cavity of the bracket body.

22. The lighting system of claim 19, wherein the bracket body includes a portion of the flange of the lever-locking bracket, and wherein the lever actuator includes another portion of the flange of the lever-locking bracket, and wherein the another lever actuator includes a further portion of the flange of the lever-locking bracket.

23. The lighting system of claim 22, wherein the portion of the flange of the lever-locking bracket reaches a first distance away from the second pivot axis, and wherein the another portion of the flange of the lever-locking bracket reaches a second distance away from the second pivot axis, and wherein the further portion of the flange of the lever-locking bracket reaches a third distance away from the second pivot axis; and wherein each one of the first, second and third distances is about the same when the lever actuator is in the unlocked position and the another lever actuator is in another unlocked position.

24. The lighting system of claim 23, wherein the movement of the lever actuator from the unlocked position to the locked position and a movement of the another lever actuator from the another unlocked position to another locked position causes displacements of the another portion of the flange of the lever-locking bracket and of the further portion of the flange of the lever-locking bracket farther away from the second pivot axis, so that each one of the second and third distances is larger than the first distance when the lever actuator is in the locked position and the another lever actuator is in the another locked position.

25. The lighting system of claim 24, wherein the flange of the lever-locking bracket is located inside the mounting body.

26. The lighting system of claim 25, wherein the aperture of the mounting body has an edge reaching another distance away from the second pivot axis, and wherein the another distance is smaller than the first distance reached by the portion of the flange of the lever-locking bracket, and wherein the flange of the lever-locking bracket is retained inside the cavity of the mounting body by the edge of the aperture of the mounting body.

27. The lighting system of claim 25, wherein the flange of the lever-locking bracket is frictionally locked together with the mounting body when the lever actuator is in the locked position and the another lever actuator is in the another locked position.

28. The lighting system of claim 25, further including a bracket retainer located inside the cavity of the mounting body, the bracket retainer encircling a portion of the aperture of the mounting body and being in contact with a portion of the flange of the lever-locking bracket.

29. The lighting system of claim 25, further including a bracket retainer located inside the cavity of the mounting body, the bracket retainer having a side encircling the aperture of the mounting body and being in contact with a portion of the flange of the lever-locking bracket.

30. The lighting system of claim 29, wherein the bracket retainer has a flange, and wherein the flange of the bracket retainer encircles the flange of the lever-locking bracket, and wherein the bracket retainer maintains the lever-locking bracket in alignment with the second pivot axis.

31. The lighting system of claim 1, wherein the flange of the lever-locking bracket is located at a first end of the lever-locking bracket, and wherein the lever-locking bracket has a second end being spaced apart along another longitudinal axis extending away from the mounting body.

32. The lighting system of claim 31, wherein the lever-locking bracket has an arch shape, and wherein the flange of the lever-locking bracket forms a base of the arch shape.

33. The lighting system of claim 32, wherein the arch shape of the lever-locking bracket is a round arch, an elliptical arch, a three-centered arch, a segmental arch, a horseshoe arch, or a pinched arch.

34. The lighting system of claim 32, wherein the lever-locking bracket has two spaced-apart mutually-opposing arched sides each having the arch shape.

35. The lighting system of claim 34, wherein the mounting arm has another arch shape and two spaced-apart mutually-opposing arched sides each having the another arch shape.

36. The lighting system of claim 35, wherein a one of the arched sides of the lever-locking bracket is pivotally connected with and aligned for rotation around the first pivot axis relative to a one of the arched sides of the mounting arm.

37. The lighting system of claim 36, wherein the lever-locking bracket includes a cavity located inside the bracket body.

38. The lighting system of claim 37, wherein the lever actuator forms another one of the arched sides of the lever-locking bracket, and wherein the bracket body and the another one of the arched sides of the lever-locking bracket cooperatively enclose the cavity of the bracket body.

39. The lighting system of claim 38, including an aperture in the one of the arched sides of the mounting arm, being in communication at the first pivot joint with an aperture in the one of the arched sides of the lever-locking bracket.

40. The lighting system of claim 39, including a fastener forming the first pivot axis, the fastener extending through the aperture in the one of the arched sides of the mounting arm and through the aperture in the one of the arched sides of the lever-locking bracket.

41. The lighting system of claim 40, wherein the fastener is configured for causing the lever-locking bracket to be placed under compression with the mounting arm along the first pivot axis.

42. The lighting system of claim 41, wherein the fastener is configured for causing the movement of the lever actuator from the unlocked position to the locked position while simultaneously causing the one of the arched sides of the lever-locking bracket to be frictionally locked together with the one of the arched sides of the mounting arm.

43. The lighting system of claim 42, including raised bumps being on and arranged around the aperture of the one of the arched sides of the lever-locking bracket, and including further raised bumps being on and arranged around the aperture of the one of the arched sides of the mounting arm.

44. The lighting system of claim 43, wherein the raised bumps and the further raised bumps collectively cause the lever-locking bracket to be frictionally locked together with the mounting arm when the lever actuator is in the locked position, and wherein the raised bumps and the further raised bumps collectively permit the lighting module to be rotated around the first pivot axis when the lever actuator is in the unlocked position.

45. The lighting system of claim 42, wherein the mounting arm includes a threaded receptacle, and wherein the fastener is a bolt connected to the lever-locking bracket and having a threaded shank pivotally located in the threaded receptacle.

46. The lighting system of claim 42, wherein the lever-locking bracket includes a threaded receptacle, and wherein the fastener is a bolt connected to the mounting arm and having a threaded shank pivotally located in the threaded receptacle.

47. The lighting system of claim 38, wherein the lever-locking bracket includes a lever located inside the cavity of the bracket body.

48. The lighting system of claim 47, wherein the lever is integrated with the lever actuator.

49. The lighting system of claim 48, wherein the bracket body includes a lever notch being located inside the cavity of the bracket body, and wherein the lever includes a projecting leverage point being in pivotal contact with the lever notch.

50. The lighting system of claim 48, wherein the bracket body includes two spaced-apart lever notches being located inside the cavity of the bracket body, and wherein the lever includes two spaced-apart projecting leverage points, a one of the projecting leverage points being in pivotal contact with a one of the lever notches and another one of the projecting leverage points being in pivotal contact with another one of the lever notches.

51. The lighting system of claim 39, wherein the cavity of the bracket body has an aperture being in communication with the cavity of the mounting body.

52. The lighting system of claim 51, wherein the lighting module has an aperture being in communication with a passageway of the mounting arm, and wherein the passageway of the mounting arm is in communication with the aperture in the one of the arched sides of the mounting arm.

53. The lighting system of claim 52, including an electrical conductor passing from the cavity of the mounting body into the cavity of the bracket body, and passing from the cavity of the bracket body into the passageway of the mounting arm, and passing from the passageway of the mounting arm into the lighting module.

54. The lighting system of claim 1, including a mounting post having a first end being spaced apart along a further longitudinal axis from a second end, the second end of the mounting body being connected with the second end of the mounting post.

55. The lighting system of claim 54, including a mounting base at the first end of the mounting post and being configured for positioning the lighting system on a working surface, wherein the lighting system includes a third pivot joint for rotation of the lighting module to a plurality of tertiary positions around a third pivot axis being orthogonal to the working surface.

56. The lighting system of claim 55, wherein the mounting base is configured for attaching the lighting system to the working surface.

57. The lighting system of claim 56, wherein the mounting base includes a fastener for attaching the lighting system to the working surface.

58. The lighting system of claim 55, wherein the first pivot axis defines a first degree of freedom of movement of the lighting module, and wherein the second pivot axis defines a second degree of freedom of movement of the lighting module, and wherein the third pivot axis defines a third degree of freedom of movement of the lighting module.

59. The lighting system of claim 58, wherein the first pivot axis is orthogonal to the second pivot axis.

60. The lighting system of claim 55, wherein the second end of the mounting post includes another mounting arm, and wherein the second end of the mounting body is attached to the another mounting arm at a fourth pivot joint for rotation of the lighting module to a plurality of quaternary positions around a fourth pivot axis being orthogonal to the third pivot axis.

61. The lighting system of claim 55, wherein the lighting system includes a first circular cylinder having a first cylinder base spaced apart by a first sidewall from a first rim, wherein the first rim is located at the first end of the mounting post, wherein the lighting system includes a second circular cylinder having a second cylinder base spaced apart by a second sidewall from a second rim, and wherein the first circular cylinder is nested inside the second circular cylinder.

62. The lighting system of claim 61, wherein the first rim of the first circular cylinder is attached to the mounting base.

63. The lighting system of claim 62, wherein the second end of the mounting post includes another mounting arm, and wherein the second end of the mounting body is attached to the another mounting arm at a fourth pivot joint for rotation of the lighting module to a plurality of quaternary positions around a fourth pivot axis.

64. The lighting system of claim 63, wherein the another mounting arm includes a flange being interposed between the first cylinder base and the second cylinder base.

65. The lighting system of claim 61, wherein the first sidewall of the first circular cylinder includes a plurality of spaced-apart raised ribs extending toward the second sidewall of the second circular cylinder, and wherein the raised ribs are positioned for centering the first circular cylinder inside the second circular cylinder in alignment with the third pivot axis.

66. The lighting system of claim 61, wherein the lighting system includes another lever-locking bracket having another bracket body and a further lever actuator, the another lever-locking bracket being pivotally connected with the second end of the mounting post at the third pivot joint being formed by a flange of the another lever-locking bracket retained in alignment with an aperture in the first cylinder base of the first circular cylinder, and wherein the flange of the another lever-locking bracket is interposed between the first cylinder base of the first circular cylinder and the second cylinder base of the second circular cylinder.

67. The lighting system of claim 66, wherein the second end of the mounting body is pivotally connected with the another lever-locking bracket by a fourth pivot joint for rotation of the lighting module to a plurality of quaternary positions around a fourth pivot axis, the another lever-locking bracket being configured for simultaneously locking the lighting module at a one of the tertiary positions and at a one of the quaternary positions by moving the further lever actuator from an unlocked position to a locked position.

68. The lighting system of claim 67, wherein the first pivot axis defines a first degree of freedom of movement of the lighting module, and wherein the second pivot axis defines a second degree of freedom of movement of the lighting module, and wherein the third pivot axis defines a third degree of freedom of movement of the lighting module, and wherein the fourth pivot axis defines a fourth degree of freedom of movement of the lighting module.

69. The lighting system of claim 66, wherein the another lever-locking bracket includes a cavity located inside the another bracket body, and wherein the another lever-locking bracket includes a further lever located inside the cavity of the another bracket body.

70. The lighting system of claim 68, wherein the further lever is integrated with the further lever actuator.

71. The lighting system of claim 68, wherein the another bracket body includes another lever notch being located inside the cavity of the another bracket body, and wherein the further lever includes a projecting leverage point being in pivotal contact with the another lever notch of the another bracket body.

72. The lighting system of claim 68, wherein the another bracket body includes a portion of the flange of the another lever-locking bracket, and wherein the further lever actuator includes another portion of the flange of the another lever-locking bracket.

73. The lighting system of claim 72, wherein the portion of the flange of the another lever-locking bracket reaches a first distance away from the third pivot axis and the another portion of the flange of the another lever-locking bracket reaches a second distance away from the third pivot axis; and wherein the first distance is about the same as the second distance when the further lever actuator is in an unlocked position.

74. The lighting system of claim 73, wherein the movement of the further lever actuator from the unlocked position to a locked position causes a displacement of the another portion of the flange of the another lever-locking bracket farther away from the third pivot axis, so that the second distance is larger than the first distance when the further lever actuator is in the locked position.

75. The lighting system of claim 74, wherein the flange of the another lever-locking bracket is located inside the mounting post.

76. The lighting system of claim 75, wherein an aperture in the first cylinder base of the first circular cylinder has an edge reaching an additional distance away from the third pivot axis, and wherein the additional distance is smaller than the first distance reached by the portion of the flange of the another lever-locking bracket, and wherein the flange of the another lever-locking bracket is retained inside the mounting post by the edge of the aperture in the first cylinder base.

77. The lighting system of claim 76, wherein the flange of the another lever-locking bracket is frictionally locked together with the mounting post when the further lever actuator is in the locked position.

78. The lighting system of claim 67, wherein the flange of the another lever-locking bracket is located at a first end of the another lever-locking bracket, and wherein the another lever-locking bracket has a second end being spaced apart along an additional longitudinal axis extending away from the mounting post.

79. The lighting system of claim 78, wherein the another lever-locking bracket has an arch shape, and wherein the flange of the another lever-locking bracket forms a base of the arch shape.

80. The lighting system of claim 79, wherein the arch shape of the another lever-locking bracket is a round arch, an elliptical arch, a three-centered arch, a segmental arch, a horseshoe arch, or a pinched arch.

81. The lighting system of claim 79, wherein the another lever-locking bracket has two spaced-apart mutually-opposing arched sides each having the arch shape.

82. The lighting system of claim 81, wherein the second end of the mounting body has another arch shape and two spaced-apart mutually-opposing arched sides each having the another arch shape.

83. The lighting system of claim 82, wherein the arch shape of the second end of the mounting body is a round arch, an elliptical arch, a three-centered arch, a segmental arch, a horseshoe arch, or a pinched arch.

84. The lighting system of claim 82, wherein a one of the arched sides of the another lever-locking bracket is pivotally connected with and aligned for rotation around the fourth pivot axis relative to a one of the arched sides of the second end of the mounting body.

85. The lighting system of claim 84, wherein the another lever-locking bracket includes a cavity located inside the another bracket body.

86. The lighting system of claim 85, wherein the further lever actuator forms another one of the arched sides of the another lever-locking bracket, and wherein the another bracket body and the another one of the arched sides of the another lever-locking bracket cooperatively enclose the cavity of the another bracket body.

87. The lighting system of claim 86, including an aperture in the one of the arched sides of the second end of the mounting body, being in communication at the fourth pivot joint with an aperture in the one of the arched sides of the another lever-locking bracket.

88. The lighting system of claim 87, including a fastener forming the fourth pivot axis, the fastener extending through the aperture in the one of the arched sides of the second end of the mounting body and through the aperture in the one of the arched sides of the another lever-locking bracket.

89. The lighting system of claim 88, wherein the fastener is configured for causing the another lever-locking bracket to be placed under compression with the second end of the mounting body along the fourth pivot axis.

90. The lighting system of claim 89, wherein the fastener is configured for causing a movement of the further lever actuator from the unlocked position to the locked position while simultaneously causing the one of the arched sides of the another lever-locking bracket to be frictionally locked together with the one of the arched sides at the second end of the mounting body.

91. The lighting system of claim 90, including raised bumps being on and arranged around the aperture of the one of the arched sides of the another lever-locking bracket, and including further raised bumps being on and arranged around the aperture of the one of the arched sides of the second end of the mounting body.

92. The lighting system of claim 91, wherein the raised bumps and the further raised bumps collectively cause the another lever-locking bracket to be frictionally locked together with the second end of the mounting body when the further lever actuator is in the locked position, and wherein the raised bumps and the further raised bumps collectively permit the lighting module to be rotated around the fourth pivot axis when the another lever actuator is in the unlocked position.

93. The lighting system of claim 90, wherein the second end of the mounting body includes a threaded receptacle, and wherein the fastener is a bolt connected to the another lever-locking bracket and having a threaded shank pivotally located in the threaded receptacle.

94. The lighting system of claim 90, wherein the another lever-locking bracket includes a threaded receptacle, and wherein the fastener is a bolt connected to the second end of the mounting body and having a threaded shank pivotally located in the threaded receptacle.

95. The lighting system of claim 85, wherein the another lever-locking bracket includes a further lever located inside the cavity of the another bracket body.

96. The lighting system of claim 95, wherein the further lever is integrated with the further lever actuator.

97. The lighting system of claim 96, wherein the another bracket body includes a further lever notch being located inside the cavity of the another bracket body, and wherein the further lever includes a projecting leverage point being in pivotal contact with the further lever notch.

98. The lighting system of claim 96, wherein the another bracket body includes two spaced-apart further lever notches being located inside the cavity of the another bracket body, and wherein the further lever includes two spaced-apart further projecting leverage points, a one of the further projecting leverage points being in pivotal contact with a one of the further lever notches and another one of the further projecting leverage points being in pivotal contact with another one of the further lever notches.

99. The lighting system of claim 87, wherein the cavity of the another bracket body has an aperture being in communication with the cavity of the mounting body.

100. The lighting system of claim 99, wherein the mounting base has an aperture being in communication with the aperture in the one of the arched sides of the mounting post.

101. The lighting system of claim 100, including an electrical conductor passing from a cavity of the mounting post into the cavity of the mounting body, and passing from the cavity of the mounting body into the cavity of the bracket body, and passing from the cavity of the bracket body into the passageway of the mounting arm, and passing from the passageway of the mounting arm into the lighting module.

102. The lighting system of claim 55, wherein the lighting system includes another lever-locking bracket having another bracket body and a further lever actuator, the another lever-locking bracket being pivotally connected with the second end of the mounting post by a flange of the another lever-locking bracket.

103. The lighting system of claim 102, wherein the lighting system includes a circular cylinder having a cylinder base spaced apart by a sidewall from a rim, and wherein the rim of the circular cylinder is attached to the mounting base.

104. The lighting system of claim 103, wherein the lighting system includes a threaded ring, and wherein a portion of the sidewall adjacent to the cylinder base of the circular cylinder is threaded for insertion into the threaded ring, and wherein the flange of the additional lever-locking bracket is interposed between the cylinder base and the threaded ring.

105. The lighting system of claim 1, having a second lever-locking bracket including a second bracket body and a second lever actuator, the second lever-locking bracket being pivotally connected with the mounting body at a position being either aligned along the longitudinal axis with and spaced apart from another position of the lever-locking bracket, or being spaced apart at a distance away from the longitudinal axis being about the same as another distance by which another position of the lever-locking bracket is spaced apart from the longitudinal axis.

106. The lighting system of claim 105, wherein the second lever-locking bracket is pivotally connected with the mounting body at the position as being aligned along the longitudinal axis with and spaced apart from another position of the lever-locking bracket.

107. The lighting system of claim 106, including a second lighting module having a second mounting arm being pivotally connected with the second lever-locking bracket.

108. The lighting system of claim 107, wherein the second lighting module includes four semiconductor light-emitting devices in a second housing, and wherein the second housing includes a divider for causing light emissions from each of the four semiconductor light-emitting devices to be separately emitted from the second lighting module.

109. The lighting system of claim 107, wherein the second lever-locking bracket is pivotally connected with the mounting body by a flange of the second lever-locking bracket being retained in alignment with a second aperture of the mounting body communicating with the cavity located inside the mounting body.

110. The lighting system of claim 109, wherein the mounting body has two mutually-opposing sides, and wherein the lever-locking bracket is connected to the lighting system at a one of the two mutually-opposing sides of the mounting body, and wherein the second lever-locking bracket is connected to the lighting system at another one of the two mutually-opposing sides of the mounting body.

111. The lighting system of claim 109, wherein the mounting body has two mutually-opposing sides, and wherein the lever-locking bracket is connected to the lighting system at a one of the two mutually-opposing sides of the mounting body, and wherein the second lever-locking bracket also is connected to the lighting system at the one of the two mutually-opposing sides of the mounting body.

112. The lighting system of claim 111, having two additional lever-locking brackets each including an additional bracket body and an additional lever actuator, wherein a one of the additional lever-locking brackets is connected to the lighting system at the another one of the two mutually-opposing sides of the mounting body, and wherein another one of the additional lever-locking brackets is aligned along the longitudinal axis with and spaced apart from the one of the additional lever-locking brackets and is also connected to the lighting system at the another one of the two mutually-opposing sides of the mounting body.

113. The lighting system of claim 109, wherein the mounting body has two mutually-opposing sides, and wherein the mounting body includes two half-bodies collectively forming the mounting body, each one of the two half-bodies forming a one of the mutually-opposing sides of the mounting body.

114. The lighting system of claim 113, wherein the flange of the lever-locking bracket is interposed between a bracket retainer and a one of the two mutually-opposing sides of the mounting body, and wherein the flange of the second lever-locking bracket is interposed between another bracket retainer and the another one of the two mutually-opposing sides of the mounting body.

115. The lighting system of claim 105, wherein the second lever-locking bracket is pivotally connected with the mounting body at a position being spaced apart at a distance away from the longitudinal axis being about the same as another distance by which another position of the lever-locking bracket is spaced apart from the longitudinal axis.

116. The lighting system of claim 115, including a second lighting module having a second mounting arm being pivotally connected with the second lever-locking bracket.

117. The lighting system of claim 116, wherein the second lighting module includes four semiconductor light-emitting devices in a second housing, and wherein the second housing includes a divider for causing light emissions from each of the four semiconductor light-emitting devices to be separately emitted from the second lighting module.

118. The lighting system of claim 116, wherein the second lever-locking bracket is pivotally connected with the mounting body by a flange of the second lever-locking bracket being retained in alignment with a second aperture of the mounting body communicating with the cavity located inside the mounting body.

119. The lighting system of claim 118, wherein the mounting body has two mutually-opposing sides, and wherein the lever-locking bracket is connected to the lighting system at a one of the two mutually-opposing sides of the mounting body, and wherein the second lever-locking bracket is connected to the lighting system at another one of the two mutually-opposing sides of the mounting body.

120. The lighting system of claim 118, wherein the mounting body has two mutually-opposing sides, and wherein the lever-locking bracket is connected to the lighting system at a one of the two mutually-opposing sides of the mounting body, and wherein the second lever-locking bracket also is connected to the lighting system at the one of the two mutually-opposing sides of the mounting body.

121. The lighting system of claim 120, having two additional lever-locking brackets each including an additional bracket body and an additional lever actuator, wherein a one of the additional lever-locking brackets is connected to the lighting system at the another one of the two mutually-opposing sides of the mounting body, and wherein another one of the additional lever-locking brackets is also connected to the lighting system at the another one of the two mutually-opposing sides of the mounting body and is spaced apart at a distance away from the longitudinal axis being about the same as another distance by which the one of the additional lever-locking brackets is spaced apart from the longitudinal axis.

122. The lighting system of claim 118, wherein the mounting body has two mutually-opposing sides, and wherein the mounting body includes two half-bodies collectively forming the mounting body, each one of the two half-bodies forming a one of the mutually-opposing sides of the mounting body.

123. The lighting system of claim 122, wherein the flange of the lever-locking bracket is interposed between a bracket retainer and a one of the two mutually-opposing sides of the mounting body, and wherein the flange of the second lever-locking bracket is interposed between another bracket retainer and the another one of the two mutually-opposing sides of the mounting body.

* * * * *